US012585331B2

(12) United States Patent
Yoo et al.

(10) Patent No.: US 12,585,331 B2
(45) Date of Patent: Mar. 24, 2026

(54) WEARABLE DEVICE, METHOD, AND NON-TRANSITORY COMPUTER-READABLE STORAGE MEDIUM FOR SETTING DEPTH VALUE OF PIXELS

(71) Applicant: SAMSUNG ELECTRONICS CO., LTD., Suwon-si (KR)

(72) Inventors: Dongheon Yoo, Suwon-si (KR);
Wonjoon Do, Suwon-si (KR);
Donghyun Yeom, Suwon-si (KR);
Sungoh Kim, Suwon-si (KR); Kihwan Kim, Suwon-si (KR); Sanghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/085,516

(22) Filed: Mar. 20, 2025

(65) Prior Publication Data

US 2025/0321636 A1 Oct. 16, 2025

Related U.S. Application Data

(63) Continuation of application No. PCT/KR2025/002079, filed on Feb. 12, 2025.

(30) Foreign Application Priority Data

| | | |
|---|---|---|
| Apr. 12, 2024 | (KR) | 10-2024-0049677 |
| May 9, 2024 | (KR) | 10-2024-0061484 |
| Jun. 26, 2024 | (KR) | 10-2024-0083537 |

(51) Int. Cl.
*G06F 3/01* (2006.01)
*G06T 7/521* (2017.01)

(52) U.S. Cl.
CPC .............. *G06F 3/013* (2013.01); *G06T 7/521* (2017.01); *G06T 2207/10028* (2013.01)

(58) Field of Classification Search
CPC ............................... G06F 3/013; G06T 7/521; G06T 2207/10028
See application file for complete search history.

(56) References Cited

U.S. PATENT DOCUMENTS

| | | | |
|---|---|---|---|
| 10,373,592 B2 | 8/2019 | Tall et al. | |
| 10,650,602 B2 | 5/2020 | You et al. | |

(Continued)

FOREIGN PATENT DOCUMENTS

| | | |
|---|---|---|
| CN | 116934941 A | 10/2023 |
| KR | 10-1870865 B1 | 6/2018 |

(Continued)

OTHER PUBLICATIONS

"WWDC 2023—Jun. 5—Apple", YouTube, Jun. 6, 2023, 1 page, https://www.youtube.com/watch?v=GY kq9R goj8E &t=5526s.

(Continued)

*Primary Examiner* — Matthew A Eason
*Assistant Examiner* — Chayce R Bibbee
(74) *Attorney, Agent, or Firm* — Sughrue Mion, PLLC

(57) ABSTRACT
A wearable device includes a display assembly comprising one or more displays, cameras, sensors, memory comprising one or more storage media and storing instructions, and at least one processor comprising processing circuitry. The instructions, when executed by the at least one processor individually or collectively, cause the wearable device to obtain an image, identify depth values of pixels using obtained depth information, identify the number of pixels, identify a reference depth value among the depth values of the pixels, identify a first portion of the pixels, identify a second portion of the pixels, and based on setting the depth values of the first portion of the pixels to the reference depth (Continued)

value and based on setting depth values of the second portion of the pixels to a predetermined depth value, display, via the display assembly, a screen corresponding to the image.

20 Claims, 23 Drawing Sheets

(56) References Cited

U.S. PATENT DOCUMENTS

| | | | |
|---|---|---|---|
| 10,665,208 B2 | 5/2020 | Martin | |
| 10,928,645 B2 | 2/2021 | Kim et al. | |
| 11,748,956 B2 | 9/2023 | Kitamura et al. | |
| 2020/0342673 A1* | 10/2020 | Lohr | G06F 3/011 |
| 2024/0265650 A1 | 8/2024 | Lohr et al. | |
| 2025/0067980 A1 | 2/2025 | Fortin-Deschenes et al. | |
| 2025/0093661 A1 | 3/2025 | Yeoh et al. | |

FOREIGN PATENT DOCUMENTS

| | | |
|---|---|---|
| KR | 10-2018-0101496 A | 9/2018 |
| KR | 10-2019-0130147 A | 11/2019 |
| KR | 10-2020-0013453 A | 2/2020 |
| KR | 10-2020-0120466 A | 10/2020 |
| KR | 10-2021-0154814 A | 12/2021 |

OTHER PUBLICATIONS

Chowdah, "ToF Explained: iToF and dToF", Sparkfun Start Something, May 17, 2022, 6 pages.
International Search Report and Written Opinion (PCT/ISA/210 and PCT/ISA/237) dated May 27, 2025, issued by International Searching Authority for International Application No. PCT/KR2025/002079.

* cited by examiner

OBTAIN IMAGE — 310

IDENTIFY DEPTH VALUES OF EACH OF PIXELS IN IMAGE — 320

IDENTIFY NUMBER OF PIXELS HAVING EACH OF DEPTH VALUES — 330

IDENTIFY REFERENCE DEPTH VALUE — 340

IDENTIFY PORTION OF PIXELS — 350

DISPLAY SCREEN — 360

1

WEARABLE DEVICE, METHOD, AND NON-TRANSITORY COMPUTER-READABLE STORAGE MEDIUM FOR SETTING DEPTH VALUE OF PIXELS

CROSS-REFERENCE TO RELATED APPLICATIONS

This application is a by-pass continuation application of International Application No. PCT/KR2025/002079, filed on Feb. 12, 2025, which is based on and claims priority to Korean patent application number 10-2024-0049677, filed on Apr. 12, 2024, Korean patent application number 10-2024-0061484, filed on May 9, 2024, and Korean patent application number 10-2024-0083537, filed on Jun. 26, 2024, in the Korean Intellectual Property Office, the disclosures of which are incorporated by reference herein their entireties.

BACKGROUND

1. Field

The disclosure relates to a wearable device, a method, and a non-transitory computer-readable storage medium for setting a depth value of pixels.

2. Description of Related Art

In order to provide enhanced user experience, a wearable device has been developed to provide an extended reality service displaying information generated by a computer in connection with an external object (in the real-world) or a virtual object (in the virtual world). For example, the wearable device may include user equipment, augmented reality (AR) glasses, virtual reality (VR) glasses, and/or head-mounted device (HMD).

The above-described information may be provided as related art for the purpose of helping to understand the present disclosure.

No claim or determination is raised as to whether any of the above-described information may be applied as prior art related to the present disclosure.

SUMMARY

A wearable device is provided. According to an aspect of the disclosure, a wearable device includes: a display assembly comprising one or more displays; one or more cameras; one or more sensors; memory, comprising one or more storage media, configured to store instructions; and at least one processor comprising processing circuitry, wherein the instructions, when executed by the at least one processor individually or collectively, cause the wearable device to: obtain an image via the one or more cameras, identify depth values of pixels in the image using depth information obtained via at least one of the one or more cameras or the one or more sensors, identify the number of one or more pixels having each of the depth values of the pixels, identify a reference depth value using a depth value associated with the number corresponding to a peak value among the depth values, identify a first portion of the pixels having first depth values that are within a reference range with respect to the reference depth value, identify a second portion of the pixels that are different from the first portion of the pixels, and based on setting the first depth values of the first portion of the pixels to the reference depth value and setting second depth values of the second portion of the pixels to a predetermined depth value, display, via the display assembly, a screen corresponding to the image having the first portion of the pixels and the second portion of the pixels.

According to an aspect of the disclosure, a wearable device includes: a display assembly, including one or more displays; one or more cameras; one or more sensors; one or more other sensors configured to obtain eye tracking data regarding a gaze of one or more eyes; memory, comprising one or more storage media, configured to store instructions; and at least one processor comprising processing circuitry, wherein the instructions, when executed by the at least one processor individually or collectively, cause the wearable device to: obtain an image via the one or more cameras, determine a foveated area of the image and a peripheral area of the image surrounding the foveated area of the image, using the eye tracking data obtained using the one or more other sensors, identify depth values of pixels within the foveated area of the image using depth information obtained via at least one of the one or more cameras or the one or more sensors, identify the number of one or more pixels having each of the depth values of the pixels within the foveated area of the image, identify a reference depth value using a depth value associated with the number corresponding to a peak value among the depth values, identify a first portion of the pixels within the foveated area of the image having first depth values that are within a reference range with respect to the reference depth value, identify a second portion of the pixels within the foveated area of the image that are different from the first portion of the pixels within the foveated area of the image, and based on setting the first depth values of the first portion of the pixels within the foveated area of the image to the reference depth value, setting second depth values of the second portion of the pixels within the foveated area of the image to a first predetermined depth value, and setting depth values of pixels within the peripheral area of the image to a second predetermined depth value, display, via the display assembly, a screen corresponding to the image having the first portion of the pixels, the second portion of the pixels, and the pixels within the peripheral area.

According to an aspect of the disclosure, a wearable device includes: a display assembly including one or more displays; one or more cameras; one or more sensors; memory, comprising one or more storage media, configured to store instructions; and at least one processor comprising processing circuitry, wherein the instructions, when executed by the at least one processor individually or collectively, cause the wearable device to: obtain an image via the one or more cameras, identify an object within the image, identify first depth values of a first portion of pixels within an area within the image occupied by the object, using depth information obtained via at least one of the one or more cameras or the one or more sensors, identify a reference depth value using at least portion of the first depth values of the first portion of the pixels, identify a second portion of the pixels that are different from the first portion of the pixels, and based on setting the first depth values of the first portion of the pixels to the reference depth value and setting second depth values of the second portion of the pixels to a predetermined depth value, display, via the display assembly, a screen corresponding to the image having the first portion of the pixels and the second portion of the pixels.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
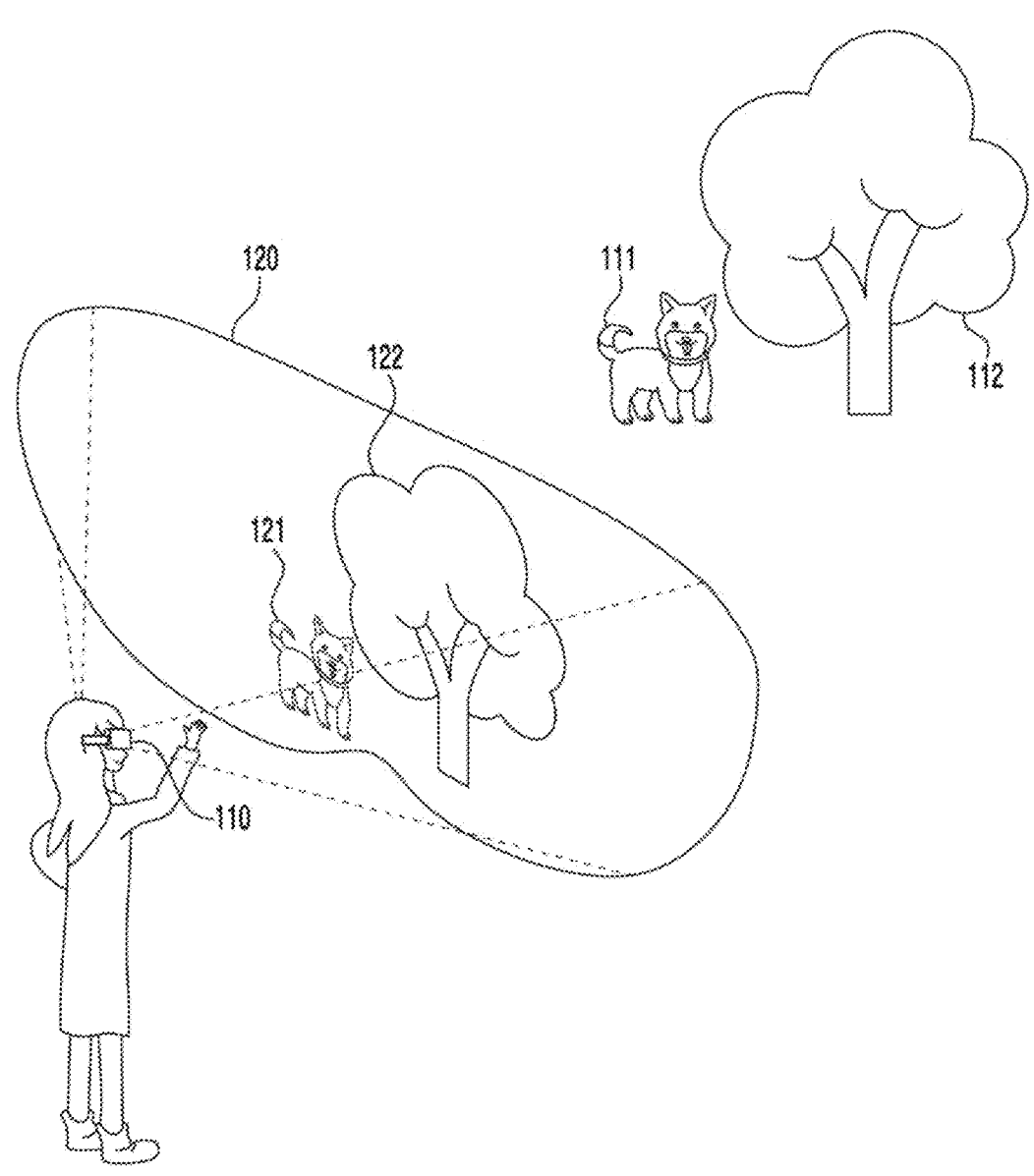
FIG. 1A illustrates an example of an environment including a wearable device.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1A illustrates an example of an environment including a wearable device.

Referring to FIG. 1A, a wearable device 110 may be used to provide an augmented reality service. For example, the wearable device 110 may execute a function of passing through an external environment while providing the augmented reality service.

For example, the wearable device 110 may include one or more displays. For example, the wearable device 110 may display a screen 120 passing through the external environment on one or more displays. For example, the wearable device 110 may display a visual object corresponding to an external object within the real-world together with a virtual object on the screen 120 passing through the external environment.

For example, the wearable device 110 may display a visual object 121 (e.g., an image representing a dog) corresponding to an object 111 (e.g., a dog) and a visual object 122 (e.g., an image representing a tree) corresponding to an object 112 (e.g., a tree), within the screen 120 passing through the external environment. For example, the wearable device 110 may display the object 111 as the visual object 121, within the screen 120 passing through the external environment. For example, the wearable device 110 may display a pass-through screen 120 including the visual object 121 and the visual object 122 to display the external environment including the object 111 and the object 112 to the user.

Figure 1B:
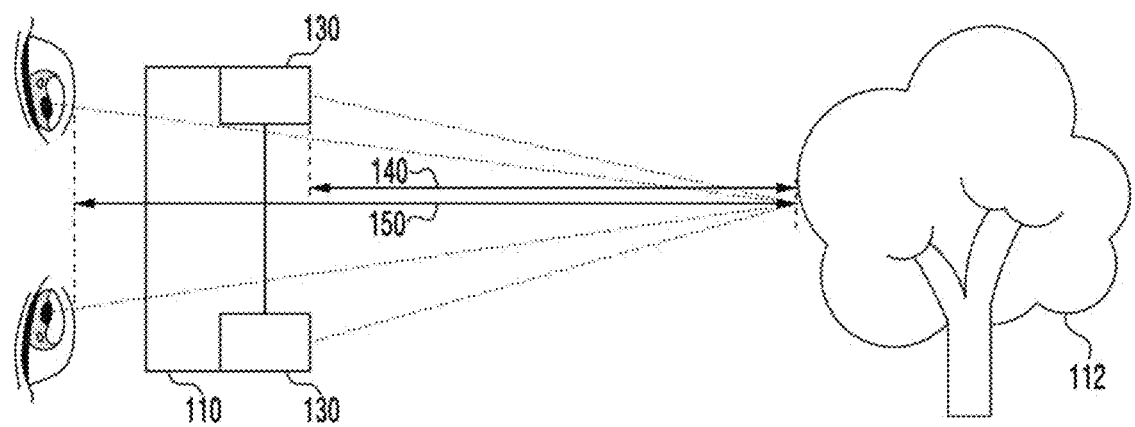
FIG. 1B illustrates an example of a user wearing a wearable device.

FIG. 1B illustrates an example of a user wearing a wearable device.

Referring to FIG. 1B, the wearable device 110 may include one or more cameras 130. For example, the wearable device 110 may collect data for rendering a visual object (e.g., a visual object corresponding to object 112) by using the one or more cameras 130. For example, a position of the one or more cameras 130 and a position of user's eye may be different. For example, a first depth value 140 between the one or more cameras 130 and the object 112 and a second depth value 150 between the user's eye of the wearable device 110 and the object 112 may be different. For example, the wearable device 110 may correct the difference between the first depth value 140 and the second depth value 150, in order to provide the user with the real-world experience through the wearable device 110.

In an embodiment, the wearable device 110 may change a depth value of the object 112 among the collected data to display the screen 120 passing through the external environment. For example, the wearable device 110 may set the depth value of object 112 among the collected data to another depth value, in order to display the screen 120 passing through the external environment. For example, the wearable device 110 may set the depth value of object 112 to another depth value by performing depth reprojection of an image obtained via the one or more cameras 130.

In an embodiment, the wearable device 110 may perform 'depth reprojection' to display a pass-through screen 120 corresponding to an image obtained via the one or more cameras 130. For example, the 'depth reprojection' may include or may correspond to converting a three-dimensional image into a two-dimensional image by using information of the three-dimensional image. For example, the information of the three-dimensional image may include a coordinate and a color of an object within the three-dimensional image. However, the disclosure is not limited to the above embodiment or example. For example, the depth reprojection may include or correspond to correcting the difference between the first depth value 140 and the second depth value 150.

The depth reprojection may include or correspond to reconstructing a three-dimensional image into a two-dimensional image using depth information (or depth value) of pixels of an image. For example, the depth reprojection may include converting a two-dimensional image into a three-dimensional image using information of the two-dimensional image.

The depth reprojection may be performed using initial camera parameters, a rotation matrix, and/or a translation vector. For example, the initial camera parameters may be referenced as or may correspond to information for determining a relationship between the three-dimensional image and the reconstructed two-dimensional image. For example, the initial camera parameters may include a focal length parameter and an optical center point parameter.

For example, the focal length parameter may be referenced as or may correspond to a distance from a camera lens to an image sensor. For example, the optical center point parameter may be associated with a coordinate of a center of the camera lens.

The wearable device 110 may perform 'planar reprojection' on an image to reduce a time during which the depth reprojection is performed on the image obtained via the one or more cameras 130. For example, the 'planar reprojection' may be included in the depth reprojection. For example, the planar reprojection may be described as or may correspond to setting depth values of one or more pixels within an image to one depth value. For example, the planar reprojection may be described as or may correspond to one or more pixels within a three-dimensional image being reconstructed into one two-dimensional planar image. For example, a reference depth value may be set by a user.

As a non-limiting example, the wearable device 110 may adaptively set the reference depth value to improve the quality of an image on which the planar reprojection has been performed. For example, the wearable device 110 may reconstruct one or more pixels within a three-dimensional image into a plurality of two-dimensional planar images to improve the quality of an image on which the planar reprojection has been performed. For example, such method may be executed within the wearable device 110.

In an embodiment, the wearable device 110 may perform the planar reprojection on an image obtained through the one or more cameras 130 using a table stored in memory of the wearable device 110. For example, the table may represent information on a relationship between an image obtained through the one or more cameras 130 and an image of a screen 120 passing through the external environment. For example, the table may be referred to as a pixel look-up table.

In some embodiments, a speed at which the wearable device 110 performs the planar reprojection on an image may be faster than a speed at which the wearable device 110 performs the depth reprojection on each of depth values of one or more pixels within the image. For example, when the wearable device 110 performs the depth reprojection on each of depth values of one or more pixels within an image, it may be referred to as a full-depth reprojection. For example, the quality of an image on which the planar reprojection is performed may be lower than the quality of an image on which the full-depth reprojection is performed.

The depth reprojection that has a higher quality than the image on which the planar reprojection is performed and is performed at a faster speed than the full-depth reprojection may be required. For example, the wearable device 110 may perform an adaptive multi-planar reprojection on an image obtained via the one or more cameras 130. For example, the adaptive multi-planar reprojection may be represented as reconstructing depth values of one or more pixels within a three-dimensional image into one or more two-dimensional planar images. For example, each of (or at least one of) the one or more two-dimensional planar images may be mapped with the reference depth value. For example, the reference depth value may be set adaptively. For example, the adaptive multi-planar reprojection will be described and exemplified in more detail in FIG. 3.

The wearable device 110 performing the depth reprojection on the entire image obtained via the one or more cameras 130 may require more resources (e.g., throughput of a processor) than the wearable device 110 performing the depth reprojection on a portion of the image. For example, a speed at which the wearable device 110 performs the depth reprojection on the entire image may be slower than a speed at which the wearable device 110 performs the depth reprojection on a portion of the image.

In an embodiment, the wearable device 110 may enable the quality of the depth reprojection of a first portion of the screen 120 to be different from the quality of the depth reprojection of a second portion of the screen 120. For example, in the wearable device 110, the quality of the first portion of the screen 120 on which the depth reprojection is performed may be higher than the quality of the second portion of the screen 120 on which the depth reprojection is performed. For example, the first portion of the screen 120 may be described as or may correspond to an area that is relatively more important to the user than the second portion of the screen. For example, the wearable device 110 may optimize data load of the processor by enabling the quality of the depth reprojection of the first portion of the screen 120 to be different from the quality of the depth reprojection of the second portion of the screen 120.

For example, in a case that a depth value setting is not performed quickly in the wearable device 110, the user may feel fatigue and/or inconvenience. For example, if the setting of the depth value is not performed quickly in the wearable device 110, user experience of the wearable device 110 may be reduced. The wearable device 110 may perform a method for efficiently and quickly performing the setting of the depth value in order to provide enhanced user experience. For example, the wearable device 110 may efficiently utilize limited resources and perform the setting of the depth value relatively quickly by allocating more resources for setting the depth value of an area related to an object than for setting the depth value of an area related to a background. For example, the wearable device 110 may include components (or hardware components) to provide this method. The components are described and exemplified in more detail with reference to FIG. 2.

Figure 2:
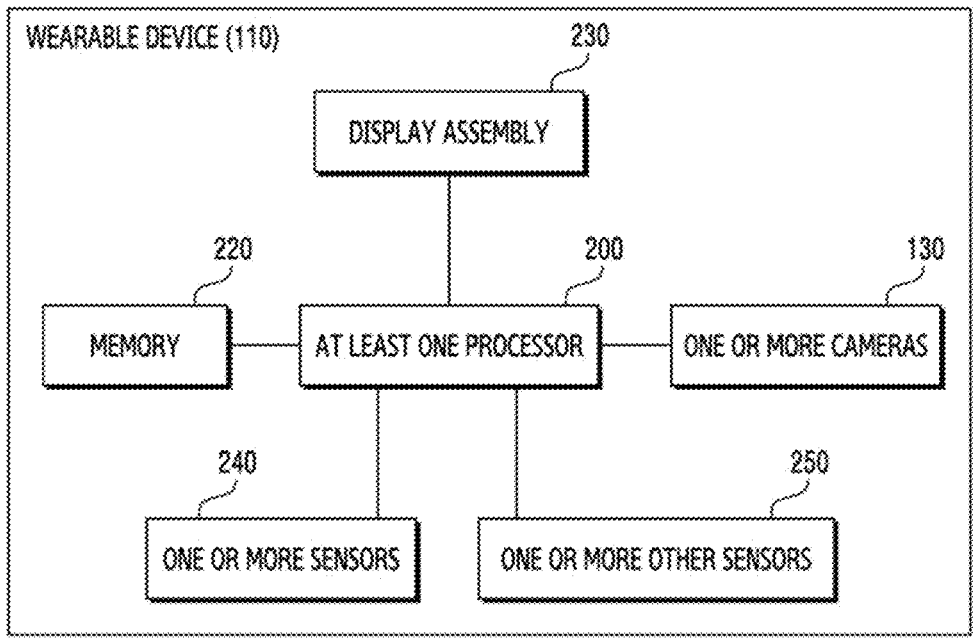
FIG. 2 is a block diagram of an exemplary wearable device.

FIG. 2 is a block diagram of an exemplary wearable device.

Referring to FIG. 2, the wearable device 110 may include one or more cameras 130, at least one processor 200, memory 220, a display assembly 230, one or more sensors 240, and one or more other sensors 250.

The one or more cameras 130 may be used to obtain an image of an environment shown within a display area of the display assembly 230. The one or more cameras 130 may be disposed toward the environment to obtain an image of the environment shown within the display area of the display assembly 230.

For example, a field-of-view (FOV) of the one or more cameras 130 disposed toward the environment may be configured to cover an area wider than the display area of the display assembly 230 or cover an area corresponding to the display area of the display assembly 230, in order to obtain an image of the environment shown within the display area of the display assembly 230. The FOV of the one or more cameras 130 disposed toward the environment may be configured to cover an area wider than an area covered by a FOV of a user wearing the wearable device 110, or cover an area corresponding to the area covered by the FOV of the user, in order to obtain an image of the environment shown within the display area of the display assembly 230.

For example, the one or more cameras 130 disposed toward the environment may include a plurality of cameras to obtain an image of the environment shown within the display area of the display assembly 230. In an embodiment, the plurality of cameras may be configured as a pair of cameras to obtain a stereoscopic image. In order to obtain a stereoscopic image, a direction in which a first camera included in the pair of cameras faces may be the same as a direction in which a second camera included in the pair of cameras faces. In order to obtain a stereoscopic image, a first FOV of the first camera and a second FOV of the second camera may have a disparity. In an embodiment, the one or more cameras 130 disposed toward the environment may include a component for obtaining depth information. However, the disclosure is not limited to the above embodiment or example.

The one or more cameras 130 may be further used to measure depth information of an object within an obtained image. For example, the one or more cameras 130 may obtain depth information of an object, by using binocular disparity. Obtaining depth information of an object by using the one or more cameras 130 will be described and exemplified in more detail with reference to FIG. 4A.

The one or more cameras 130 may be operably or electronically coupled with at least one processor 200. For example, the one or more cameras 130 may be operably coupled with an image signal processor (ISP). The one or more cameras 130 coupled with the ISP may indicate one or more cameras 130 that are directly or indirectly connected to the ISP. The one or more cameras 130 coupled with the ISP may indicate one or more cameras 130 that operate in conjunction with the ISP. The one or more cameras 130 coupled with the ISP may indicate that images obtained using the one or more cameras 130 are received by the ISP. The one or more cameras 130 coupled with the ISP may indicate that the images are processed by the ISP.

The display assembly 230 may include one or more displays. The display assembly 230 may include an area for displaying a screen. The display assembly 230 may include a hardware component of the wearable device 110 used to display a screen. For example, the display assembly 230 may include light emitting elements and circuits (e.g., transistors) that control the light-emitting elements to emit light. For example, each of the light emitting elements may include an organic light emitting diode (OLED) or a micro-LED. However, the disclosure is not limited to the above embodiment or example. For example, the display assembly 230 may include a liquid crystal display (LCD).

The one or more sensors 240 may be configured to obtain depth information of an object within an image obtained via the one or more cameras 130. For example, the one or more sensors 240 may include light emitting elements and light receiving elements. For example, the one or more sensors 240 may obtain depth information of the object, by using a difference between light emitted by the light emitting elements and light received by the light receiving elements. For example, the one or more sensors 240 may include an indirect time-of-flight (I-TOF) sensor and/or a direct time-of-flight (D-TOF) sensor. However, the disclosure is not limited to the above embodiment or example. For example, the one or more sensors 240 may be operably coupled with at least one processor 200.

The One or more other sensors 250 may be configured to obtain eye tracking data regarding a gaze of one or more eyes. The one or more other sensors 250 may obtain eye tracking data regarding a gaze of the eyes of a user wearing the wearable device 110. For example, the one or more other sensors 250 may be disposed toward the eyes of the user wearing the wearable device 110 such that a measurable range of the one or more other sensors 250 covers an area including the eyes of the user.

As a non-limiting example, the one or more other sensors 250 may include another camera different from the one or more cameras 130. For example, the other camera may be used to track the eyes of the user wearing the wearable device 110. For example, the other camera may be disposed toward the eyes of the user such that a FOV of the other camera covers an area including the eyes of the user wearing the wearable device 110.

The at least one processor 200 may include a hardware component for processing data based on executing instructions. The hardware component for processing data may include, for example, a central processing unit (CPU) (e.g., including processing circuitry). For example, the hardware component for processing data may include a graphic processing unit (GPU) (e.g., including processing circuitry). For example, the hardware component for processing data may include a display processing unit (DPU) (e.g., including processing circuitry). For example, the hardware component for processing data may include a neural processing unit (NPU) (e.g., including processing circuitry).

The at least one processor 200 may include one or more cores. For example, the at least one processor 200 may have a multi-core processor structure such as a dual core, a quad core, a hexa core, or an octa core.

The memory 220 may include a hardware component for storing data and/or instructions inputted to and/or outputted from the at least one processor 200. For example, the memory 220 may include a volatile memory such as a random-access memory (RAM) and/or a non-volatile memory such as a read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, and an embedded multimedia card (EMMC).

For example, the at least one processor 200 may execute instructions stored in the memory 220 to obtain an image from the one or more cameras 130, identify depth values of each of pixels within the image using depth information obtained via the one or more cameras 130 and/or the one or more sensors 240, identify the number of one or more pixels having each of the depth values, identify a reference depth value using a depth value associated with the number corresponding to a peak value among the depth values, identify a first portion of the pixels having depth values within a reference range with respect to the reference depth value, identify a second portion of the pixels different from the first portion of the pixels, and display a screen corresponding to the image via the display assembly 230 based on setting the depth values of the first portion of the pixels to the reference depth value and setting the depth values of the second portion of the pixels to a predetermined depth value.

For example, the instructions, when executed individually or collectively by the at least one processor 200, may cause the wearable device 110 to obtain an image from the one or more cameras 130, identify depth values of each of pixel within the image using depth information obtained via the one or more cameras 130 and/or the one or more sensors 240, identify the number of one or more pixels having each of the depth values, identify a reference depth value using a depth value associated with the number corresponding to the peak value among the depth values, identify a first portion of the pixels having depth values within a reference range with respect to the reference depth value, identify a second portion of the pixels different from the first portion of the pixels, and display a screen corresponding to the image via the display assembly 230 based on setting the depth values of the first portion of the pixels to the reference depth value and setting the depth values of the second portion of the pixels to a predetermined depth value. These operations will be described and exemplified in more detail with reference to FIGS. 3 to 13.

Figure 3:
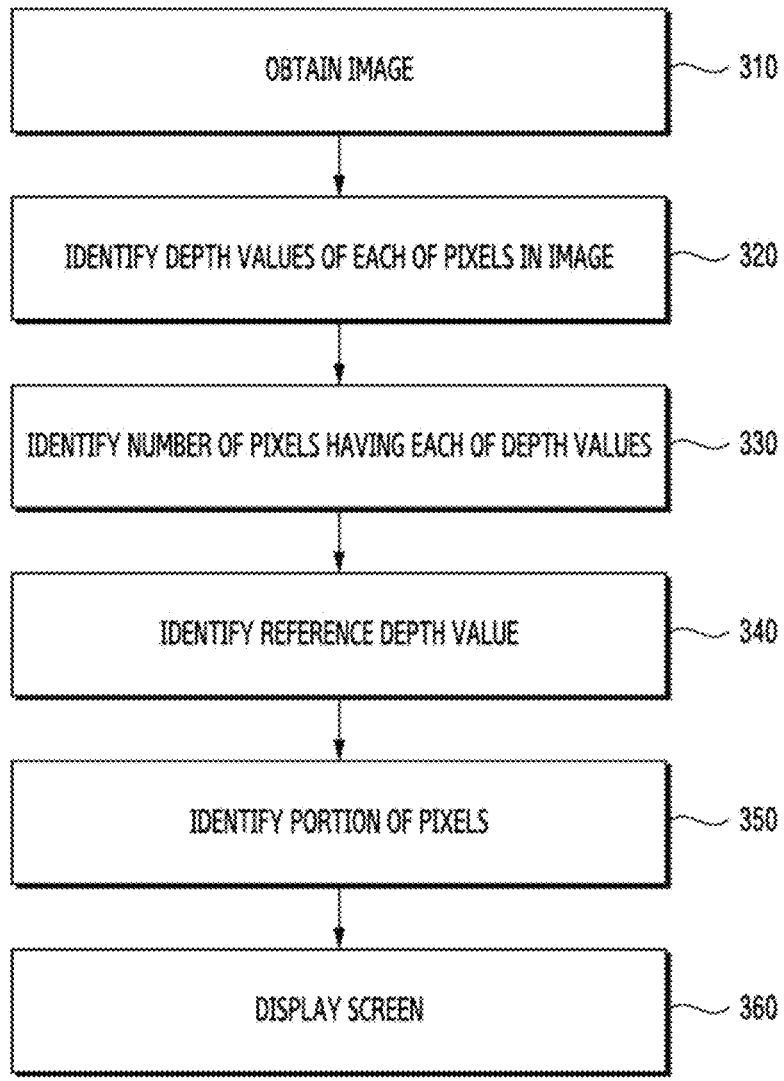
FIG. 3 illustrates an example of operations of a wearable device.

FIG. 3 illustrates an example of operations of a wearable device.

In FIG. 3, in operation 310, the wearable device 110 (e.g., the at least one processor 200) may obtain an image via the one or more cameras 130. For example, the at least one processor 200 may obtain depth information of an image, by using the image obtained via the one or more cameras 130. For example, the at least one processor 200 may obtain images having a plurality of resolutions via the one or more cameras 130. The images may include an image representing the entire FOV of the one or more cameras 130 and/or an image representing a portion of the FOV of the one or more cameras 130.

For example, the at least one processor 200 may perform rendering of a foveated area of an image to be displayed via the display assembly 230, by using an image obtained via the one or more cameras 130. For example, the at least one processor 200 may perform rendering of a peripheral area of an image to be displayed via the display assembly 230, by using an image obtained via the one or more cameras 130.

In operation 320, the at least one processor 200 may identify depth values of each of pixels within an image obtained via the one or more cameras 130, by using depth information obtained via the one or more cameras 130 and/or the one or more sensors 240. The depth information will be described and exemplified in more detail with reference to FIGS. 4A and 4B.

In operation 330, the at least one processor 200 may identify the number of one or more pixels having each of the depth values. For example, the at least one processor 200 may identify the number of one or more pixels having each of the depth values, by using a histogram (e.g., a histogram 510 of FIG. 5A) that represents a relationship between depth values of pixels within the image and the number of pixels within the image. The histogram will be described and exemplified in more detail with reference to FIG. 5A.

In operation 340, the at least one processor 200 may identify a reference depth value (e.g., a reference depth value 551 of FIG. 5A), by using a depth value associated with the number of depth values corresponding to a peak value (e.g., a peak value 511-1 of FIG. 5A) of a histogram. For example, the at least one processor 200 may identify a depth value associated with the number of one or more pixels corresponding to a peak value in a histogram as a reference depth value. For example, the peak value may be referred to as a local maximum value. For example, the reference depth value may be set to a depth value of a cluster when one or more pixels of an image obtained via the one or more cameras 130 are clustered into N clusters. Here, N is a natural number that is equal to or larger than one (1). As a non-limiting example, the at least one processor 200 may identify another reference depth value (e.g., a reference depth value 552 of FIG. 5A) by using a depth value associated with the number of pixels corresponding to another peak value (e.g., a peak value 511-2 of FIG. 5A) in a histogram of pixels. The reference depth value and the other reference depth value will be described and exemplified in more detail with reference to FIG. 5A.

For example, the at least one processor 200 may cluster one or more pixels of an image into N clusters. For example, the at least one processor 200 may divide one or more pixels of an image into N portions. For example, the at least one processor 200 may set the number of clusters using the number of peak values in a histogram of pixels. For example, the at least one processor 200 may perform clustering of one or more pixels of an image, based on depth values of one or more pixels of the image. For example, the at least one processor 200 may obtain depth values of one or more pixels via the one or more sensors 240 and/or the one or more cameras 130.

For example, the at least one processor 200 may set depth values of pixels within each of the clusters to a reference depth value of each of the clusters. For example, the reference depth value may have a value distinguished according to the clusters. For example, the reference depth value may be changed based on the depth value of pixels within each cluster.

In an embodiment, the reference depth value may be a predetermined value. For example, the at least one processor 200 may perform clustering of pixels by using a table stored in the memory 220. For example, the table may represent reference depth values capable of being set to a depth value of pixels of the cluster. For example, the table may be referred to as a pixel mapping look-up table.

For example, the at least one processor 200 may adaptively set a reference depth value. For example, the at least one processor 200 may set an average value of depth values of pixels within a cluster or a median value of depth values of pixels within a cluster to a reference depth value of the cluster. For example, the at least one processor 200 may set a depth value corresponding to a maximum number among depth values of pixels within a cluster to a reference depth value of the cluster.

For example, the at least one processor 200 may identify a reference depth value by correcting a depth value associated with a number corresponding to a peak value among depth values. For example, the at least one processor 200 may identify a reference depth value, by using the depth value and a difference between a position of one or more attached cameras of a wearable device and a position of eyes of a user wearing the wearable device.

For example, the at least one processor 200 may separate an image obtained through the one or more cameras 130, based on clustering. For example, the at least one processor 200 may separate an image obtained via the one or more cameras 130 into images corresponding to each of the clusters. For example, the at least one processor 200 may map a reference depth value of a cluster corresponding to each of the separated images to the corresponding cluster.

Figure 5A:
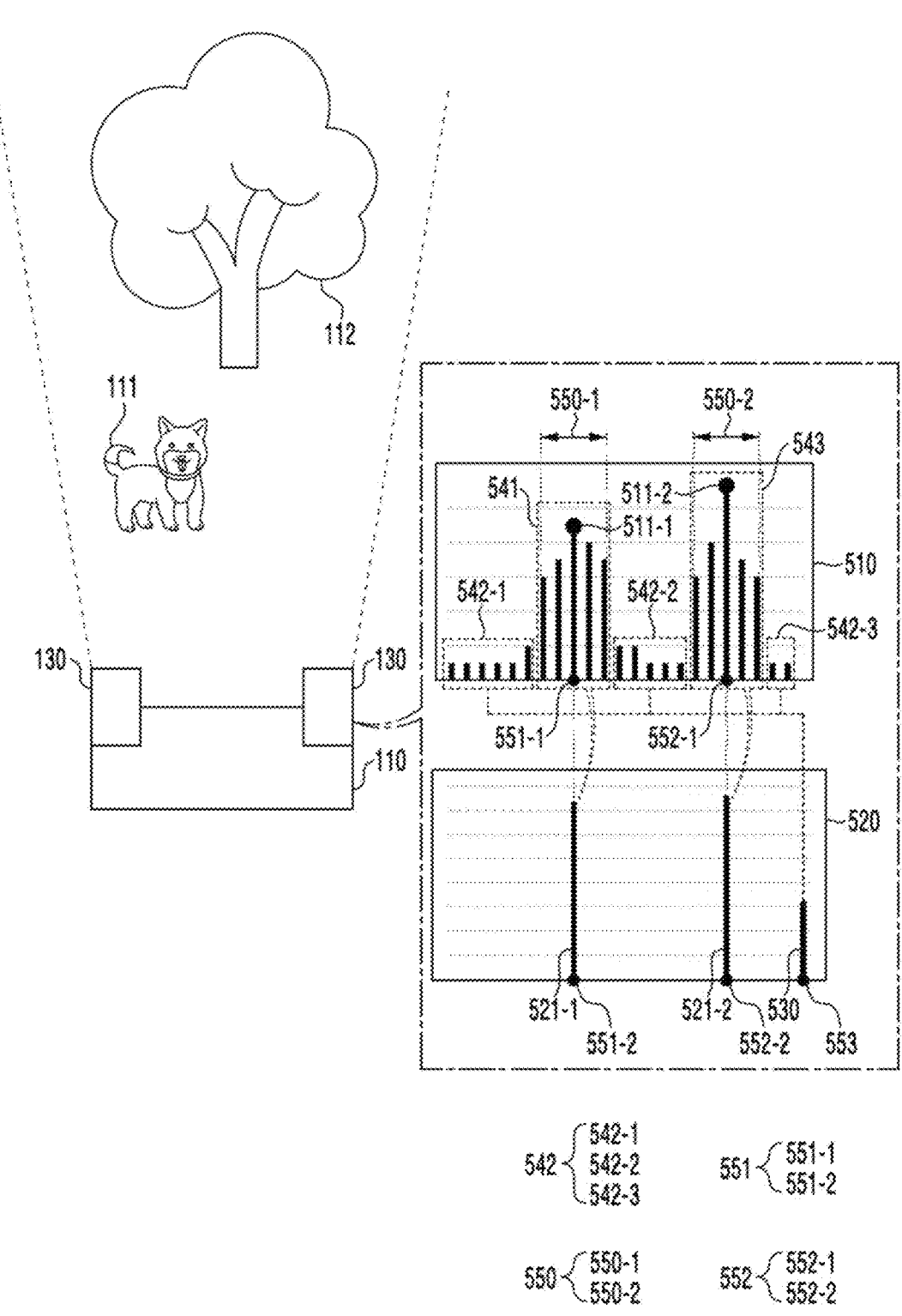
FIGS. 5A and 5B illustrate an example of a wearable device that identifies the number of pixels having each of depth values in an image and clusters pixels.

In operation 350, the at least one processor 200 may identify a portion (e.g., a first portion 541 of pixels of FIG. 5A, a third portion 543 of pixels of FIG. 5A) of pixels having depth values within a reference range (e.g., a reference range 550 of FIG. 5A) with respect to a reference depth value (e.g., a reference depth value 551 of FIG. 5A). For example, the reference range may be a predetermined range. For example, the reference range may be recognized as having the same depth value while a user of the wearable device 110 looks at the pixels. For example, the reference range in a case that the user of the wearable device 110 looks at a nearby object may be smaller than the reference range in a case that the user of the wearable device 110 looks at a distant object. However, the disclosure is not limited to the above embodiment or example.

For example, the at least one processor 200 may identify a first portion (e.g., the first portion 541 of pixels of FIG. 5A) of pixels and a second portion (e.g., a second portion 542 of pixels of FIG. 5A) of other pixels. For example, the at least one processor 200 may cluster pixels having depth values outside a reference range with respect to a depth value corresponding to a peak value (e.g., the peak value 511-1 of FIG. 5A) in a histogram.

As a non-limiting example, the at least one processor 200 may identify a third portion (e.g., the third portion 543 of pixels of FIG. 5A) of pixels having depth values within a reference range with respect to another reference depth value (e.g., the reference depth value 552 of FIG. 5A). For example, the at least one processor 200 may cluster pixels having depth values within a reference range with respect to a depth value corresponding to another peak value (e.g., the peak value 511-2 of FIG. 5A) in the histogram.

In operation 360, the at least one processor 200 may display a screen corresponding to the image via the display assembly 230. For example, the at least one processor 200 may display a screen corresponding to the image via the display assembly 230, based on setting depth values of the first portion of the pixels to a reference depth value (e.g., the reference depth value 551 of FIG. 5A) and depth values of the second portion of the pixels to a predetermined depth value (e.g., a predetermined depth value 553 of FIG. 5A).

For example, the at least one processor 200 may set depth values of the first portion of the pixels to a reference depth value, by performing depth reprojection on the image. For example, the reference depth value may include a predetermined value. For example, the reference depth value may include a value that adaptively changes. For example, the reference depth value will be described and exemplified in more detail in FIG. 5A. For example, the at least one processor 200 may set depth values of the second portion of the pixels to a predetermined depth value, by performing depth reprojection on the image. For example, the predetermined depth value may be obtained by using an average value of the depth values of each of the pixels in the image. For example, the predetermined depth value may be obtained by using an intermediate value of the depth values of each of the pixels in the image.

For example, the at least one processor 200 may display a screen corresponding to the image via the display assembly 230, based on setting depth values of the first portion of the pixels to a reference depth value, setting depth values of the second portion of the pixels to a predetermined depth value, and setting depth values of the third portion of the pixels to another reference depth value (e.g., the reference depth value 552 of FIG. 5A). For example, the at least one processor 200 may set depth values of the third portion of the pixels to another reference depth value, by performing depth reprojection on the image.

For example, the at least one processor 200 may reduce power consumption for setting depth values, by setting the depth values of the first portion of the pixels to the reference depth value and setting the depth values of the second portion of the pixels to the predetermined depth value.

For example, the at least one processor 200 may reduce the load amount of data used for setting the depth value, by setting the depth values of the first portion of the pixels to the reference depth value and setting the depth values of the second portion of the pixels to the predetermined depth value. In other words, the at least one processor 200 may efficiently perform setting the depth value, by setting the depth values of the first portion of the pixels to the reference depth value and setting the depth values of the second portion of the pixels to the predetermined depth value.

For example, the at least one processor 200 may display a screen corresponding to the image via the display assembly 230, faster than calculating the depth value of each of the pixels, by setting the depth values of the first portion of the pixels to the reference depth value and setting the depth values of the second portion of the pixels to the predetermined depth value.

For example, the at least one processor 200 may enhance the user experience of the wearable device 110 by setting the depth values of the first portion of the pixels to the reference depth value and setting the depth values of the third portion of the pixels to the other reference depth value, compared to setting the depth values of the first portion and third portion of the pixels to the predetermined depth value.

Figure 4A:
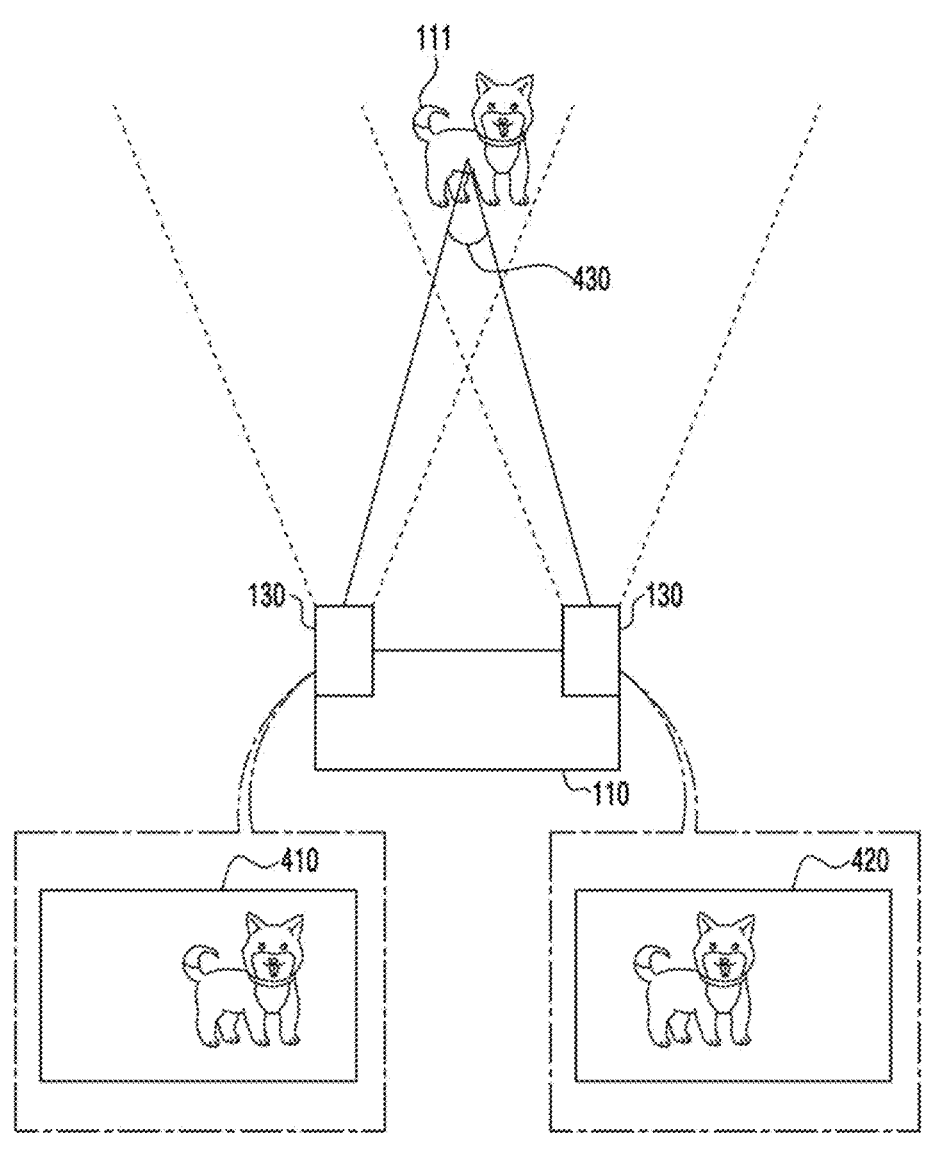
FIG. 4A illustrates an example of a wearable device that obtains depth information of an object via one or more cameras.

FIG. 4A illustrates an example of a wearable device that obtains depth information of an object via one or more cameras.

Referring to FIG. 4A, the wearable device 110 (e.g., the at least one processor 200) may obtain images (e.g., image 410 and image 420) of an object 111 using one or more cameras 130. For example, the at least one processor 200 may obtain depth information of the object 111 via the one or more cameras 130.

For example, the image 410 may be obtained using a camera corresponding to the user's left eye. For example, the image 420 may be obtained using a camera corresponding to the user's right eye. For example, locations of a visual object corresponding to the object 111 in each of the image 410 and the image 420 may be different.

For example, the at least one processor 200 may obtain depth information of the object 111, by using binocular disparity 430 of the camera corresponding to the user's right eye and the camera corresponding to the user's left eye. For example, as a distance between the one or more cameras 130 and the object 111 becomes closer, the binocular disparity 430 may increase. For example, as the binocular disparity 430 increases, a difference between a position of a visual object corresponding to the object 111 within the image 410 and a position of a visual object corresponding to the object 111 within the image 420 may increase. For example, the at least one processor 200 may obtain depth information of the object 111 (or a visual object corresponding to the object 111), based on a relationship between the difference in position and the binocular disparity 430.

Figure 4B:
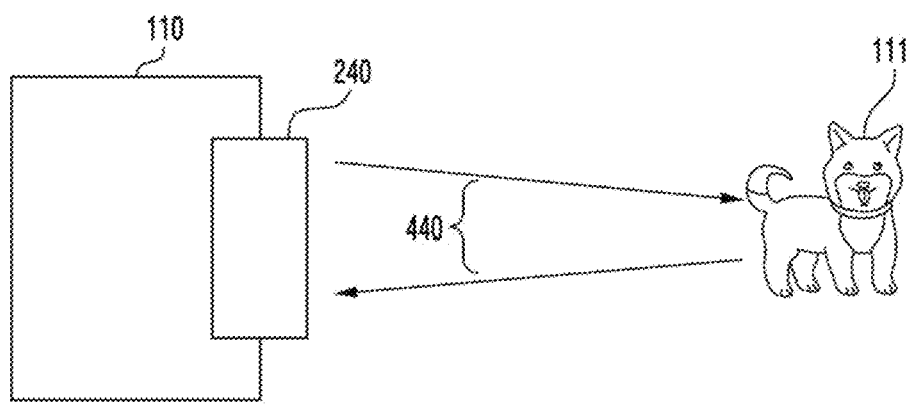
FIG. 4B illustrates an example of a wearable device that obtains depth information of an object via one or more sensors.

FIG. 4B illustrates an example of a wearable device that obtains depth information of an object via one or more sensors.

Referring to FIG. 4B, the wearable device 110 (e.g., the at least one processor 200) may obtain depth information of the object 111 using one or more sensors 240. For example, the at least one processor 200 may obtain depth information of a visual object corresponding to the object 111 within an image obtained via the one or more cameras 130, by using the one or more sensors 240.

For example, the one or more sensors 240 may include a time-of-flight (TOF) sensor. For example, the at least one processor 200 may obtain depth information of the object 111, by using an optical signal 440, which is emitted from the one or more sensors 240 and received via the one or more sensors 240. For example, the at least one processor 200 may obtain depth information of the object 111, by using a change in the optical signal 440 reflected by the object 111.

For example, the one or more sensors 240 may include a D-TOF sensor. For example, the at least one processor 200 may emit an infrared laser via the D-TOF sensor in a light pulse manner. For example, the at least one processor 200 may receive a infrared laser reflected from the object 111 via the D-TOF sensor. For example, the at least one processor may obtain depth information of the object 111, based on a difference between a time at which the infrared laser is emitted and a time at which the infrared laser is received.

For example, the one or more sensors 240 may include an I-TOF sensor. For example, the at least one processor 200 may emit modulated light via the I-TOF sensor. For example, the at least one processor 200 may receive light reflected from the object 111 via the I-TOF sensor. For example, the at least one processor 200 may obtain depth information of the object 111, based on a difference between a phase of the emitted light and a phase of the received light.

Figure 5B:
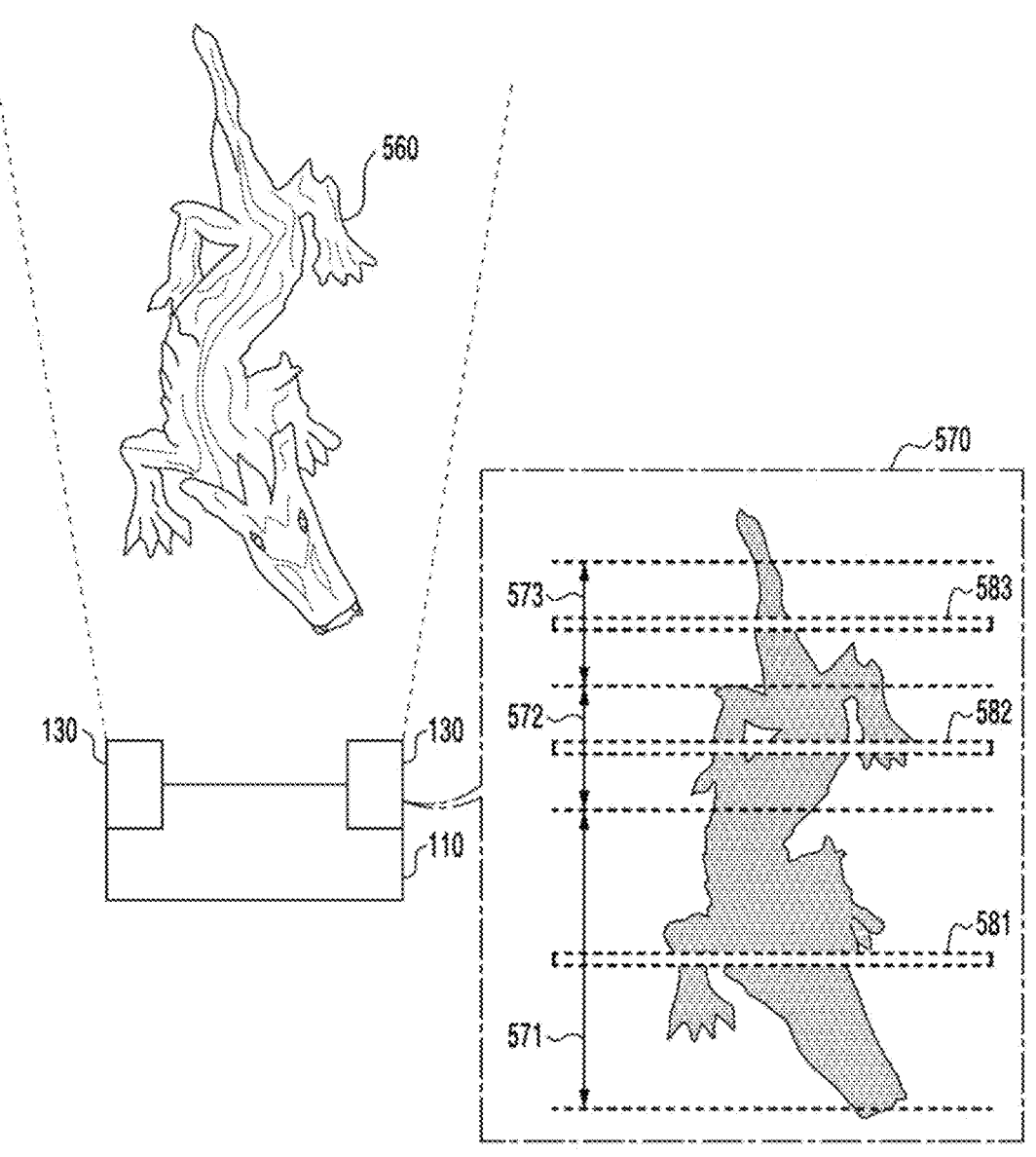

FIGS. 5A and 5B illustrate an example of a wearable device that identifies the number of pixels having each of depth values in an image and clusters pixels.

In FIG. 5A, the wearable device 110 (e.g., the at least one processor 200) may create a histogram 510 indicating the number of one or more pixels having each of depth values in an image obtained via the one or more cameras 130. For example, the at least one processor 200 may obtain each of depth values in an image via one or more sensors 240 and/or the one or more cameras 130. For example, the at least one processor 200 may capture an image including the object 111 and the object 112 by using the one or more cameras 130 and create the histogram 510 to identify the number of one or more pixels having each of the depth values within the image. For example, the at least one processor 200 may perform clustering of one or more pixels within the image, by using a distribution of pixels within the histogram 510.

For example, the histogram 510 may indicate a relationship between the number of one or more pixels within the image and the depth value of each of the one or more pixels. For example, a horizontal axis of the histogram 510 may correspond to the depth value of pixels, and a vertical axis of the histogram 510 may correspond to the number of the pixels. For example, the histogram 510 may be described as or may correspond to a histogram indicating a relationship between the number of pixels of an image including the object 111 and the object 112 obtained using the one or more cameras 130 and the depth value of the pixels of the image.

For example, the first portion 541 of pixels may be represented as a cluster of the pixels. For example, the first portion 541 of pixels may be represented as a cluster of the pixels having depth values within a reference range 550-1 with respect to a reference depth value 551.

For example, the at least one processor 200 may identify a depth value corresponding to a peak value 511-1 in the histogram 510 as the reference depth value 551. For example, the peak value 511-1 may be represented as a depth value of a maximum number among depth values of pixels within the image corresponding to the object 111. For example, the at least one processor 200 may cluster pixels having depth values within the reference range 550-1 with respect to the reference depth value 551 in the histogram 510. For example, the at least one processor 200 may set depth values of the first portion 541 of pixels to the reference depth value 551, by performing the operations of FIG. 3 on an image obtained via the one or more cameras 130.

For example, a histogram 520 may represent a state in which the one or more pixels within the image are clustered. For example, the histogram 520 may represent a state after the at least one processor 200 clusters the one or more pixels within the image into N (e.g., 2).

For example, a bar graph 521-1 in the histogram 520 may be described as may correspond to a cluster of depth values within the reference range 550-1 with respect to the reference depth value 551 in the histogram 510. For example, the at least one processor 200 may set depth values of the first portion 541 of pixels to a depth value corresponding to the bar graph 521-1. For example, the at least one processor 200 may set depth values of the first portion 541 of pixels to the reference depth value 551. For example, setting depth values of the first portion 541 of pixels to the reference depth value 551 may include changing depth values of the first portion 541 of pixels to depth values of the bar graph 521-1. For example, the at least one processor 200 may change depth values of the first portion 541 of pixels to the reference depth value 551.

For example, the at least one processor 200 may cluster pixels having depth values outside the reference range 550 with respect to each of the reference depth value 551 in the histogram 510 and a reference depth value 552 in the histogram 510. For example, a cluster of depth values outside the reference range 550 with respect to each of the reference depth value 551 in the histogram 510 and the reference depth value 552 in the histogram 510 may be represented as the second portion 542 of pixels. For example, a bar graph 530 in the histogram 520 may correspond to the second portion 542 of pixels.

For example, the at least one processor 200 may identify the second portion 542 of pixels within the histogram 510. For example, the at least one processor 200 may set depth values of the second portion 542 of pixels to a depth value corresponding to the bar graph 530. For example, the at least one processor 200 may set depth values of the second portion 542 of pixels to a predetermined depth value 553.

For example, setting depth values of the second portion 542 of pixels to the predetermined depth value 553 may include changing depth values of the second portion 542 of pixels to the depth value of the bar graph 530. For example, the at least one processor 200 may change depth values of the second portion 542 of pixels to the predetermined depth value 553.

For example, the at least one processor 200 may identify a depth value corresponding to a peak value 511-2 in the histogram 510 as the reference depth value 552. For example, the peak value 511-2 may be represented as a depth value of a maximum number among depth values of pixels in the image corresponding to the object 112. For example, the at least one processor 200 may cluster pixels having depth values within the reference range 550-2 with respect to the reference depth value 552 in the histogram 510.

For example, pixels having depth values within the reference range 550-2 with respect to the reference depth value 552 in the histogram 510 may be represented as the third portion 543 of the pixels.

For example, the at least one processor 200 may set depth values of the third portion 543 of pixels to a depth value corresponding to a bar graph 521-2. For example, the at least one processor 200 may set depth values of the third portion 543 of pixels to the reference depth value 552. For example, setting depth values of the third portion 543 of pixels to the reference depth value 552 may include changing depth values of the third portion 543 of pixels to a depth value of the bar graph 521-2. For example, the at least one processor 200 may change depth values of the third portion 543 of pixels to the reference depth value 552.

For example, the bar graph 521-2 in the histogram 520 may be described as or may correspond to a cluster of depth values within the reference range 550-2 with respect to the reference depth value 552 in the histogram 510. For example, the at least one processor 200 may identify the third portion of pixels having depth values within the reference range 550-2 with respect to the reference depth value 552 in the histogram 510. For example, the at least one processor 200 may set depth values of the third portion of pixels to a depth value corresponding to the peak value 511-2. For example, the at least one processor 200 may set depth values of the third portion 543 of pixels to the reference depth value 552.

The histogram 510 and the histogram 520 represented by FIG. 5A are only exemplary. For example, the at least one processor 200 may capture an image including a plurality of objects by using the one or more cameras 130 and create a histogram to identify the number of pixels having each of depth values in the image.

Referring to FIG. 5B, the at least one processor 200 may obtain an image of an environment including an object 560 via the one or more cameras 130. For example, an example 570 may indicate that an image obtained via the one or more cameras 130 is separated into N (e.g., three (3)) images.

For example, the at least one processor 200 may separate an image obtained via the one or more cameras 130 into an image 581, an image 582, and an image 583.

For example, the at least one processor 200 may cluster one or more pixels in the obtained image. For example, the image 581 may correspond to a portion of pixels having depth values within a reference range 571.

For example, a reference depth value of the image 581 may be represented as a predetermined value. For example, the predetermined value may be stored as a table in the memory 220. For example, the reference depth value of the image 581 may be set to an average value (or a median value) of a portion of pixels having depth values within the reference range 571.

As a non-limiting example, the reference depth value of the image 581 may be adaptively set. For example, the reference depth value of the image 581 may be set to a depth value corresponding to a peak value of the number of pixels in a histogram (e.g., the histogram 510).

For example, the image 582 may correspond to a portion of pixels having depth values within a reference range 572. For example, a reference depth value of the image 582 may be represented as a predetermined value. For example, the predetermined value may be stored as a table in the memory 220. For example, the reference depth value of the image 582 may be set to an average value (or a median value) of a portion of pixels having depth values within the reference range 572.

As a non-limiting example, the reference depth value of the image 582 may be adaptively set. For example, the reference depth value of the image 582 may be set to a depth value corresponding to a peak value of the number of pixels in the histogram 510.

For example, the image 583 may correspond to a portion of pixels having depth values within a reference range 573. For example, a reference depth value of the image 583 may be represented as a predetermined value. For example, the predetermined value may be stored as a table in the memory 220. For example, the reference depth value of the image 583 may be set to an average value (or a median value) of a portion of pixels having depth values within the reference range 573.

As a non-limiting example, the reference depth value of the image 583 may be adaptively set. For example, the reference depth value of the image 583 may be set to a depth value corresponding to a peak value of the number of pixels in the histogram 510.

For example, the reference range 571, the reference range 572, and the reference range 573 may be distinguished from each other. For example, the reference range 571 may be longer than the reference range 573. FIG. 5B is merely exemplary. For example, the reference range 571 may be shorter than the reference range 573.

Figure 6:
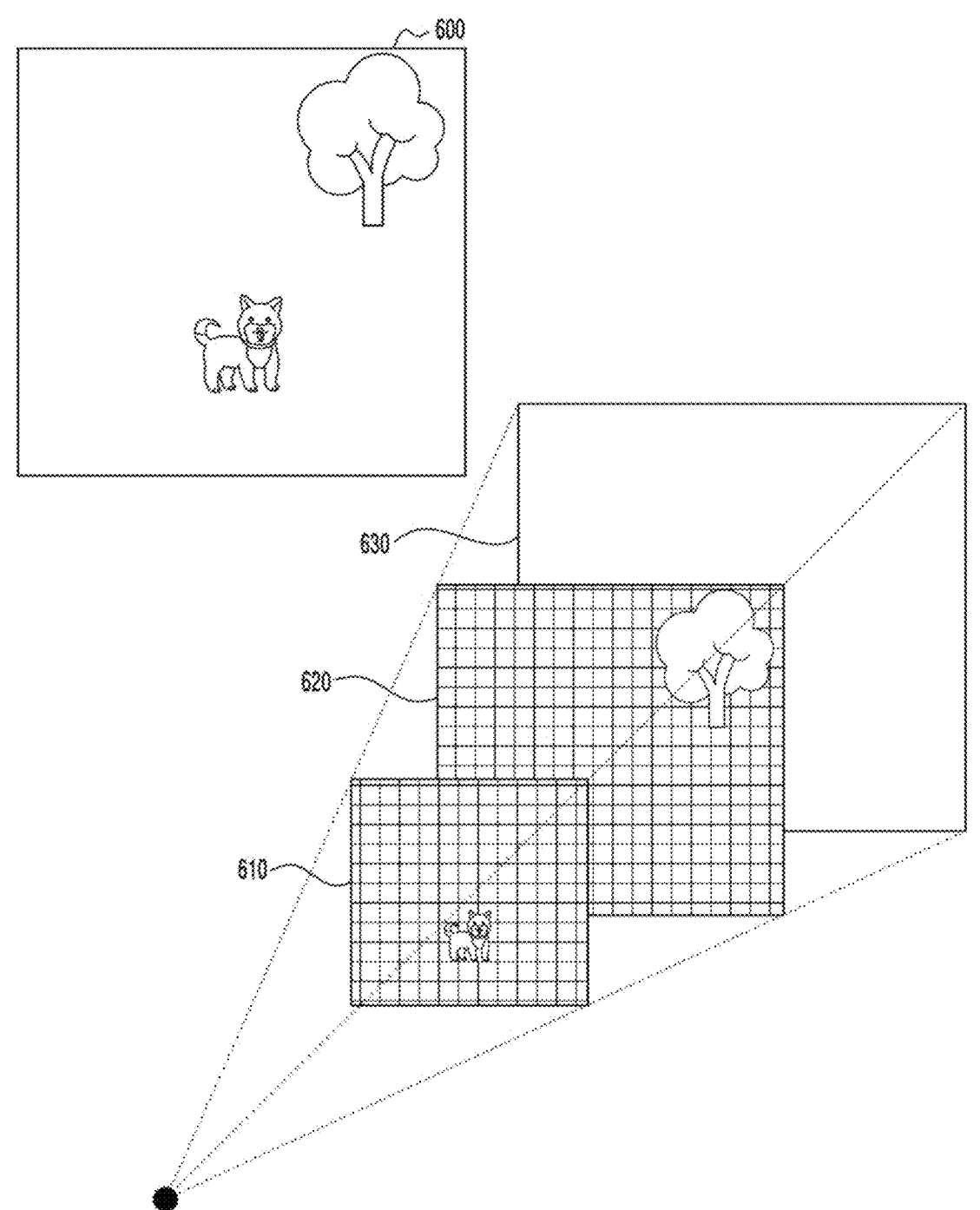
FIG. 6 illustrates an example of a screen displayed via a display assembly of a wearable device.

FIG. 6 illustrates an example of a screen displayed via a display assembly of a wearable device.

Referring to FIG. 6, the at least one processor 200 may display a screen 600 corresponding to an image obtained through one or more cameras 130 of the wearable device 110, via a display assembly 230. For example, the at least one processor 200 may display the screen 600 via the display assembly 230, by using images (e.g., image 610, image 620, image 630).

For example, the at least one processor 200 may obtain an image via the one or more cameras 130. For example, the at least one processor 200 may obtain a depth value of one or more pixels in an image, by using the one or more cameras 130 and/or one or more sensors 240. For example, the at least one processor 200 may cluster depth values of one or more pixels into N clusters. For example, the at least one processor 200 may cluster depth values of one or more pixels into the first portion 541 of pixels, the second portion 542 of pixels, and the third portion 543 of pixels.

For example, the at least one processor 200 may separate an image obtained via the one or more cameras 130 into N (e.g., 3), based on clustering. For example, the at least one processor 200 may quantize an image obtained via the one or more cameras 130 into N (e.g., 3), based on clustering. For example, each of the separated images may include pixels within mapped cluster.

For example, the at least one processor 200 may allocate reference depth information to each of N (e.g., 3) images. For example, the at least one processor 200 may obtain an image 610, an image 620, and an image 630, by allocating reference depth information to each of N images.

For example, the at least one processor 200 may obtain the image 610 using the first portion 541 of pixels in the image. For example, the image 610 may correspond to the bar graph 521-1 of FIG. 5A. For example, the image 610 may be obtained using the first portion 541 of pixels on which depth reprojection has been performed. For example, the image 610 may represent the first portion 541 of pixels among the first portion 541 of pixels, the second portion 542 of pixels, and the third portion 543 of pixels. For example, depth values of the first portion 541 of pixels in the image 610 may be represented as a reference depth value 551.

For example, the at least one processor 200 may obtain the image 620 using the third portion 543 of the pixels. For example, the image 620 may correspond to the bar graph 521-2 of FIG. 5A. For example, the image 620 may be obtained using the third portion 543 of pixels on which depth reprojection has been performed. For example, the image 620 may represent the third portion 543 of pixels, among the first portion 541 of pixels, the second portion 542 of pixels, and the third portion 543 of pixels. For example, depth values of the third portion 543 of pixels in the image 620 may be represented as a reference depth value 552.

For example, the at least one processor 200 may obtain the image 630 using the second portion 542 of the pixels. For example, the image 630 may correspond to the bar graph 530 of FIG. 5A. For example, the image 630 may be obtained using the second portion 542 of pixels on which depth reprojection has been performed. For example, the image 630 may represent the second portion 542 of pixels, among the first portion 541 of pixels, the second portion 542 of pixels, and the third portion 543 of pixels. For example, depth values of the second portion 542 of the pixels in the image 630 may be represented as a predetermined depth value 553.

Figure 7:
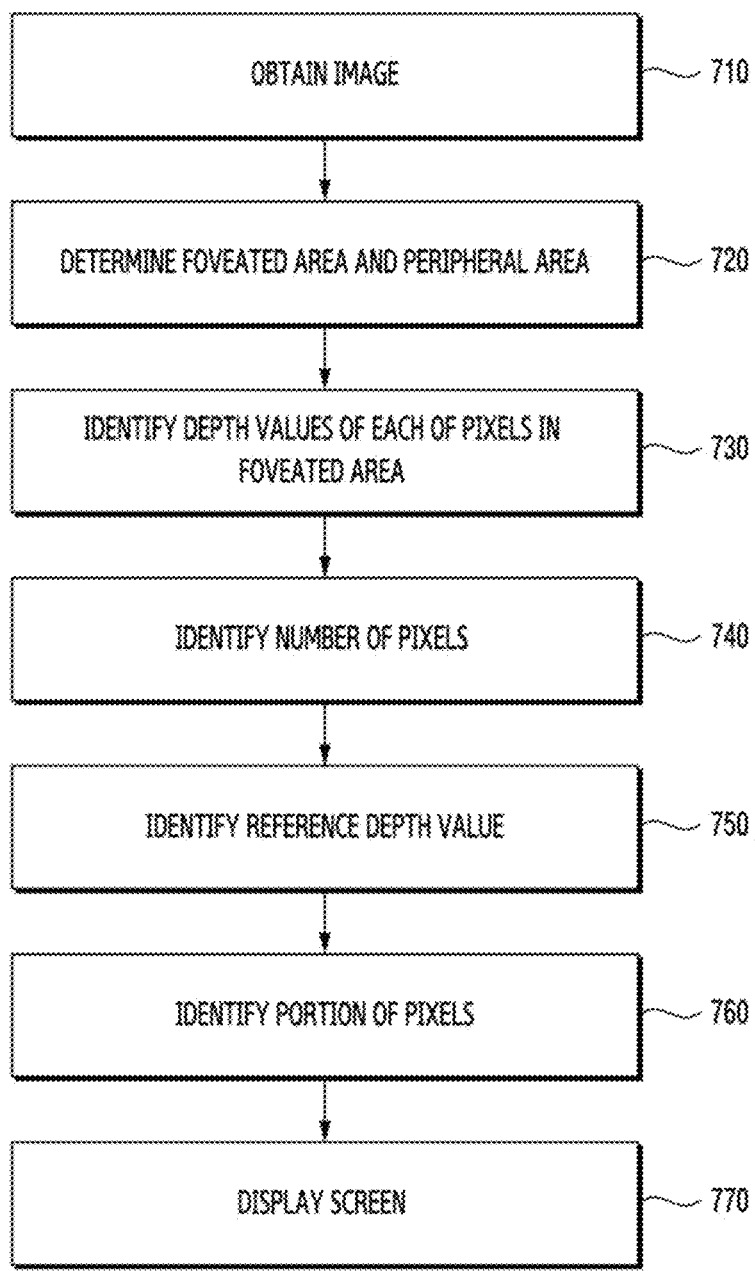
FIG. 7 illustrates an example of operations performed according to a wearable device determining a foveated area and a peripheral area.

FIG. 7 illustrates an example of operations performed according to a wearable device determining a foveated area and a peripheral area.

Referring to FIG. 7, in operation 710, the at least one processor 200 may obtain an image via one or more cameras 130. For example, operation 710 may correspond to operation 310 of FIG. 3.

In operation 720, the at least one processor 200 may determine a foveated area of the image and a peripheral area of the image surrounding the foveated area of the image, by using the eye tracking data obtained using one or more other sensors 250. The foveated area and the peripheral area will be described and exemplified in more detail with reference to FIG. 8.

In operation 730, the at least one processor 200 may identify depth values of each of pixels within a foveated area (e.g., a foveated area 810 of FIG. 8) of the image, by using depth information obtained via the one or more cameras 130 and/or one or more sensors 240. For example, the at least one processor 200 may identify depth values of each of pixels within a foveated area of the image obtained via the one or more cameras 130, by using the obtained depth information. For example, operation 730 may correspond to operation 320 of FIG. 3.

For example, the at least one processor 200 may obtain depth values of each of pixels within a foveated area via the one or more sensors 240. For example, the at least one processor 200 may obtain depth values of each of pixels within the foveated area via a D-ToF sensor (or an I-TOF sensor). For example, the at least one processor 200 may calculate an average value (or a median value) of depth values of each of pixels within the obtained foveated area. For example, the at least one processor 200 may set depth values of each of pixels within the foveated area to the average value (or the median value).

For example, the at least one processor 200 may cause a first partial area included in a near-field area 811 to have depth values corresponding to depth values identified using the D-TOF sensor among the D-TOF sensor and the I-TOF sensor. For example, the first partial area included in a near-field area (e.g., the near-field area 811 of FIG. 8) may include an average value (or median value) of depth values identified using the D-TOF sensor.

For example, the at least one processor 200 may cause a second partial area included in a near-field area to have depth values corresponding to depth values identified using the I-TOF sensor among the D-TOF sensor and the I-TOF sensor. For example, the second partial area included in a near-field area may include an average value (or median value) of depth values identified using the I-TOF sensor.

For example, the at least one processor 200 may set depth values of each of pixels within the foveated area, by using a table stored in the memory 220. For example, the table may be referred to as a pixel mapping look-up table.

In operation 740, the at least one processor 200 may identify the number of one or more pixels having each of the depth values. For example, operation 740 may correspond to operation 330 of FIG. 3.

In operation 750, the at least one processor 200 may identify a reference depth value using a depth value associated with the number corresponding to a peak value among the depth values. For example, operation 750 may correspond to operation 340 of FIG. 3.

In operation 760, the at least one processor 200 may identify a fourth portion of the pixels within the foveated area of the image having depth values within a reference range with respect to the reference depth value. For example, the at least one processor 200 may identify a fifth portion of the pixels within the foveated area of the image different from the fourth portion of the pixels within the foveated area of the image.

As a non-limiting example, the at least one processor 200 may identify a sixth portion of the pixels within the foveated area of the image having depth values within the reference range with respect to the other reference depth value. As a non-limiting example, the at least one processor 200 may identify a seventh portion of the pixels within a near-field area of the image having depth values within a reference range with respect to the reference depth value. For example, operation 760 may correspond to operation 350 of FIG. 3.

In operation 770, the at least one processor 200 may display a screen corresponding to the image via the display assembly 230.

For example, the at least one processor 200 may display a screen corresponding to the image via the display assembly 230, based on setting the depth values of the fourth portion of the pixels within the foveated area of the image to the reference depth value, setting depth values of the fifth portion of the pixels within the foveated area of the image to a first predetermined depth value, and setting depth values of each of pixels within a peripheral area (e.g., a peripheral area 820 of FIG. 8) of the image to a second predetermined depth value.

For example, the first predetermined depth value may include an average value (or a median value) of depth values of the pixels within the foveated area of the image. For example, the first predetermined depth value may be stored as a table within the memory 220.

For example, the second predetermined depth value may include an average value (or a median value) of depth values of the pixels within the peripheral area of the image. For example, the second predetermined depth value may be stored as a stored table within the memory 220.

For example, the at least one processor 200 may display a screen corresponding to the image via the display assembly 230, based on setting the depth values of the fourth portion of the pixels in the foveated area of the image to the reference depth value, setting the depth values of the fifth portion of the pixels in the foveated area of the image to the first predetermined depth value, setting the depth values of the sixth portion of the pixels in the foveated area of the image to the other reference depth value, and setting the depth values of each of the pixels in the peripheral area of the image to the second predetermined depth value.

For example, the foveated area may be an area more important to the user of the wearable device 110 than the peripheral area. For example, the at least one processor 200 may reduce power consumption for setting depth values, by setting the depth values of the fourth portion of the pixels within the foveated area to the reference depth value and setting the depth values of the sixth portion of the pixels within the foveated area to the other reference depth value.

For example, as depth values of a peripheral area are set to a predetermined depth value, the user of the wearable device 110 may not feel uncomfortable. For example, the at least one processor 200 may efficiently perform setting of the depth values by setting the depth values of each of the pixels in the peripheral area to the second predetermined depth value.

For example, the at least one processor 200 may reduce the load amount of data used for setting the depth value, by setting the depth values of each of the pixels within the peripheral area to the second predetermined depth value. For example, the at least one processor 200 may display a screen corresponding to the image via the display assembly 230, faster than calculating a depth value of each of the pixels, by setting the depth values of each of the pixels within the peripheral area 820 to the second predetermined depth value.

In operation 770, as a non-limiting example, the at least one processor 200 may set depth values of an area in a screen corresponding to a seventh portion of the pixels in a near-field area of the image having depth values within a reference range with respect to the reference depth value to depth values corresponding to depth values of the seventh portion of the pixels in the near-field area of the image. For example, the depth values corresponding to the depth values of the seventh portion of the pixels may include depth values in which the depth values of the seventh portion of the pixels obtained via the one or more cameras 130 and/or the one or more sensors 240 are corrected according to a difference between a position of the attached one or more cameras 130 of the wearable device 110 and a position of the user's eyes. For example, the near-field area may be an area more important to the user of the wearable device 110 than other areas. For example, the at least one processor 200 may enhance the user experience of the user of the wearable device 110, by setting depth values of an area within a screen corresponding to the seventh portion of the pixels within the near-field area to depth values corresponding to depth values of the seventh portion of the pixels within a near-field area 811.

For example, the first predetermined depth value may be obtained by using an average value of the depth values of each of pixels within the foveated area of the image. For example, the second predetermined depth value may be obtained by using an average value of the depth values of each of pixels within the peripheral area of the image.

For example, operation 770 may correspond to operation 360 of FIG. 3.

Figure 8:
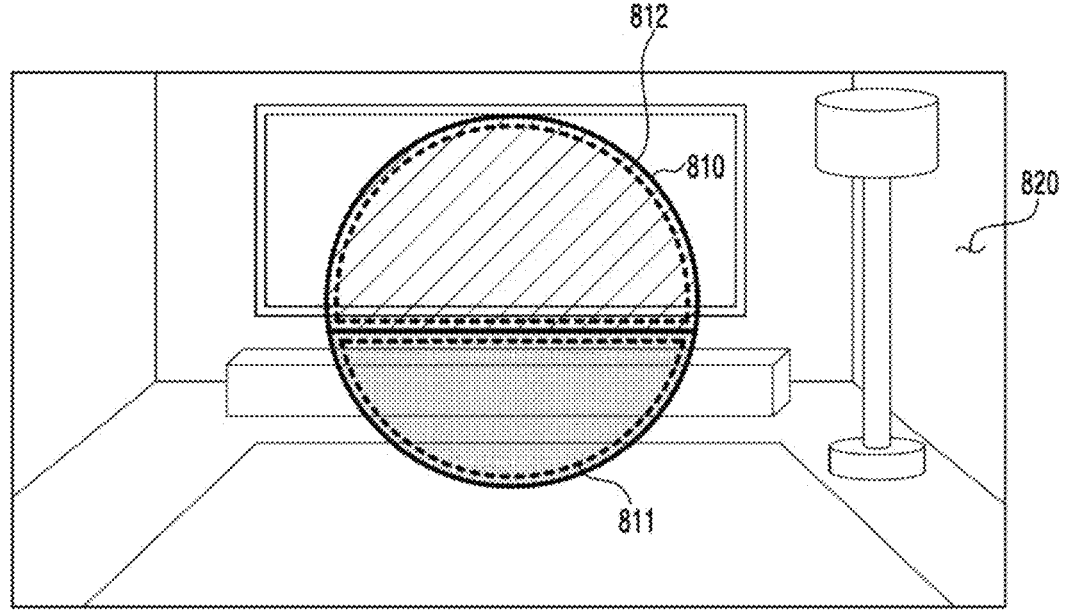
FIG. 8 illustrates an example of a foveated area and a peripheral area of an image, determined using one or more other sensors.

FIG. 8 illustrates an example of a foveated area and a peripheral area of an image, determined using one or more other sensors.

Referring to FIG. 8, the wearable device 110 (e.g., the at least one processor 200) may determine the foveated area 810 of an image obtained via one or more cameras 130 and the peripheral area 820 of the image.

For example, the foveated area 810 may indicate an area recognized or gazed at by fovea centralis vision. For example, the foveated area 810 may be determined based on eye tracking data regarding a gaze of one or more eyes of a user wearing the wearable device 110.

For example, the foveated area 810 may indicate a portion of an image of a screen where the gaze corresponding to fovea centralis vision is located. For example, the foveated area 810 may indicate a portion of an image of a screen that is focused on by a user looking at the image of the screen. For example, the foveated area 810 may be round, as shown in FIG. 8. For example, the foveated area 810 may be rectangular or triangular, unlike as shown in FIG. 8. However, the disclosure is not limited to the above embodiment or example. For example, the foveated area 810 may have a shape corresponding to a shape of an area recognized by fovea centralis vision. The foveated area 810 may be referred to as a central area.

For example, the peripheral area 820 may indicate an area recognized or gazed at by peripheral vision outside a zone gazed at by fovea centralis. For example, the peripheral area 820 may surround the foveated area 810. For example, the peripheral area 820 may indicate a portion of an image of a screen, distinct from the foveated area 810. For example, the peripheral area 820 may indicate a portion of an image of a screen, located outside a gaze corresponding to fovea centralis vision. As a non-limiting example, the peripheral area 820 may indicate a portion of an image of a screen, spaced apart from a position of the gaze by a distance greater than a reference distance. For example, the peripheral area 820 may indicate a portion of an image of a screen that is included in a FOV of a user looking at the image of the screen but is not focused on by the user.

For example, the at least one processor 200 may perform operations 320 to 360 of FIG. 3 on the foveated area 810 among the foveated area 810 of the image obtained via the one or more cameras 130 and the peripheral area 820 of the image.

For example, the foveated area 810 of the image may include a near-field area 811 and a far-field area 812. For example, the near-field area 811 may be described as or may correspond to an area within the foveated area 810 and within the reference range. For example, the far-field area 812 may be described as or may correspond to an area outside the reference range and within the foveated area 810.

Figure 9:
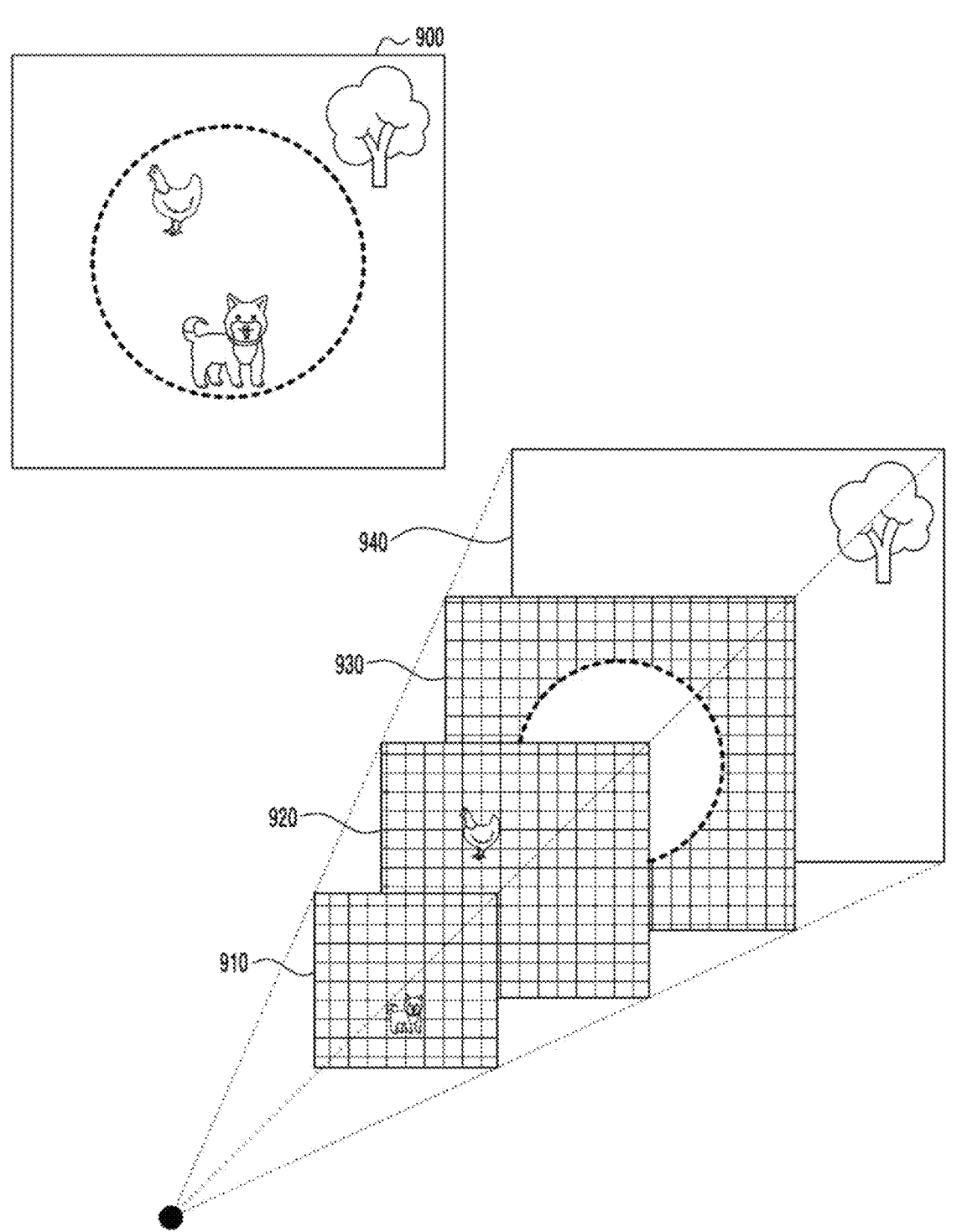
FIG. 9 illustrates an example of a screen displayed via a display assembly according to a wearable device determining a foveated area and a peripheral area.

FIG. 9 illustrates an example of a screen displayed via a display assembly according to a wearable device determining a foveated area and a peripheral area.

Referring to FIG. 9, the at least one processor 200 may display a screen 900 corresponding to an image obtained through one or more cameras 130 of the wearable device 110, via the display assembly 230. For example, the at least one processor 200 may display the screen 900 via the display assembly 230, by using images (e.g., an image 910, an image 920, an image 930, and an image 940).

For example, the at least one processor 200 may obtain an image via the one or more cameras 130. For example, the at least one processor 200 may obtain a depth value of one or more pixels in an image, by using the one or more cameras 130 and/or one or more sensors 240. For example, the at least one processor 200 may determine a foveated area (e.g., the foveated area 810) of the image and a peripheral area (e.g., the peripheral area 820) of the image, by using the eye tracking data obtained using one or more other sensors 250. For example, the at least one processor 200 may cluster depth values of one or more pixels in the foveated area 810 into N clusters.

For example, the at least one processor 200 may divide an image obtained via the one or more cameras 130 into N (e.g., four (4)), based on clustering. For example, the at least one processor 200 may quantize an image obtained via the one or more cameras 130 into N (e.g., four (4)), based on clustering.

For example, the at least one processor 200 may create a histogram by using depth values of one or more pixels within the foveated area 810. For example, the histogram may indicate a relationship between depth values of one or more pixels within the foveated area 810 and the number of one or more pixels within the foveated area 810. For example, the at least one processor 200 may cluster pixels within the foveated area 810 using the histogram. For example, the at least one processor 200 may cluster pixels within the peripheral area 820.

For example, the at least one processor 200 may obtain an image 910, by using a fourth portion of pixels within the foveated area 810. For example, the at least one processor 200 may set depth values of pixels within the image 910 to a depth value corresponding to a peak value in the histogram. For example, the at least one processor 200 may change depth values of pixels within the image 910 to a depth value corresponding to a peak value in the histogram.

For example, the at least one processor 200 may obtain an image 920, by using a sixth portion of pixels within the foveated area 810. For example, the at least one processor 200 may set depth values of pixels within the image 920 to a depth value corresponding to another peak value in the histogram. For example, the at least one processor 200 may change depth values of pixels within the image 920 to a depth value corresponding to another peak value in the histogram.

For example, the at least one processor 200 may obtain an image 930, by using a fifth portion of pixels within the foveated area 810. For example, the at least one processor 200 may set depth values of pixels within the image 930 to an average value (or median value) of depth values within the foveated area 810. For example, the at least one processor 200 may change depth values of pixels within the image 920 to an average value (or median value) of depth values within the foveated area 810.

For example, the image 940 may represent pixels within the peripheral area 820. For example, depth values of pixels within the image 940 may be set to an average value (or a median value) of depth values of pixels within the peripheral area 820. For example, depth values of pixels within the image 940 may be changed to an average value (or a median value) of depth values of pixels within the peripheral area 820. For example, the at least one processor 200 may represent the image 940 using pixels within the peripheral area 820.

Figure 10:
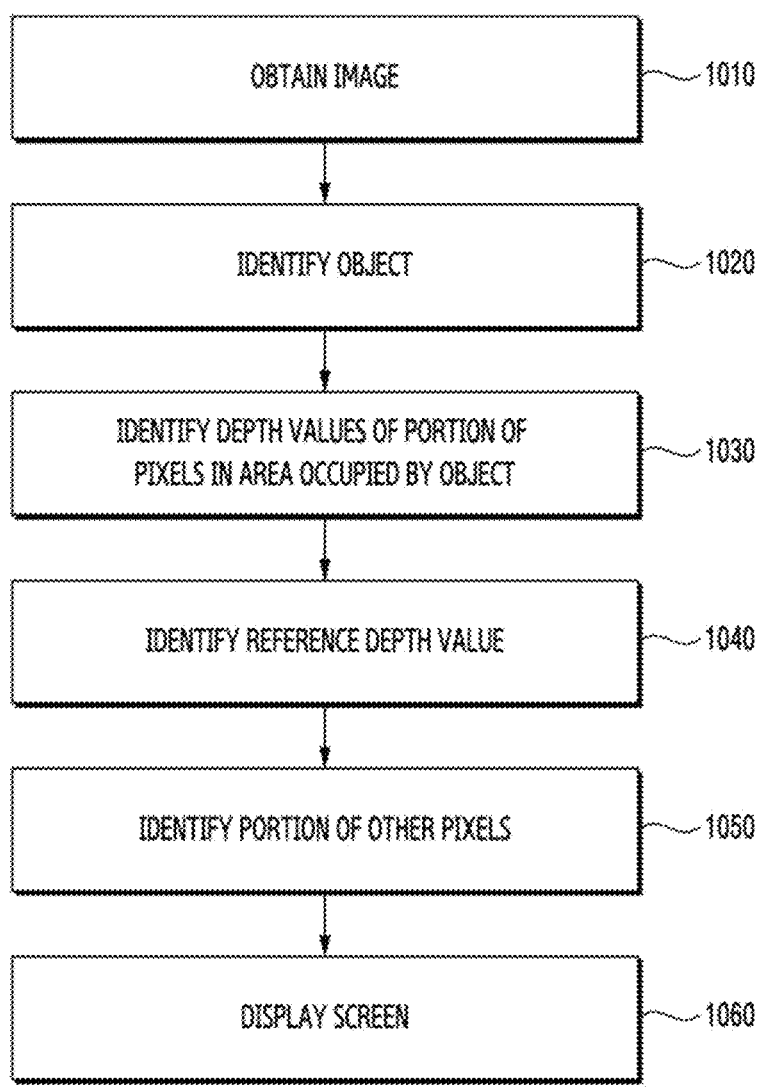
FIG. 10 illustrates an example of operations performed according to a wearable device identifying an object.

FIG. 10 illustrates an example of operations performed according to a wearable device identifying an object.

Referring to FIG. 10, in operation 1010, the wearable device 110 (e.g., the at least one processor 200) may obtain an image via one or more cameras 130. For example, operation 1010 may correspond to operation 310 of FIG. 3.

In operation 1020, the at least one processor 200 may identify an object within the image. For example, the at least one processor 200 may identify an object within the image, by using a model trained through machine learning in the wearable device 110.

For example, the at least one processor 200 may identify an object within the image, by using a network including a convolutional neural network (CNN) structure in the wearable device 110. For example, the at least one processor 200 may identify an object (e.g., object 1110 and object 1120 of FIG. 11), by providing (or inputting) an image (e.g., image 1100 of FIG. 11) to an object segmentation model in the wearable device 110. For example, the object segmentation model may be configured to identify an object within an image. However, the disclosure is not limited to the above embodiment or example. Identifying the object will be described and exemplified in more detail with reference to FIG. 11.

In operation 1030, the at least one processor 200 may identify depth values of an eighth portion of pixels within an area (e.g., an area 1140 of FIG. 11) within the image occupied by an object (e.g., object 1110 of FIG. 11), by using depth information obtained via the one or more cameras 130 and/or one or more sensors 240. As a non-limiting example, the at least one processor 200 may identify depth values of a ninth portion of the pixels within an area (e.g., area 1150) within the image occupied by another object (e.g., object 1120 of FIG. 11) using depth information.

In operation 1040, the at least one processor 200 may identify a first reference depth value, by using at least a portion of the depth values of the eighth portion of the pixels. As a non-limiting example, the at least one processor 200 may identify a second reference depth value, by using the depth values of the ninth portion of the pixels.

For example, the first reference depth value may correspond to an average value of the depth values of the eighth portion of the pixels. For example, the first reference depth value may correspond to a median value of the depth values of the eighth portion of the pixels. For example, the second reference depth value may correspond to an average value of the depth values of the ninth portion of the pixels. For example, the second reference depth value may correspond to a median value of the depth values of the ninth portion of the pixels. For example, the at least one processor 200 may identify the second reference depth value, by using at least a portion of the depth values of the ninth portion of the pixels and a difference between a position of the one or more attached cameras 130 of the wearable device 110 and a position of eyes of a user wearing the wearable device 110.

For example, the at least one processor 200 may perform operations 320 to 360 of FIG. 3 on an area (e.g., the area 1140 and the area 1150) within the image occupied by the object.

In operation 1050, the at least one processor 200 may identify a tenth portion of the pixels different from the eighth portion of the pixels. As a non-limiting example, the tenth portion of the pixels may be different from the eighth portion of the pixels and the ninth portion of the pixels.

In operation 1060, the at least one processor 200 may display a screen corresponding to the image via the display assembly 230, based on setting the depth values of the eighth portion of the pixels to the first reference depth value and setting the depth values of the tenth portion of the pixels to a predetermined depth value.

As a non-limiting example, the at least one processor 200 may display a screen corresponding to the image via the display assembly 230, based on setting the depth values of the eighth portion of the pixels to the first reference depth value, setting the depth values of the tenth portion of the pixels to the predetermined depth value, and setting the depth values of the ninth portion of the pixels to the second reference depth value.

For example, an area within the image occupied by the object may be an area more important to the user of the wearable device 110 than an area within the image not occupied by the object. For example, the at least one processor 200 may reduce power consumption for setting depth values, by setting the depth values of the eighth portion of the pixels to the first reference depth value, setting the depth values of the tenth portion of the pixels to the predetermined depth value, and setting the depth values of the ninth portion of the pixels to the second reference depth value.

For example, the at least one processor 200 may display a screen corresponding to the image via the display assembly 230, faster than calculating a depth value of each of the pixels, by setting the depth values of the eighth portion of the pixels to the first reference depth value, setting the depth values of the tenth portion of the pixels to the predetermined depth value, and setting the depth values of the ninth portion of the pixels to the second reference depth value.

Figure 11:
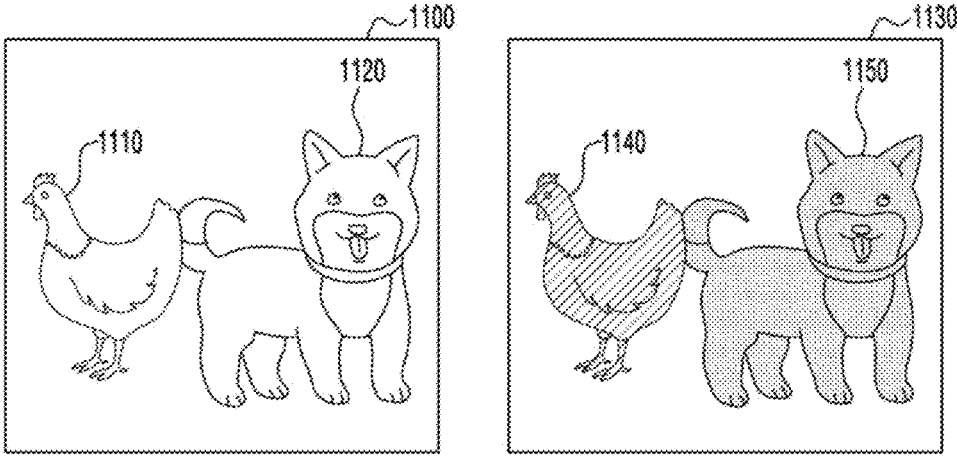
FIG. 11 illustrates an example of an operation of identifying an object in an image.

FIG. 11 illustrates an example of an operation of identifying an object in an image.

Referring to FIG. 11, an image 1100 may include an object 1110 and an object 1120. For example, at least one processor 200 may identify the object 1110 within an image 1100. For example, the at least one processor 200 may identify the object 1110, by providing (or inputting) the image 1100 to an object segmentation model within the wearable device 110. For example, the object segmentation model may be configured to identify an object within an image. For example, identifying the object 1110 within the image 1100 by the at least one processor 200 may be referred to as object segmentation.

For example, the at least one processor 200 may identify the object 1110, by providing (or inputting) the image 1100 to an object segmentation model within the wearable device 110. For example, the at least one processor 200 may distinguish the area 1140 occupied by the object 1110 within an image 1130, by identifying the object 1110 using the object segmentation model.

For example, the at least one processor 200 may identify the object 1120, by providing (or inputting) the image 1100 to the object segmentation model within the wearable device 110. For example, the at least one processor 200 may identify an area 1150 occupied by the object 1120 within the image 1130, by identifying the object 1120 using the object segmentation model.

For example, the at least one processor 200 may distinguish the area 1140 and the area 1150 within the image 1130, by providing (or inputting) the image 1100 to the object segmentation model.

For example, the object 1120 within the image 1100 may have continuous depth information. For example, depth values of the area 1150 within the image 1130 may be continuous. For example, the at least one processor 200 may create a histogram indicating a relationship between a size of a depth value of the area 1150 and the number of one or more pixels within the area 1150. For example, the histogram may indicate a frequency of depth values of the area 1150.

For example, the at least one processor 200 may cluster one or more pixels within the area 1150 using the histogram. For example, the at least one processor 200 may map a reference depth value to each of clusters. For example, the reference depth value may be represented as a predetermined value. For example, the reference depth value may be adaptively set.

For example, the reference depth value may include a median value of depth values within the area 1150. For example, the reference depth value may include an average value of depth values within the area 1150. For example, the reference depth value may be calculated by using a histogram indicating a relationship between a size of depth values of one or more pixels within the area 1150 and the number of one or more pixels within area 1150. For example, the reference depth value may include a depth value corresponding to a peak value in the histogram.

Figure 12:
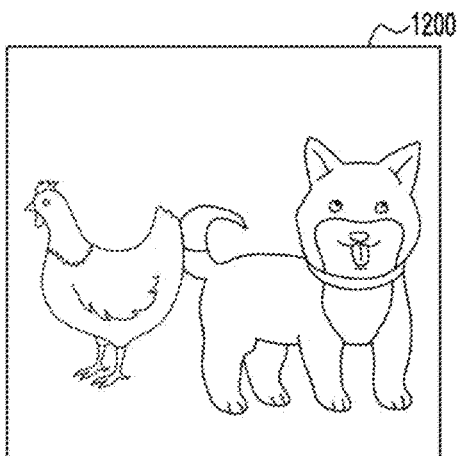
FIG. 12 illustrates an example of a screen displayed via a display assembly according to a wearable device identifying an object.
Figure 12:
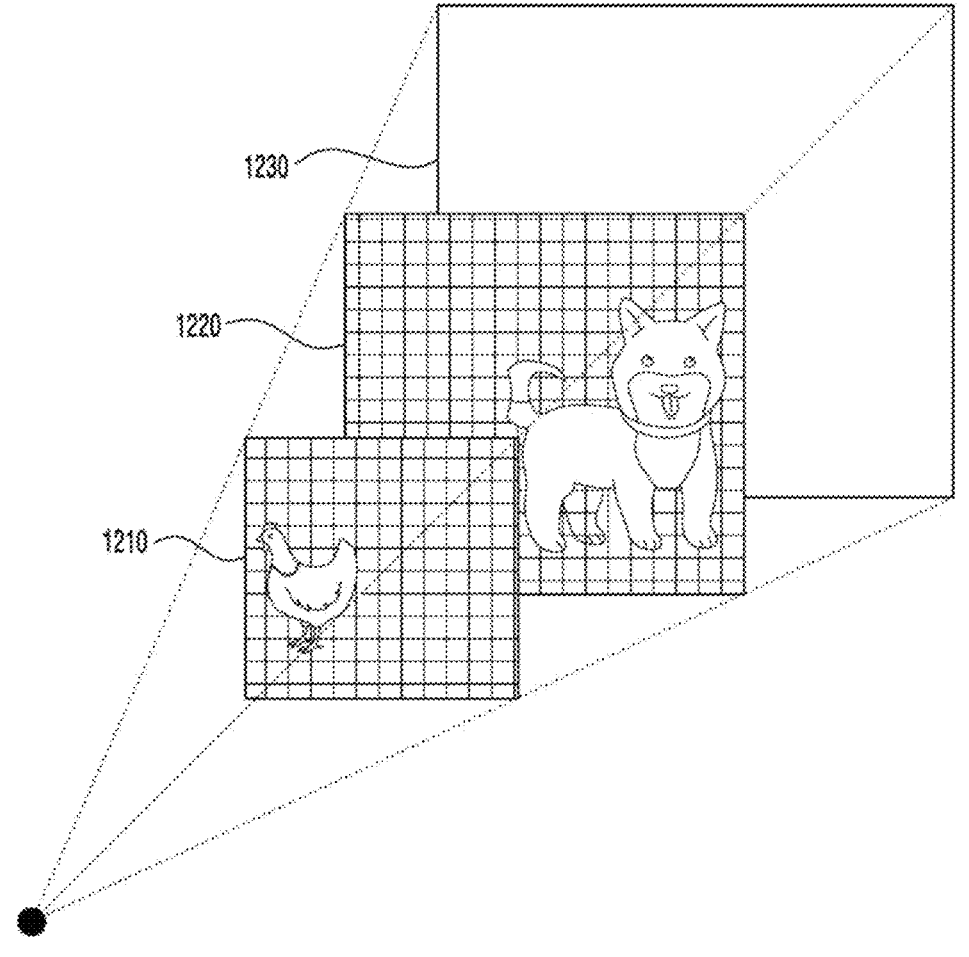

FIG. 12 illustrates an example of a screen displayed via a display assembly according to a wearable device identifying an object.

Referring to FIG. 12, at least one processor 200 may display a screen 1200 corresponding to an image obtained through one or more cameras 130 of the wearable device 110, via a display assembly 230. For example, the at least one processor 200 may display the screen 1200 via the display assembly 230, by using images (e.g., image 1210, image 1220, and image 1230).

For example, the at least one processor 200 may obtain an image (e.g., image 1100) obtained via the one or more cameras 130. For example, the at least one processor 200 may obtain an image 1130 including the area 1140 and the area 1150, by providing (or inputting) the image 1100 to an object segmentation model. For example, in the image 1130, the area 1140 and the area 1150 may be distinguished.

For example, the at least one processor 200 may obtain a depth value of one or more pixels within an area (e.g., the area 1140 and the area 1150), by using the one or more cameras 130 and/or one or more sensors 240. For example, the at least one processor 200 may cluster one or more pixels within the image 1100 according to the area within the image 1100.

For example, pixels within the area 1140 may be represented as an eighth portion of pixels. For example, pixels within the area 1150 may be represented as a ninth portion of pixels. For example, pixels within an area distinguished from the area 1140 and the area 1150 in the image 1100 may be represented as a tenth portion of the pixels. For example, the tenth portion of the pixels may be described as or may correspond to an area that is not occupied by an object in the image 1100.

For example, the at least one processor 200 may separate the image 1100 obtained via the one or more cameras 130. For example, the at least one processor 200 may allocate reference depth information to each of separated images. For example, the at least one processor 200 may obtain an image 1210, an image 1220, and an image 1230, by allocating reference depth information to each of the images.

For example, the at least one processor 200 may obtain the image 1210 using an eighth portion of the pixels in the image. For example, the image 1210 may indicate the eighth portion of the pixels, among the eighth portion of the pixels, a ninth portion of the pixels, and a tenth portion of the pixels. For example, a reference depth value allocated to the image 1210 may include an average value (or a median value) of the eighth portion of the pixels.

For example, the at least one processor 200 may obtain the image 1220 using the ninth portion of the pixels. For example, the image 1220 may indicate the ninth portion of the pixels, among the eighth portion of the pixels, the ninth portion of the pixels, and the tenth portion of the pixels. For example, a reference depth value allocated to the image 1220 may include an average value (or a median value) of the ninth portion of the pixels.

For example, the at least one processor 200 may obtain the image 1230 using the tenth portion of the pixels. For example, the image 1230 may indicate the tenth portion of the pixels, among the eighth portion of the pixels, the ninth portion of the pixels, and the tenth portion of the pixels. For example, a reference depth value allocated to the image 1230 may include an average value (or a median value) of the tenth portion of the pixels.

For example, the object 1120 within the image 1100 may have continuous depth information. For example, depth values of the area 1150 within the image 1130 may be continuous. For example, the at least one processor 200 may perform the operations of FIG. 3 on the ninth portion of the pixels having continuous depth values. For example, the at least one processor 200 may cluster the ninth portion of the pixels having continuous depth values. For example, the at least one processor 200 may separate the image 1220 into N, based on clustering. For example, the at least one processor 200 may allocate reference depth information to each of the N images.

Figure 13:
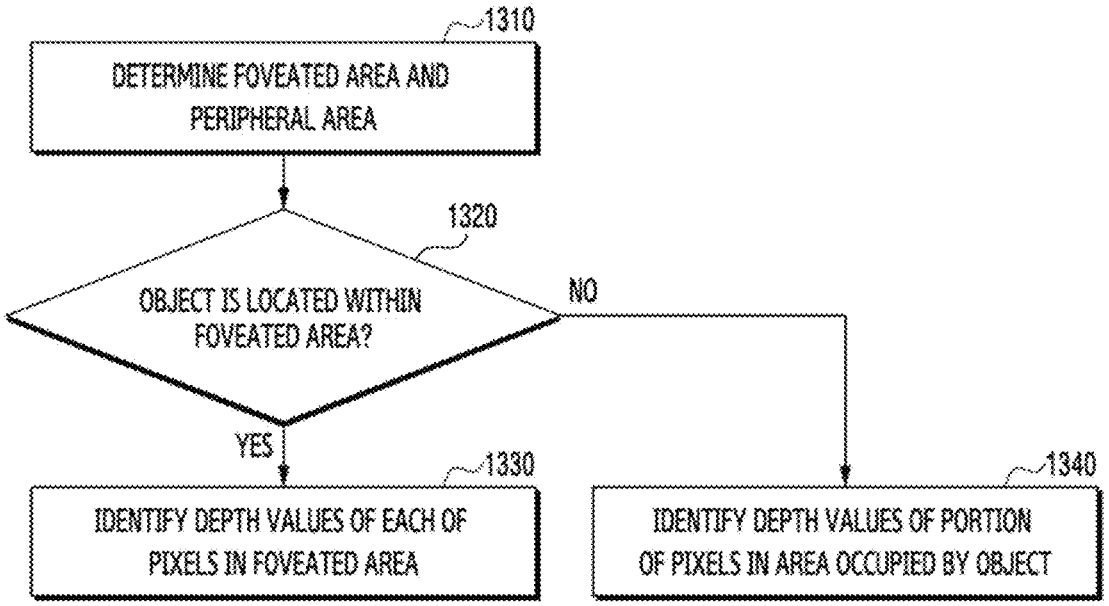
FIG. 13 illustrates an example of operations performed according to whether an object is located within a foveated area in a wearable device.

FIG. 13 illustrates an example of operations performed according to whether an object is located within a foveated area in a wearable device.

Referring to FIG. 13, in operation 1310, the wearable device 110 (e.g., the at least one processor 200) may determine the foveated area 810 of an image and the peripheral area 820 of the image surrounding the foveated area 810 of the image, by using the eye tracking data obtained using one or more other sensors 250. For example, operation 1310 of FIG. 13 may correspond to operation 720 of FIG. 7.

In operation 1320, the at least one processor 200 may identify whether an object in an image is located within the foveated area 810. For example, the at least one processor 200 may execute operation 1330, based on identifying that the object within the image is located within the foveated area 810. For example, the at least one processor 200 may execute operation 1340, based on identifying that at least a portion of the object within the image is located within the peripheral area 820 in the image. For example, the at least one processor 200 may execute operation 1340, based on identifying that at least a portion of the object in the image is contacted to a boundary between the foveated area 810 in the image and the peripheral area 820 in the image.

In operation 1330, the at least one processor 200 may identify depth values of each of pixels in the foveated area 810, based on identifying that the object in the image is located within the foveated area 810. For example, operation 1330 may correspond to operation 730 of FIG. 7. For example, the at least one processor 200 may perform operations 740 to 770 of FIG. 7 after performing operation 1330.

In operation 1340, the at least one processor 200 may identify depth values of pixels in an area (e.g., the area 1140 and the area 1150) in the image occupied by the object by using depth information obtained via the one or more cameras 130 and/or the one or more sensors 240, based on identifying that at least a portion of the object in the image is located within the peripheral area 820 in the image. For example, operation 1340 may correspond to operation 1030 of FIG. 10. For example, the at least one processor 200 may perform operations 1040 to 1060 of FIG. 10 after performing operation 1340.

For example, the at least one processor 200 may identify depth values of pixels in an area (e.g., the area 1140 and the area 1150) within the image occupied by the object by using depth information obtained via the one or more cameras 130 and/or the one or more sensors 240, based on identifying that at least a portion of the object in the image is contacted to a boundary between the foveated area 810 in the image and the peripheral area 820 in the image.

For example, the at least one processor 200 may preferentially consider an object in the image over the foveated area 810 in the image. For example, the at least one processor 200 may reduce the user's sense of dissonance by preferentially considering an object in the image over the foveated area 810 in the image.

Figure 14:
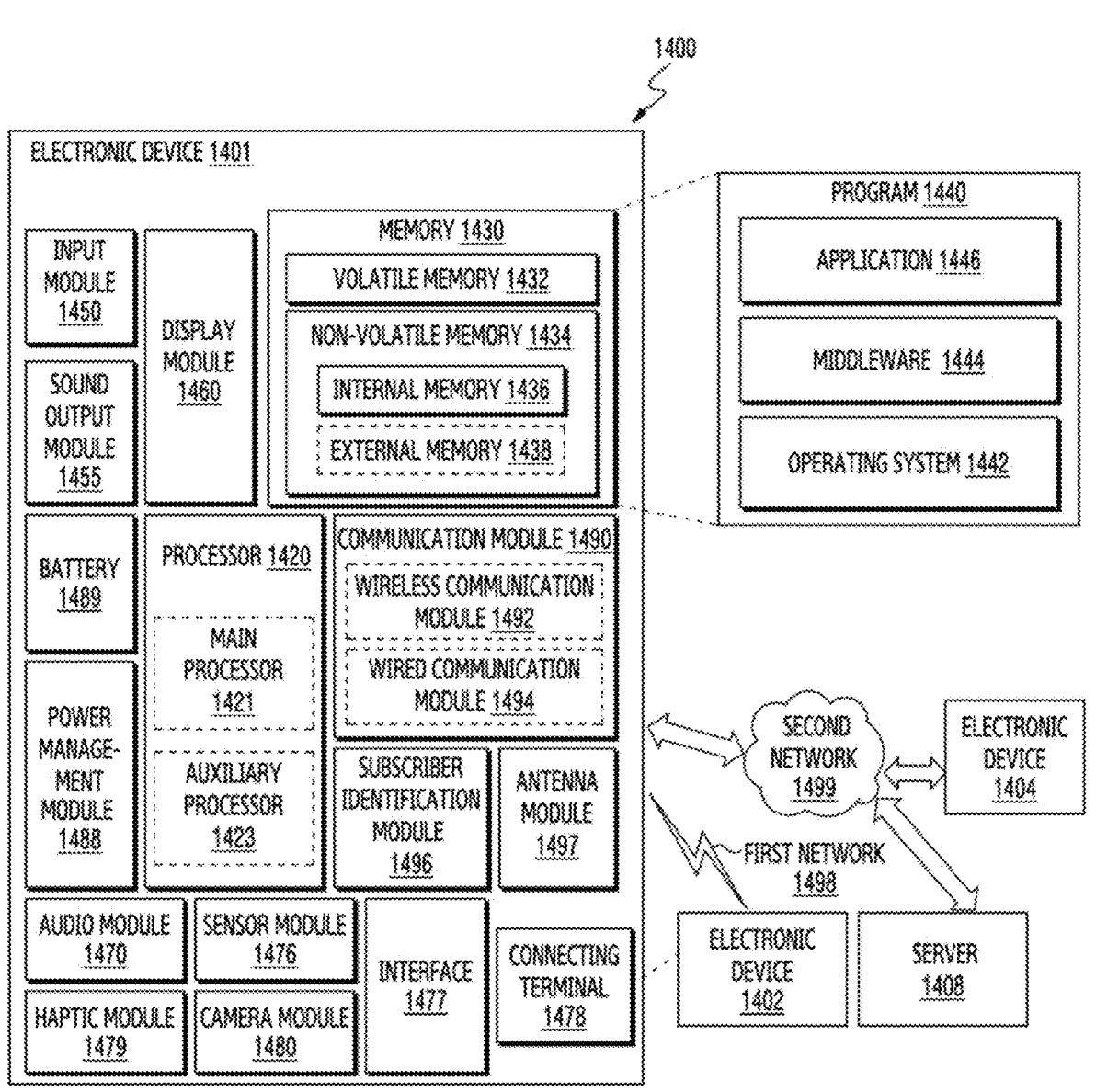
FIG. 14 is a block diagram of an electronic device in a network environment according to one or more embodiments.

FIG. 14 is a block diagram of an electronic device in a network environment according to one or more embodiments.

In FIG. 14, an electronic device 1401 may include the wearable device 110. Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to an embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, an HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 1464 dB or less) for implementing mMTC, or U-plane latency (e.g., 0.5 ms or less for each of downlink (DL) and uplink (UL), or a round trip of 14 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to one or more embodiments, the antenna module 1497 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or health-care) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 15A:
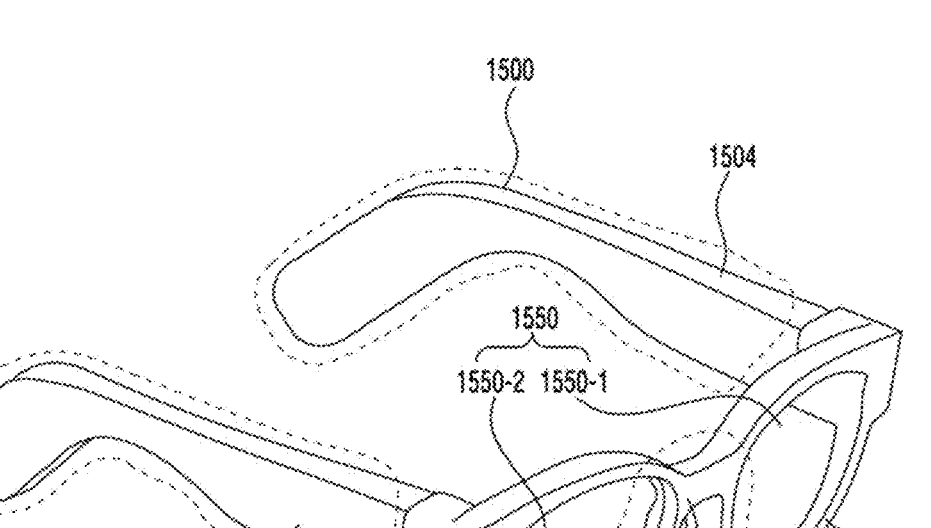
FIG. 15A illustrates an example of a perspective view of a wearable device.
Figure 15B:
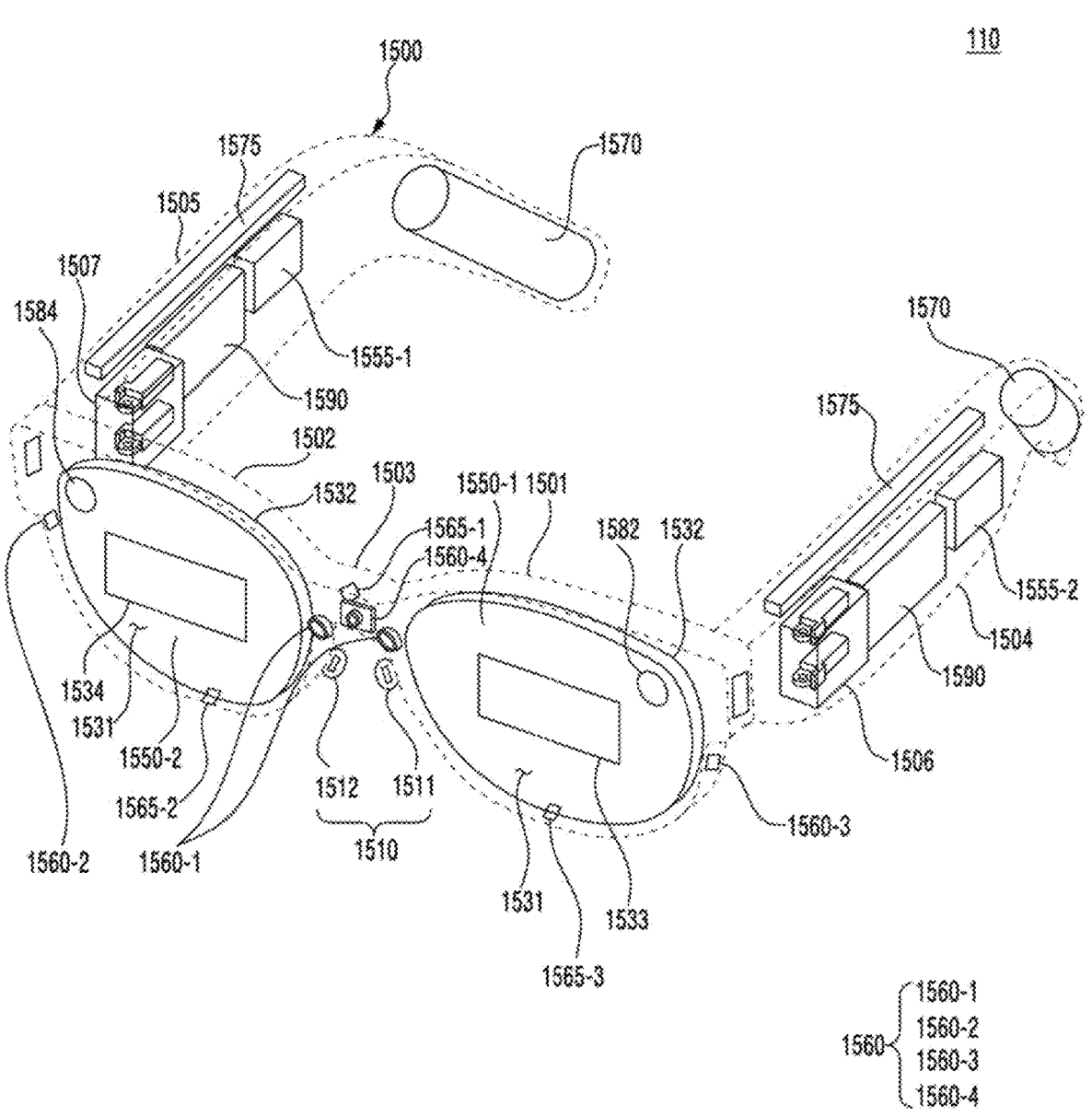
FIG. 15B illustrates an example of one or more hardware disposed in a wearable device.

FIG. 15A illustrates an example of a perspective view of a wearable device. FIG. 15B illustrates an example of one or more hardware disposed in a wearable device. According to an embodiment, the wearable device 110 may have a shape of glasses wearable on a user's body part (e.g., head). The wearable device 110 of FIGS. 15A to 15B may be an example of the wearable device 110 of FIG. 1A. The wearable device 110 may include a head-mounted display (HMD). For example, a housing of the wearable device 110 may include a flexible material such as rubber and/or silicone, having a shape to fit closely to a portion (e.g., a portion of the face surrounding both eyes) of the user's head. For example, the housing of the wearable device 110 may include one or more straps able to be twined around the user's head, and/or one or more temples attachable to an ear of the head.

Referring to FIG. 15A, according to an embodiment, the wearable device 110 may include at least one display 1550 and a frame 1500 supporting the at least one display 1550.

According to an embodiment, the wearable device 110 may be wearable on a portion of the user's body. The wearable device 110 may provide augmented reality (AR), virtual reality (VR), or mixed reality (MR) combining the augmented reality and the virtual reality to a user wearing the wearable device 110. For example, the wearable device 110 may display a virtual reality image provided from at least one optical device 1582 and 1584 of FIG. 15B on at least one display 1550, in response to a user's preset gesture obtained through a motion recognition camera 1560-2 and 1560-3 of FIG. 15B.

According to an embodiment, the at least one display 1550 may provide visual information to a user. For example, the at least one display 1550 may include a transparent or translucent lens. The at least one display 1550 may include a first display 1550-1 and/or a second display 1550-2 spaced apart from the first display 1550-1. For example, the first display 1550-1 and the second display 1550-2 may be disposed at positions corresponding to the user's left and right eyes, respectively.

Referring to FIG. 15B, the at least one display 1550 may provide visual information transmitted through a lens included in at least one display 1550 from ambient light to a user and other visual information distinguished from the visual information. The lens may be formed based on at least one of a fresnel lens, a pancake lens, or a multi-channel lens. For example, the at least one display 1550 may include a first surface 1531 and a second surface 1532 opposite to the first surface 1531. A display area may be formed on the second surface 1532 of at least one display 1550. When the user wears the wearable device 110, ambient light may be transmitted to the user by being incident on the first surface 1531 and being penetrated through the second surface 1532. For another example, the at least one display 1550 may display an augmented reality image in which a virtual reality image provided by the at least one optical device 1582 and 1584 is combined with a reality screen transmitted through ambient light, on a display area formed on the second surface 1532.

According to an embodiment, the at least one display 1550 may include at least one waveguide 1533 and 1534 that transmits light transmitted from the at least one optical device 1582 and 1584 by diffracting to the user. The at least one waveguide 1533 and 1534 may be formed based on at least one of glass, plastic, or polymer. A nano pattern may be formed on at least a portion of the outside or inside of the at least one waveguide 1533 and 1534. The nano pattern may be formed based on a grating structure having a polygonal or curved shape. Light incident to an end of the at least one waveguide 1533 and 1534 may be propagated to another end of the at least one waveguide 1533 and 1534 by the nano pattern. The at least one waveguide 1533 and 1534 may include at least one of at least one diffraction element (e.g., a diffractive optical element (DOE), a holographic optical element (HOE)), and a reflection element (e.g., a reflection mirror). For example, the at least one waveguide 1533 and 1534 may be disposed in the wearable device 110 to guide a screen displayed by the at least one display 1550 to the user's eyes. For example, the screen may be transmitted to the user's eyes based on total internal reflection (TIR) generated in the at least one waveguide 1533 and 1534.

The wearable device 110 may analyze an object included in a real image collected through a photographing camera 1560-4, combine with a virtual object corresponding to an object that become a subject of augmented reality provision among the analyzed object, and display on the at least one display 1550. The virtual object may include at least one of text and images for various information associated with the object included in the real image. The wearable device 110 may analyze the object based on a multi-camera such as a stereo camera. For the object analysis, the wearable device 110 may execute space recognition (e.g., simultaneous localization and mapping (SLAM)) using the multi-camera and/or time-of-flight (ToF). The user wearing the wearable device 110 may watch an image displayed on the at least one display 1550.

According to an embodiment, a frame 1500 may be configured with a physical structure in which the wearable device 110 may be worn on the user's body. According to an embodiment, the frame 1500 may be configured so that when the user wears the wearable device 110, the first display 1550-1 and the second display 1550-2 may be positioned corresponding to the user's left and right eyes. The frame 1500 may support the at least one display 1550. For example, the frame 1500 may support the first display 1550-1 and the second display 1550-2 to be positioned at positions corresponding to the user's left and right eyes.

Referring to FIG. 15A, according to an embodiment, the frame 1500 may include an area 1520 at least partially in contact with the portion of the user's body in a case that the user wears the wearable device 110. For example, the area 1520 of the frame 1500 in contact with the portion of the user's body may include an area in contact with a portion of the user's nose, a portion of the user's ear, and a portion of the side of the user's face that the wearable device 110 contacts. According to an embodiment, the frame 1500 may include a nose pad 1510 that is contacted on the portion of the user's body. When the wearable device 110 is worn by the user, the nose pad 1510 may be contacted on the portion of the user's nose. The frame 1500 may include a first temple 1504 and a second temple 1505, which are contacted on another portion of the user's body that is distinct from the portion of the user's body.

For example, the frame 1500 may include a first rim 1501 surrounding at least a portion of the first display 1550-1, a second rim 1502 surrounding at least a portion of the second display 1550-2, a bridge 1503 disposed between the first rim 1501 and the second rim 1502, a first pad 1511 disposed along a portion of the edge of the first rim 1501 from one end of the bridge 1503, a second pad 1512 disposed along a portion of the edge of the second rim 1502 from the other end of the bridge 1503, the first temple 1504 extending from the first rim 1501 and fixed to a portion of the wearer's ear, and the second temple 1505 extending from the second rim

1502 and fixed to a portion of the ear opposite to the ear. The first pad 1511 and the second pad 1512 may be in contact with the portion of the user's nose, and the first temple 1504 and the second temple 1505 may be in contact with a portion of the user's face and the portion of the user's ear. The temples 1504 and 1505 may be rotatably connected to the rim through hinge units 1506 and 1507 of FIG. 15B. The first temple 1504 may be rotatably connected with respect to the first rim 1501 through the first hinge unit 1506 disposed between the first rim 1501 and the first temple 1504. The second temple 1505 may be rotatably connected with respect to the second rim 1502 through the second hinge unit 1507 disposed between the second rim 1502 and the second temple 1505. According to an embodiment, the wearable device 110 may identify an external object (e.g., a user's fingertip) touching the frame 1500 and/or a gesture performed by the external object by using a touch sensor, a grip sensor, and/or a proximity sensor formed on at least a portion of the surface of the frame 1500.

According to an embodiment, the wearable device 110 may include hardware (e.g., hardware to be described later, based on a block diagram of FIG. 17) that performs various functions. For example, the hardware may include a battery module 1570, an antenna module 1575, the at least one optical device 1582 and 1584, speakers (e.g., speakers 1555-1 and 1555-2), a microphone (e.g., microphones 1565-1, 1565-2, and 1565-3), a light emitting module, and/or a printed circuit board (PCB) 1590. Various hardware may be disposed in the frame 1500.

According to an embodiment, the microphone (e.g., the microphones 1565-1, 1565-2, and 1565-3) of the wearable device 110 may obtain a sound signal, by being disposed on at least a portion of the frame 1500. The first microphone 1565-1 disposed on the bridge 1503, the second microphone 1565-2 disposed on the second rim 1502, and the third microphone 1565-3 disposed on the first rim 1501 are illustrated in FIG. 15B, but the number and disposition of the microphone 1565 are not limited to an embodiment of FIG. 15B. In a case that the number of the microphone 1565 included in the wearable device 110 is two or more, the wearable device 110 may identify a direction of the sound signal by using a plurality of microphones disposed on different portions of the frame 1500.

According to an embodiment, the at least one optical device 1582 and 1584 may project a virtual object on the at least one display 1550 in order to provide various image information to the user. For example, the at least one optical device 1582 and 1584 may be a projector. The at least one optical device 1582 and 1584 may be disposed adjacent to the at least one display 1550 or may be included in the at least one display 1550 as a portion of the at least one display 1550. According to an embodiment, the wearable device 110 may include a first optical device 1582 corresponding to the first display 1550-1, and a second optical device 1584 corresponding to the second display 1550-2. For example, the at least one optical device 1582 and 1584 may include the first optical device 1582 disposed at a periphery of the first display 1550-1 and the second optical device 1584 disposed at a periphery of the second display 1550-2. The first optical device 1582 may transmit light to the first waveguide 1533 disposed on the first display 1550-1, and the second optical device 1584 may transmit light to the second waveguide 1534 disposed on the second display 1550-2.

In an embodiment, a camera 1560 may include the photographing camera 1560-4, an eye tracking camera (ET CAM) 1560-1, and/or the motion recognition camera 1560-2 and 1560-3. The photographing camera 1560-4, the eye tracking camera 1560-1, and the motion recognition camera 1560-2 and 1560-3 may be disposed at different positions on the frame 1500 and may perform different functions. The eye tracking camera 1560-1 may output data indicating a position of eye or a gaze of the user wearing the wearable device 110. For example, the wearable device 110 may detect the gaze from an image including the user's pupil obtained through the eye tracking camera 1560-1. The wearable device 110 may identify an object (e.g., a real object, and/or a virtual object) focused by the user, by using the user's gaze obtained through the eye tracking camera 1560-1. The wearable device 110 identifying the focused object may execute a function (e.g., gaze interaction) for interaction between the user and the focused object. The wearable device 110 may represent a portion corresponding to eye of an avatar indicating the user in the virtual space, by using the user's gaze obtained through the eye tracking camera 1560-1. The wearable device 110 may render an image (or a screen) displayed on the at least one display 1550, based on the position of the user's eye. For example, visual quality (e.g., resolution, brightness, saturation, gray-scale, and pixels per inch (PPI)) of a first area related to the gaze within the image and visual quality of a second area distinguished from the first area may be different. The wearable device 110 may obtain an image having the visual quality of the first area matching the user's gaze and the visual quality of the second area by using foveated render-ing. For example, when the wearable device 110 supports an iris recognition function, user authentication may be per-formed based on iris information obtained using the eye tracking camera 1560-1. An example in which the eye tracking camera 1560-1 is disposed toward the user's right eye is illustrated in FIG. 15B, but the embodiment is not limited thereto, and the eye tracking camera 1560-1 may be disposed alone toward the user's left eye or may be disposed toward two eyes.

In an embodiment, the photographing camera 1560-4 may photograph a real image or background to be matched with a virtual image in order to implement the augmented reality or mixed reality content. The photographing camera 1560-4 may be used to obtain an image having a high resolution based on a high resolution (HR) or a photo video (PV). The photographing camera 1560-4 may photograph an image of a specific object existing at a position viewed by the user and may provide the image to the at least one display 1550. The at least one display 1550 may display one image in which a virtual image provided through the at least one optical device 1582 and 1584 is overlapped with information on the real image or background including an image of the specific object obtained by using the photographing camera. The wearable device 110 may compensate for depth information (e.g., a distance between the wearable device 110 and an external object obtained through a depth sensor), by using an image obtained through the photographing camera 1560-4. The wearable device 110 may perform object recognition through an image obtained using the photographing camera 1560-4. The wearable device 110 may perform a function (e.g., auto focus) of focusing an object (or subject) within an image and/or an optical image stabilization (OIS) function (e.g., an anti-shaking function) by using the photographing camera 1560-4. While displaying a screen representing a virtual space on the at least one display 1550, the wearable device 110 may perform a pass through function for dis-playing an image obtained through the photographing cam-era 1560-4 overlapping at least a portion of the screen. In an embodiment, the photographing camera 1560-4 may be disposed on the bridge 1503 disposed between the first rim 1501 and the second rim 1502.

The eye tracking camera 1560-1 may implement a more realistic augmented reality by matching the user's gaze with the visual information provided on the at least one display 1550, by tracking the gaze of the user wearing the wearable device 110. For example, when the user looks at the front, the wearable device 110 may naturally display environment information associated with the user's front on the at least one display 1550 at a position where the user is positioned. The eye tracking camera 1560-1 may be configured to capture an image of the user's pupil in order to determine the user's gaze. For example, the eye tracking camera 1560-1 may receive gaze detection light reflected from the user's pupil and may track the user's gaze based on the position and movement of the received gaze detection light. In an embodiment, the eye tracking camera 1560-1 may be dis-posed at a position corresponding to the user's left and right eyes. For example, the eye tracking camera 1560-1 may be disposed in the first rim 1501 and/or the second rim 1502 to face the direction in which the user wearing the wearable device 110 is positioned.

The motion recognition camera 1560-2 and 1560-3 may provide a specific event to the screen provided on the at least one display 1550 by recognizing the movement of the whole or portion of the user's body, such as the user's torso, hand, or face. The motion recognition camera 1560-2 and 1560-3 may obtain a signal corresponding to motion by recognizing the user's motion (e.g., gesture recognition), and may pro-vide a display corresponding to the signal to the at least one display 1550. The processor may identify a signal corre-sponding to the operation and may perform a preset function based on the identification. The motion recognition camera 1560-2 and 1560-3 may be used to perform SLAM for 6 degrees of freedom pose (6 dof pose) and/or a space recog-nition function using a depth map. The processor may perform a gesture recognition function and/or an object tracking function, by using the motion recognition camera 1560-2 and 1560-3. In an embodiment, the motion recog-nition camera 1560-2 and camera 1560-3 may be disposed on the first rim 1501 and/or the second rim 1502.

The camera 1560 included in the wearable device 110 is not limited to the above-described eye tracking camera 1560-1 and the motion recognition camera 1560-2 and 1560-3. For example, the wearable device 110 may identify an external object included in the FoV by using a camera disposed toward the user's FoV. The wearable device 110 identifying the external object may be performed based on a sensor for identifying a distance between the wearable device 110 and the external object, such as a depth sensor and/or a ToF sensor. The camera 1560 disposed toward the FoV may support an autofocus function and/or an optical image stabilization (OIS) function. For example, in order to obtain an image including a face of the user wearing the wearable device 110, the wearable device 110 may include the camera 1560 (e.g., a face tracking (FT) camera) disposed toward the face.

Although not illustrated, the wearable device 110 accord-ing to an embodiment may further include a light source (e.g., LED) that emits light toward a subject (e.g., user's eyes, face, and/or an external object in the FoV) photo-graphed by using the camera 1560. The light source may include an LED having an infrared wavelength. The light source may be disposed on at least one of the frame 1500, and the hinge units 1506 and 1507.

According to an embodiment, the battery module 1570 may supply power to electronic components of the wearable device 110. In an embodiment, the battery module 1570 may be disposed in the first temple 1504 and/or the second temple 1505. For example, the battery module 1570 may be a plurality of battery modules 1570. The plurality of battery modules 1570, respectively, may be disposed on each of the first temple 1504 and the second temple 1505. In an embodiment, the battery module 1570 may be disposed at an end of the first temple 1504 and/or the second temple 1505.

The antenna module 1575 may transmit the signal or power to the outside of the wearable device 110 or may receive the signal or power from the outside. In an embodiment, the antenna module 1575 may be disposed in the first temple 1504 and/or the second temple 1505. For example, the antenna module 1575 may be disposed close to one surface of the first temple 1504 and/or the second temple 1505.

A speaker 1555 may output a sound signal to the outside of the wearable device 110. A sound output module may be referred to as a speaker. In an embodiment, the speaker 1555 may be disposed in the first temple 1504 and/or the second temple 1505 in order to be disposed adjacent to the ear of the user wearing the wearable device 110. For example, the speaker 1555 may include a second speaker 1555-2 disposed adjacent to the user's left ear by being disposed in the first temple 1504, and a first speaker 1555-1 disposed adjacent to the user's right ear by being disposed in the second temple 1505.

The light emitting module may include at least one light emitting element. The light emitting module may emit light of a color corresponding to a specific state or may emit light through an operation corresponding to the specific state in order to visually provide information on a specific state of the wearable device 110 to the user. For example, when the wearable device 110 requires charging, it may emit red light at a constant cycle. In an embodiment, the light emitting module may be disposed on the first rim 1501 and/or the second rim 1502.

Referring to FIG. 15B, according to an embodiment, the wearable device 110 may include the printed circuit board (PCB) 1590. The PCB 1590 may be included in at least one of the first temple 1504 or the second temple 1505. The PCB 1590 may include an interposer disposed between at least two sub PCBs. On the PCB 1590, one or more hardware (e.g., hardware illustrated by different blocks of FIG. 17) included in the wearable device 110 may be disposed. The wearable device 110 may include a flexible PCB (FPCB) for interconnecting the hardware.

According to an embodiment, the wearable device 110 may include at least one of a gyro sensor, a gravity sensor, and/or an acceleration sensor for detecting the posture of the wearable device 110 and/or the posture of a body part (e.g., a head) of the user wearing the wearable device 110. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 110 may identify the user's motion and/or gesture performed to execute or stop a specific function of the wearable device 110 based on the IMU.

Figure 16A:
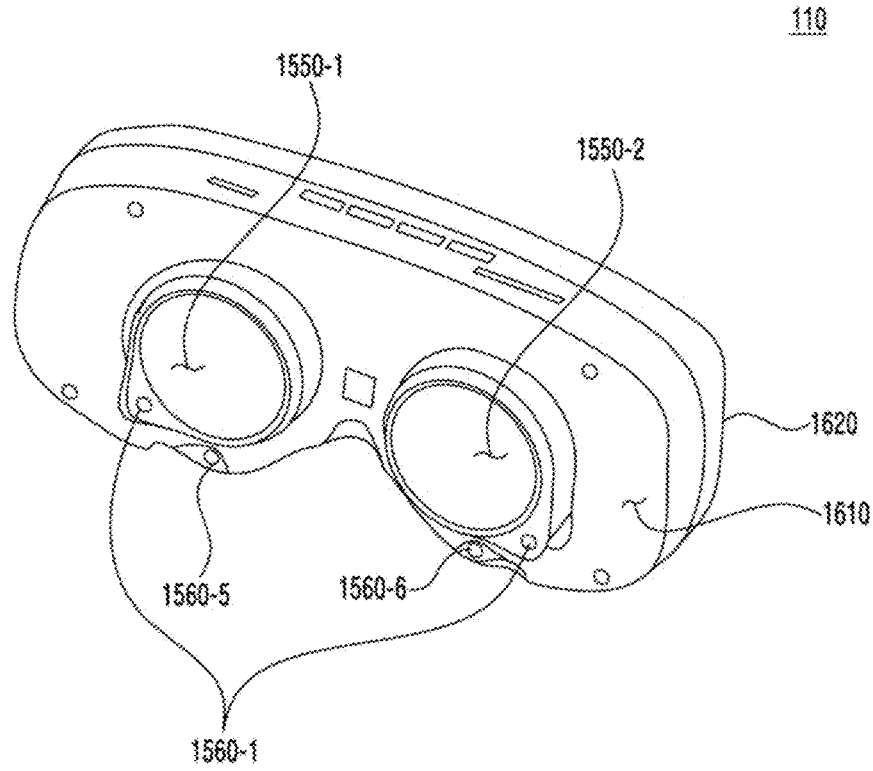
FIGS. 16A to 16B illustrate an example of an exterior of a wearable device.
Figure 16B:
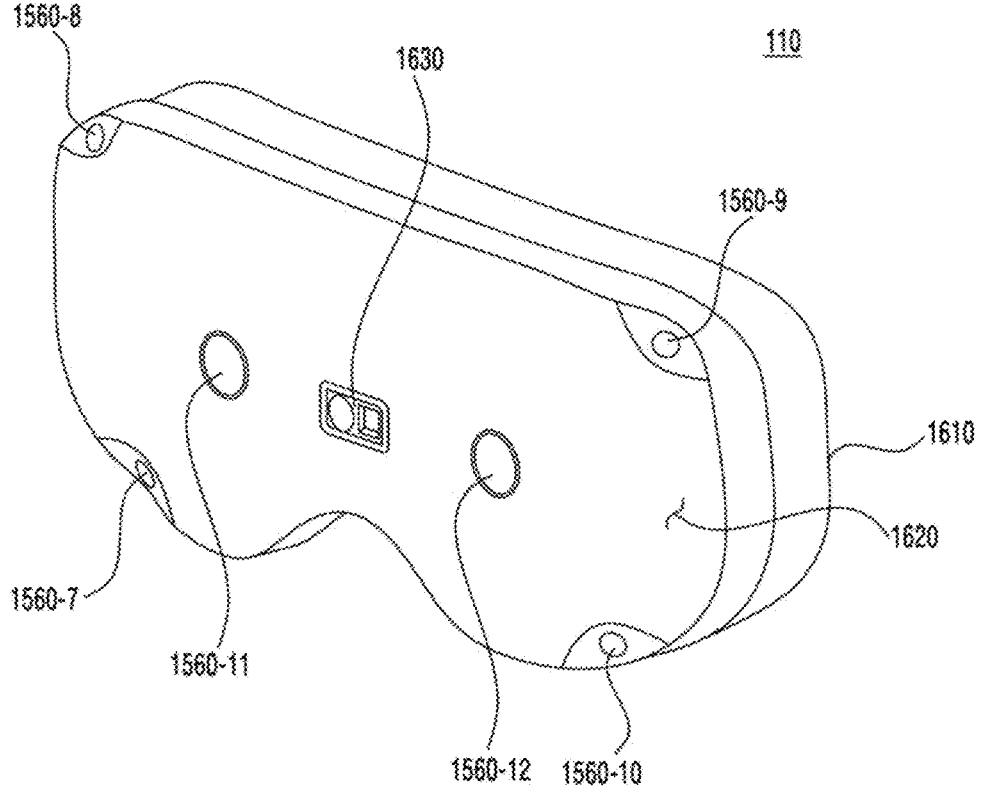

FIGS. 16A to 16B illustrate an example of an exterior of a wearable device (e.g., the wearable device 110). The wearable device 110 of FIGS. 16A to 16B may be an example of the wearable device 110 of FIG. 1A. According to an embodiment, an example of an exterior of a first surface 1610 of a housing of the wearable device 110 may be illustrated in FIG. 16A, and an example of an exterior of a second surface 1620 opposite to the first surface 1610 may be illustrated in FIG. 16B.

Referring to FIG. 16A, according to an embodiment, the first surface 1610 of the wearable device 110 may have an attachable shape on the user's body part (e.g., the user's face). In one embodiment, the wearable device 110 may further include a strap for being fixed on the user's body part, and/or one or more temples (e.g., the first temple 1504 and/or the second temple 1505 of FIGS. 15A to 15B). A first display 1550-1 for outputting an image to the left eye among the user's two eyes and a second display 1550-2 for outputting an image to the right eye among the user's two eyes may be disposed on the first surface 1610. The wearable device 110 may further include rubber or silicon packing, which are formed on the first surface 1610, for preventing interference by light (e.g., ambient light) different from the light emitted from the first display 1550-1 and the second display 1550-2.

According to an embodiment, the wearable device 110 may include camera 1560-1 for photographing and/or tracking two eyes of the user adjacent to each of the first display 1550-1 and the second display 1550-2. The cameras 1560-1 may be referred to as the gaze tracking camera 1560-1 of FIG. 15B. According to an embodiment, the wearable device 110 may include cameras 1560-5 and 1560-6 for photographing and/or recognizing the user's face. The cameras 1560-5 and 1560-6 may be referred to as a FT camera. The wearable device 110 may control an avatar representing a user in a virtual space, based on a motion of the user's face identified using the cameras 1560-5 and 1560-6. For example, the wearable device 110 may change a texture and/or a shape of a portion (e.g., a portion of an avatar representing a human face) of the avatar, by using information obtained by the cameras 1560-5 and 1560-6 (e.g., the FT camera) and representing the facial expression of the user wearing the wearable device 110.

Referring to FIG. 16B, a camera (e.g., cameras 1560-7, 1560-8, 1560-9, 1560-10, 1560-11, and 1560-12), and/or a sensor (e.g., the depth sensor 1630) for obtaining information associated with the external environment of the wearable device 110 may be disposed on the second surface 1620 opposite to the first surface 1610 of FIG. 16A. For example, the cameras 1560-7, 1560-8, 1560-9, and 1560-10 may be disposed on the second surface 1620 in order to recognize an external object. The cameras 1560-7, 1560-8, 1560-9, and 1560-10 may be referred to as the motion recognition cameras 1560-2 and 1560-3 of FIG. 15B.

For example, by using cameras 1560-11 and 1560-12, the wearable device 110 may obtain an image and/or video to be transmitted to each of the user's two eyes. The camera 1560-11 may be disposed on the second surface 1620 of the wearable device 110 to obtain an image to be displayed through the second display 1550-2 corresponding to the right eye among the two eyes. The camera 1560-12 may be disposed on the second surface 1620 of the wearable device 110 to obtain an image to be displayed through the first display 1550-1 corresponding to the left eye among the two eyes. The cameras 1560-11 and 1560-12 may be referred to as the photographing camera 1560-4 of FIG. 15B.

According to an embodiment, the wearable device 110 may include the depth sensor 1630 disposed on the second surface 1620 in order to identify a distance between the wearable device 110 and the external object. By using the depth sensor 1630, the wearable device 110 may obtain spatial information (e.g., a depth map) about at least a portion of the FoV of the user wearing the wearable device 110. In one embodiment, a microphone for obtaining sound outputted from the external object may be disposed on the second surface 1620 of the wearable device 110. The number of microphones may be one or more according to embodiments.

Hereinafter, a hardware or software configuration of the wearable device 110 will be described with reference to FIG. 17.

Figure 17:
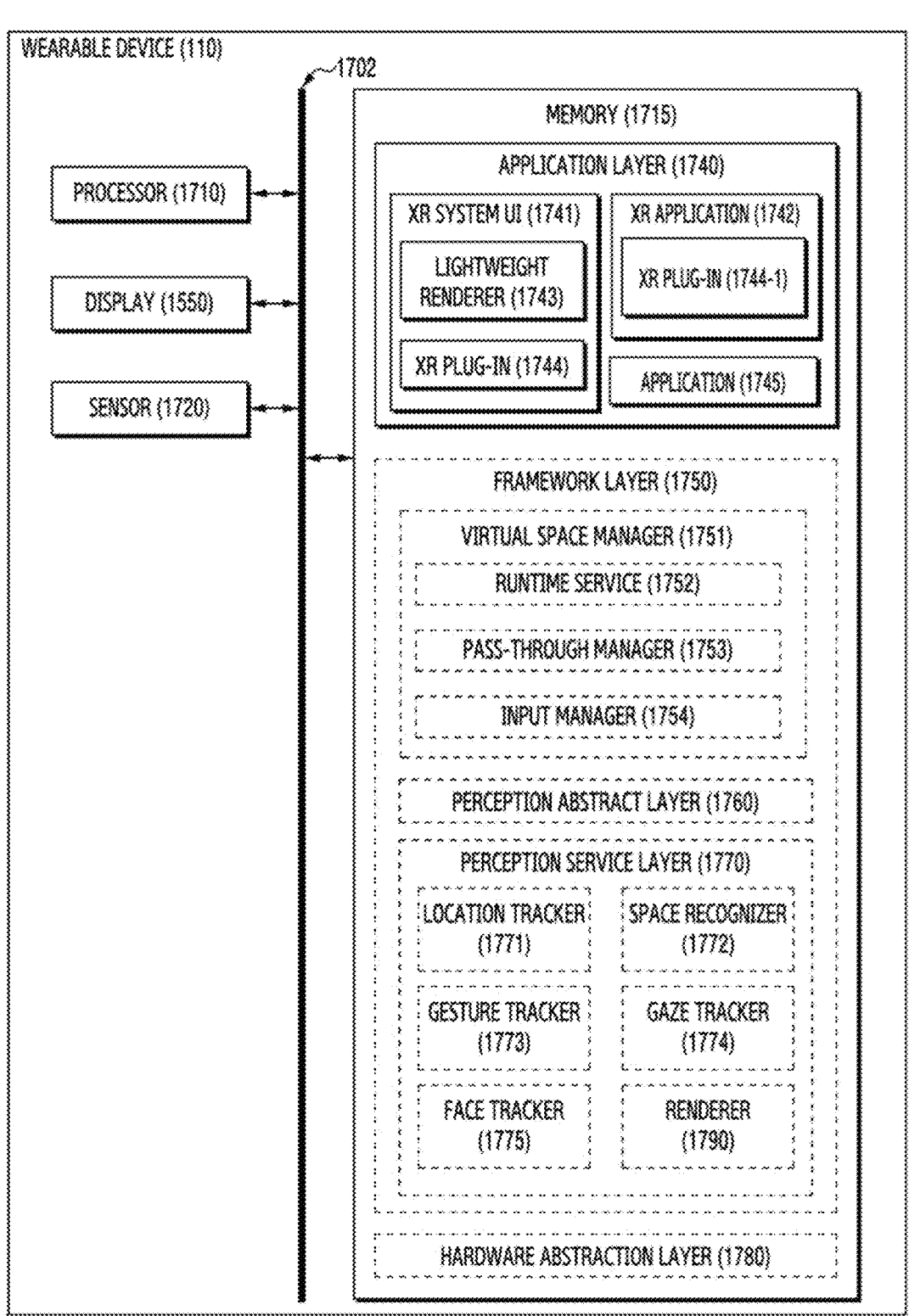
FIG. 17 illustrates an example of a block diagram of a wearable device.

FIG. 17 illustrates an example of a block diagram of a wearable device (e.g., wearable device 110). The wearable device 110 of FIG. 17 may be an example of the electronic device 1401 of FIG. 14 and the wearable device 110 of FIGS. 15A to 16B.

Referring to FIG. 17, the wearable device 110 according to an embodiment may include a processor 1710, memory 1715, a display 1550 (e.g., the first display 1550-1 and/or the second display 1550-2 of FIG. 15A, FIG. 15B, FIG. 16A, and FIG. 16B) and/or a sensor 1720. The processor 1710, the memory 1715, the display 1550, and/or the sensor 1720 may be electrically and/or operably connected to each other by an electronic component such as a communication bus 1702. In the disclosure, an operational connection of electronic components may include a direct connection established between the electronic components and/or an indirect connection established between the electronic components such that a first electronic component of the electronic components is controlled by a second electronic component of the electronic components. The type and/or number of electronic components included in the wearable device 110 is not limited as illustrated in FIG. 17. For example, the wearable device 110 may include only some of the electronic components illustrated in FIG. 17.

According to an embodiment, the processor 1710 of the wearable device 110 may include circuitry (e.g., processing circuitry) for processing data, based on one or more instructions. For example, the circuitry for processing data may include an arithmetic and logic unit (ALU), a field programmable gate array (FPGA), a central processing unit (CPU) and/or an application processor (AP). In an embodiment, the wearable device 110 may include one or more processors. The processor 1710 may have a structure of a multi-core processor such as a dual core, a quad core, a hexa core, and/or an octa core. The multi-core processor structure of the processor 1710 may include a structure (e.g., a big-little structure) based on a plurality of core circuits, divided by power consumption, clock, and/or computational amount per unit time. In an embodiment including the processor 1710 having a multi-core processor structure, operations and/or functions of the disclosure may be performed individually or collectively by one or more cores included in the processor 1710.

According to an embodiment, the memory 1715 of the wearable device 110 may include an electronic component for storing data and/or instructions inputted to the processor 1710 and/or outputted from the processor 1710. For example, the memory 1715 may include a volatile memory such as a random-access memory (RAM) and/or a non-volatile memory such as a read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, and an embedded multi-media card (eMMC). In an embodiment, the memory 1715 may be referred to as a storage.

In an embodiment, the display 1550 of the wearable device 110 may output visualized information to a user of the wearable device 110. The display 1550 arranged in front of eyes of the user wearing the wearable device 110 may be disposed in at least a portion of a housing of the wearable device 110 (e.g., the first display 1550-1 and/or the second display 1550-2 of FIGS. 15A, 15B, 16A, and 16B). For example, the display 1550 may output visualized information to the user by being controlled by the processor 1710 including a circuit such as a CPU, a graphic processing unit (GPU), and/or a display processing unit (DPU). The display 1550 may include a flexible display, a flat panel display (FPD) and/or electronic paper. The display 1550 may include a liquid crystal display (LCD), a plasma display panel (PDP), and/or one or more light emitting diode (LED). The LED may include an organic LED (OLED). The embodiment is not limited thereto, and for example, the display 1550 may include a projector (or projection assembly) for projecting light onto the lens when the wearable device 110 includes a lens for transmitting external light (or ambient light). In an embodiment, the display 1550 may be referred to as a display panel and/or a display module. Pixels included in the display 1550 may be disposed toward any one of the user's two eyes when worn by the user of the wearable device 110. For example, the display 1550 may include display areas (or active areas) corresponding to each of the user's two eyes.

In an embodiment, the sensor 1720 of the wearable device 110 may generate electronic information capable of being processed by the processor 1710 and/or the memory 1715 from non-electronic information associated with the wearable device 110. For example, the sensor 1720 may include a global positioning system (GPS) sensor for detecting a geographic location of the wearable device 110. In addition to the GPS method, the sensor 1720 may generate information indicating a geographical location of the wearable device 110 based on a global navigation satellite system (GNSS), such as Galileo, Beidou, or Compass). The information may be stored in the memory 1715, processed by the processor 1710, and/or transmitted to another electronic device distinct from the wearable device 110 via a communication circuit.

According to an embodiment, one or more instructions (or commands) indicating data to be processed by the processor 1710 of the wearable device 110, calculations and/or operations to be performed may be stored in the memory 1715 of the wearable device 110. A set of one or more instructions may be referred to as a program, firmware, operating system, process, routine, sub-routine, and/or software application (hereinafter referred to as application). For example, the wearable device 110 and/or the processor 1710 may perform at least one of operations of FIGS. 3, 7, 10, and 13, when a set of a plurality of instruction distributed in the form of an operating system, firmware, driver, program, and/or software application is executed. Hereinafter, a software application being installed within the wearable device 110 may mean that one or more instructions provided in the form of a software application (or package) are stored in the memory 1715, and that the one or more applications are stored in an executable format (e.g., a file with an extension designated by the operating system of the wearable device 110) by the processor 1710. As an example, the application may include a program and/or a library, associated with a service provided to a user.

Referring to FIG. 17, programs installed in the wearable device 110 may be included in any one among different layers including an application layer 1740, a framework layer 1750, and/or a hardware abstraction layer (HAL) 1780, based on a target. For example, programs (e.g., module or driver) designed to target a hardware (e.g., the display 1550, and/or the sensor 1720) of the wearable device 110 may be included in the hardware abstraction layer 1780. In terms of including one or more programs for providing an extended reality (XR) service, the framework layer 1750 may be referred to as an XR framework layer. For example, the layers illustrated in FIG. 17, which are logically separated (or for convenience of explanation), may not mean that an address space of the memory 1715 is divided by the layers.

For example, programs (e.g., location tracker 1771, space recognizer 1772, gesture tracker 1773, gaze tracker 1774, face tracker 1775, and/or renderer 1790) designed to target at least one of the hardware abstraction layer 1780 and/or the application layer 1740 may be included within framework layer 1750. Programs included in the framework layer 1750 may provide an application programming interface (API) capable of being executed (or called) based on other programs.

For example, a program designed to target a user of the wearable device 110 may be included in the application layer 1740. An extended reality (XR) system user interface (UI) 1741 and/or an XR application 1742 are illustrated as an example of programs included in the application layer 1740, but embodiments are not limited thereto. For example, programs (e.g., software application) included in the application layer 1740 may cause execution of a function supported by programs included in the framework layer 1750, by calling the API.

For example, the wearable device 110 may display, on the display 1550, one or more visual objects for performing interaction with the user, based on the execution of the XR system UI 1741. The visual object may mean an object capable of being positioned within a screen for transmission of information and/or interaction, such as text, image, icon, video, button, check box, radio button, text box, slider and/or table. The visual object may be referred to as a visual guide, a virtual object, a visual element, a UI element, a view object, and/or a view element. The wearable device 110 may provide functions available in a virtual space to the user, based on the execution of the XR system UI 1741.

Referring to FIG. 17, it is described that the XR system UI 1741 includes a lightweight renderer 1743 and/or an XR plug-in 1744 but is not limited thereto. For example, the processor 1710 may execute the lightweight renderer 1743 and/or the XR plug-in 1744 in the framework layer 1750, based on the XR system UI 1741.

For example, the wearable device 110 may obtain a resource (e.g., API, system process, and/or library) used to define, create, and/or execute a rendering pipeline in which partial changes are allowed, based on the execution of the lightweight renderer 1743. The lightweight renderer 1743 may be referred to as a lightweight renderer pipeline in terms of defining a rendering pipeline in which partial changes are allowed. The lightweight renderer 1743 may include a renderer (e.g., a prebuilt renderer) built before execution of a software application. For example, the wearable device 110 may obtain a resource (e.g., API, system process, and/or library) used to define, create, and/or execute the entire rendering pipeline, based on the execution of the XR plug-in 1744. The XR plug-in 1744 may be referred to as an open XR native client in terms of defining (or setting) the entire rendering pipeline.

For example, the wearable device 110 may display a screen representing at least a portion of a virtual space on the display 1550, based on the execution of the XR application 1742. The XR plug-in 1744-1 included in the XR application 1742 may include instructions supporting a function similar to the XR plug-in 1744 of the XR system UI 1741. Among descriptions of the XR plug-in 1744-1, a description overlapping those of the XR plug-in 1744 may be omitted. The wearable device 110 may cause execution of a virtual space manager 1751, based on execution of the XR application 1742.

For example, the wearable device 110 may display an image in a virtual space on the display 1550, based on execution of an application 1745. The application 1745 may be configured to output image information for displaying a two-dimensional image. The wearable device 110 may cause execution of the virtual space manager 1751, based on execution of the application 1745. The wearable device 110 may create double image information to represent the two-dimensional image in a three-dimensional virtual space, based on the execution of the application 1745. Herein, the double image information may include first image information for the left eye and second image information for the right eye, in consideration of binocular disparity. In order to represent the two-dimensional image in the three-dimensional virtual space, the wearable device 110 may create the double image information, based on image information for displaying the two-dimensional image.

According to an embodiment, the wearable device 110 may provide a virtual space service, based on the execution of the virtual space manager 1751. For example, the virtual space manager 1751 may include a platform for supporting a virtual space service. Based on the execution of the virtual space manager 1751, the wearable device 110 may identify a virtual space formed based on a user's location indicated by data obtained through the sensor 1730, and may display at least a portion of the virtual space on the display 1550. The virtual space manager 1751 may be referred to as a composition presentation manager (CPM).

For example, the virtual space manager 1751 may include a runtime service 1752. As an example, the runtime service 1752 may be referred to as or may correspond to an OpenXR runtime module (or OpenXR runtime program). The wearable device 110 may execute at least one of a user's pose prediction function, a frame timing function, and/or a space input function, based on the execution of the runtime service 1752. As an example, the wearable device 110 may perform rendering for a virtual space service to a user, based on the execution of the runtime service 1752. For example, based on the execution of runtime service 1752, a function associated with a virtual space executable by the application layer 1740 may be supported.

For example, the virtual space manager 1751 may include a pass-through manager 1753. The wearable device 110 may display an image and/or a video representing an actual space obtained through an external camera superimposed on at least a portion of the screen, while displaying a screen representing a virtual space on display 1550, based on the execution of the pass-through manager 1753.

For example, the virtual space manager 1751 may include an input manager 1754. The wearable device 110 may identify data (e.g., sensor data) obtained by executing one or more programs included in a perception service layer 1770, based on the execution of the input manager 1754. The wearable device 110 may identify a user input associated with the wearable device 110, by using the obtained data. The user input may be associated with the user's motion (e.g., hand gesture), gaze, and/or speech identified by the sensor 1720 (e.g., an image sensor such as an external camera). The user input may be identified based on an external electronic device connected (or paired) through a communication circuit.

For example, a perception abstract layer 1760 may be used for data exchange between the virtual space manager 1751 and the perception service layer 1770. In terms of being used for data exchange between the virtual space manager 1751 and the perception service layer 1770, the perception abstract layer 1760 may be referred to as an interface. As an example, the perception abstraction layer 1760 may be referred to as or may correspond to OpenPX. The perception abstraction layer 1760 may be used for a perception client and a perception service.

According to an embodiment, the perception service layer 1770 may include one or more programs for processing data obtained from the sensor 1720. One or more programs may include at least one of the location tracker 1771, the space recognizer 1772, the gesture tracker 1773, the gaze tracker 1774, face tracker 1775, and/or renderer 1790. The type and/or number of one or more programs included in the perception service layer 1770 is not limited as illustrated in FIG. 17.

For example, the wearable device 110 may identify a posture of the wearable device 110 by using the sensor 1730, based on the execution of the location tracker 1771. The wearable device 110 may identify 6 degrees of freedom pose (6 dof pose) of the wearable device 110, based on the execution of the location tracker 1771, by using data obtained using an external camera (e.g., image sensor) and/or an IMU (e.g., motion sensor including gyro sensor, acceleration sensor and/or geomagnetic sensor). The location tracker 1771 may be referred to as a head tracking (HeT) module (or a head tracker or head tracking program).

For example, the wearable device 110 may obtain information for providing a three-dimensional virtual space corresponding to a surrounding environment (e.g., external space) of the wearable device 110 (or a user of the wearable device 110), based on the execution of the space recognizer 1772. The wearable device 110 may reproduce the surrounding environment of the wearable device 110 in three dimensions, by using data obtained using an external camera (e.g., image sensor) based on the execution of the space recognizer 1772. The wearable device 110 may identify at least one of a plane, an inclination, and a step, based on the surrounding environment of the wearable device 110 reproduced in three dimensions based on the execution of the space recognizer 1772. The space recognizer 1772 may be referred to as a scene understanding (SU) module (or a scene recognition program).

For example, the wearable device 110 may identify (or recognize) a hand's pose and/or gesture of the user of the wearable device 110 based on the execution of the gesture tracker 1773. For example, the wearable device 110 may identify a pose and/or a gesture of the user's hand by using data obtained from an external camera (e.g., image sensor), based on the execution of the gesture tracker 1773. As an example, the wearable device 110 may identify a pose and/or a gesture of the user's hand, based on data (or image) obtained using an external camera based on the execution of the gesture tracker 1773. The gesture tracker 1773 may be referred to as a hand tracking (HaT) module (or a hand tracking program) and/or a gesture tracking module.

For example, the wearable device 110 may identify (or track) the movement of the user's eyes of the wearable device 110, based on the execution of the gaze tracker 1774.

For example, the wearable device 110 may identify the movement of the user's eyes, by using data obtained from a gaze tracking camera (e.g., image sensor) based on the execution of the gaze tracker 1774. The gaze tracker 1774 may be referred to as an eye tracking (ET) module (or eye tracking program) and/or a gaze tracking module.

For example, the perception service layer 1770 of the wearable device 110 may further include the face tracker 1775 for tracking the user's face. For example, the wearable device 110 may identify (or track) the movement of the user's face and/or the user's facial expression, based on the execution of the face tracker 1775. The wearable device 110 may estimate the user's facial expression, based on the movement of the user's face based on the execution of the face tracker 1775. For example, the wearable device 110 may identify the movement of the user's face and/or the user's facial expression, based on data (e.g., image and/or video) obtained using a camera (e.g., a camera facing at least a portion of the user's face), based on the execution of the face tracker 1775.

Referring to FIG. 17, a renderer 1790 may include instructions for rendering images in a three-dimensional virtual space. The processor 1710 executing the renderer 1790 may obtain at least one image to be at least partially displayed on a display area of the display 1550 at a software application. For example, the processor 1710 executing the renderer 1790 may determine a location of an area to which an application (e.g., XR application 1742, application 1745) is to be rendered. The processor 1710 executing the renderer 1790 may create an image of the application to be displayed on the display 1550. The renderer 1790 may synthesize the images to create a composite image to be displayed on the display 1550.

For example, the processor 1710 executing the renderer 1790 may divide a display area of the display 1550 into a foveated portion (or may be referred to as a foveated area) and a peripheral portion (or may be referred to as a remaining area), by using a gaze location calculated using the location tracker 1771 and/or the gaze tracker 1774. For example, the processor 1710 detecting coordinate values of the gaze location may determine a portion of the display area including the coordinate values as a foveated area. The DPU executing the renderer 1790 may obtain at least one image, corresponding to each of the foveated area and the remaining area, and having a size smaller than a size of the entire display area of the display 1550 or a resolution less than a resolution of the display area.

The processor 1710 executing the renderer 1790 may obtain or create a composite image to be displayed on the display 1550, by synthesizing an image corresponding to the foveated area and an image corresponding to a peripheral portion. For example, the processor 1710 may enlarge the image corresponding to the peripheral portion to a size of the entire display area of the display 1550, by performing upscaling. The processor 1710 may create a composite image to be displayed on the display 1550, by combine the image corresponding to the foveated area onto the enlarged image. The processor 1710 may mix the enlarged image and the image corresponding to the foveated area, by applying a visual effect such as blur along a boundary line of the image corresponding to the foveated area.

Figure 18:
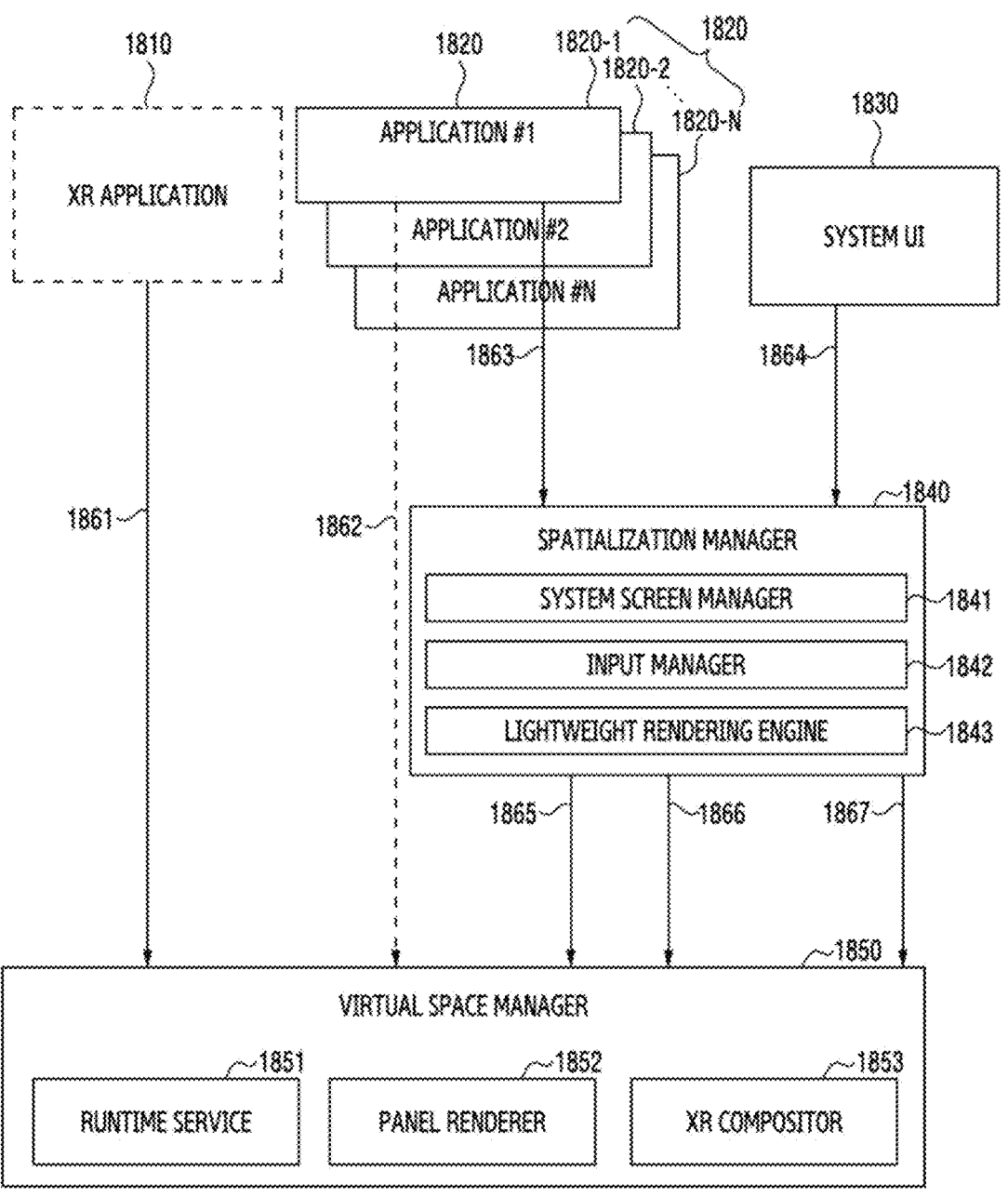
FIG. 18 illustrates an example of a block diagram of an electronic device for displaying an image in a virtual space.

FIG. 18 illustrates an example of a block diagram of an electronic device (e.g., electronic device 1401, wearable device 110) for displaying an image in a virtual space. In FIG. 18, an example in which a plurality of programs/instructions for displaying an image in a virtual space is executed is described. The plurality of programs/instructions may all be executed in one processor (e.g., AP) or may be executed by a plurality of processors (e.g., AP, graphic processing unit (GPU), neural processing unit (NPU)).

Referring to FIG. 18, the electronic device 1401 may execute a virtual space manager 1850 (e.g., the virtual space manager 1751 and the CPM of FIG. 17) to render an image in a virtual space. For the virtual space manager 1850, descriptions of the virtual space manager 1751 of FIG. 17 may be at least partially referenced. The virtual space manager 1850 may include a platform for supporting a virtual space service. The virtual space manager 1850 may include a runtime service 1851 (e.g., OpenXR Runtime), a panel renderer 1852 (e.g., 2D Panel Render), and an XR compositor 1853. The electronic device 1401 may execute at least one of a user's pose prediction function, a frame timing function, and/or a space input function, based on the execution of the runtime service 1851. For the runtime service 1851, descriptions of the runtime service 1752 of FIG. 17 may be at least partially referenced. The electronic device 1401 may display at least one image (video) on a panel (e.g., a 2D panel) to implement a virtual space through a display, based on the execution of the panel rendering 1852. For example, the electronic device 1401 may display a rendering image corresponding to RGB information 1866 for a panel from a spatialization manager 1840 to be described later via a display (e.g., display 1550). The electronic device 1401 may synthesize an image of an actual area captured through a camera in a virtual space (hereinafter, a pass-through image) and a virtual area image, based on the execution of the XR compositor 1853. For example, the electronic device 1401 may create a composite image, by merging the pass-through image and the virtual area image, based on the execution of the XR compositor 1853. The electronic device 1401 may transmit the created composite image to a display buffer so that the composite image is displayed. The electronic device 1401 may identify the virtual space through the virtual space manager 1850, and display at least a portion of the virtual space on the display 1550. The virtual space manager 1850 may be referred to as the CPM. The electronic device 1401 may execute the virtual space manager 1850 to render an image corresponding to at least a portion of the virtual space.

According to an embodiment, the electronic device 1401 may execute the spatialization manager 1840. The spatialization manager 1840 may perform processes for displaying an image in a three-dimensional virtual space. The electronic device 1401 may perform preprocessing based on the execution of the spatialization manager 1840 so that an image may be rendered in a three-dimensional virtual space through the virtual space manager 1850. For example, the electronic device 1401 may perform at least some of functions of the renderer 1790 of FIG. 17, based on the execution of the spatialization manager 1840. Based on the execution of the spatialization manager 1840, the electronic device 1401 may process image information provided by an application (e.g., the XR application 1810, an application providing a normal two-dimensional screen other than XR, and an application that provides a system UI 1830). The spatialization manager 1840 (e.g., Space Flinger) may include a system screen manager 1841 (e.g., System scene), an input manager 1842 (e.g., Input Routing), and a lightweight rendering engine 1843 (e.g., Impress Engine). The system screen manager 1841 may be executed to display the system UI 1830. System UI-related information 1864 may be transmitted from a program (e.g., API) providing the system UI 1830 to the system screen manager 1841. The system UI-related information 1864 may be obtained via a spatializer API and/or a Same-process private API. The spatialization manager 1840 may determine a layout (e.g., location, display order) of a screen of the system UI 1830 in a three-dimensional space, through pre-allocated resources. The system screen manager 1841 may transmit image information 1867 for rendering a screen of the system UI 1830 to the virtual space manager 1850, according to the layout. The input manager 1842 may be configured to process a user input (e.g., user input on a system screen or an app screen). The impress engine 1843 may be a renderer (e.g., the lightweight renderer 1743) for creating an image. For example, the impress engine 1843 may be used to display the system UI 1830. According to an embodiment, the spatialization manager 1840 may include the lightweight rendering engine 1843 for rendering the system UI. According to an embodiment, in a case that the lightweight rendering engine 1843 does not have enough resources to render an avatar used in the HMD, at least one external rendering engine may be used. In this case, in order to solve the compatibility issue with external rendering (e.g., 3rd party engine), an external rendering engine support module may be added inside the spatialization manager 1840.

According to an embodiment, the electronic device may execute an application. For example, the virtual space manager 1850 may be executed in response to the execution of the XR application 1810 (e.g., the XR application 1742, 3D game, XR map, and other immersive application). The electronic device 1401 may provide the virtual space manager 1850 with double image information 1861 provided from the XR application 1810. In order to display an image in a three-dimensional space, the double image information 1861 may include two image information considering binocular disparity. For example, the double image information 1861 may include first image information for the user's left eye and second image information for the user's right eye for rendering in a three-dimensional virtual space. Hereinafter, in the disclosure, double image information is used as a term referring to image information for indicating images for two eyes in a three-dimensional space. In addition to the double image information, binocular image information, double image data, binocular image data, stereoscopic image information, 3D image information, spatial image information, spatial image data, 2D-3D conversion data, dimensional conversion image data, binocular disparity image data, and/or equivalent technical terms may be used. The electronic device 1401 may create a composite image by merging image layers via the virtual space manager 1850. The electronic device 1401 may transmit the created composite image to a display buffer. The composite image may be displayed on the display 1550 of the electronic device 1401.

According to an embodiment, the electronic device may execute at least one of an application 1820 (e.g., first application 1820-1, second application 1820-2, . . . , and Nth application 1820-N) different from the XR application 1810. According to an embodiment, the application 1820 may be configured to output image information for displaying a two-dimensional image. In other words, the application 1820 may provide a two-dimensional image. As an example, the application 1820 may be an image application, a schedule application, or an Internet browser application. If, in response to the execution of the application 1820, assume that image information 1862 provided from the application 1820 is provided to the virtual space manager 1850. Since the image information 1862 has only the x-coordinate and y-coordinate in the two-dimensional plane, it may be difficult to consider the order of precedence (i.e., a distance separated from the user) between other applications centered on the user. Even when displaying the application 1820 providing a general 2D screen, the electronic device 1401 may execute the spatialization manager 1840 to provide double image information to the virtual space manager 1850. For example, the electronic device 1401 may receive application-related information 1863 from the first application 1820-1, based on the execution of the spatialization manager 1840. For example, the application-related information 1863 may include image information (e.g., information including RGB per pixel) indicating a two-dimensional image of the first application 1820-1 and/or content information (e.g., characteristic of content executed in the first application, type of content) in the first application 1820-1. The application-related information 1863 may be obtained through a spatializer API. Based on the execution of the spatialization manager 1840, the electronic device 1401 may identify a location of an area in which the first application 1820-1 is to be rendered and information (hereinafter, location information) on a size of the area to be rendered. Based on the execution of the spatialization manager 1840, the electronic device 1401 may create double image information 1865 (e.g., RGBx2) in which the user's binocular disparity is considered, through the image information and the location information. Based on the execution of the spatialization manager 1840, the electronic device 1401 may provide the double image information 1865 to the virtual space manager 1850. By converting a simple two-dimensional image into the double image information 1865, a problem occurring when the image information 1862 is directly transmitted to the virtual space manager 1850 may be solved. In addition, as at least some of functions for image display in a virtual space are performed by the spatialization manager 1840 instead of the virtual space manager 1850, the burden on the virtual space manager 1850 may be reduced.

As described above, a wearable device may comprise a display assembly comprising one or more displays. The wearable device may comprise one or more cameras. The wearable device may comprise one or more sensors. The wearable device may comprise memory, comprising one or more storage media, storing instructions. The wearable device may comprise at least one processor comprising processing circuitry. The instructions, when executed by the at least one processor individually or collectively, may cause the wearable device to obtain an image via the one or more cameras. The instructions, when executed by the at least one processor individually or collectively, may cause the wearable device to identify depth values of each of pixels in the image using depth information obtained via the one or more cameras and/or the one or more sensors. The instructions, when executed by the at least one processor individually or collectively, may cause the wearable device to identify the number of one or more pixels having each of the depth values. The instructions, when executed by the at least one processor individually or collectively, may cause the wearable device to identify a reference depth value using a depth value associated with the number corresponding to a peak value among the depth values. The instructions, when executed by the at least one processor individually or collectively, may cause the wearable device to identify a first portion of the pixels having depth values that are within a reference range with respect to the reference depth value. The instructions, when executed by the at least one processor individually or collectively, may cause the wearable device to identify a second portion of the pixels that are different from the first portion of the pixels. The instructions, when executed by the at least one processor individually or collectively, may cause the wearable device to, based on setting the depth values of the first portion of the pixels to the reference depth value and setting depth values of the second portion of the pixels to a predetermined depth value, display a screen corresponding to the image via the display assembly.

According to an embodiment, the instructions, when executed by the at least one processor individually or collectively, may cause the wearable device to identify another reference depth value using another depth value associated to the number corresponding to another peak value among the depth values of each of pixels in the image. The instructions, when executed by the at least one processor individually or collectively, may cause the wearable device to identify a third portion of the pixels that are different from the first portion of the pixels, the third portion of the pixels having depth values that are within the reference range with respect to the other reference depth value. The instructions, when executed by the at least one processor individually or collectively, may cause the wearable device to, based on setting the depth values of the first portion of the pixels to the reference depth value, setting the depth values of the second portion of the pixels to the predetermined depth value, and setting the depth values of the third portion of the pixels to the other reference depth value, display a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The instructions, when executed by the at least one processor individually or collectively, may cause the wearable device to determine a foveated area of the image and a peripheral area of the image surrounding the foveated area of the image, using the eye tracking data obtained using the one or more other sensors. The instructions, when executed by the at least one processor individually or collectively, may cause the wearable device to identify the first portion of the pixels located within the foveated area of the image, the first portion of the pixels having depth values that are within the reference range with respect to the reference depth value. The instructions, when executed by the at least one processor individually or collectively, may cause the wearable device to identify the second portion of the pixels located within the foveated area of the image, the second portion of the pixels having depth values outside the reference range with respect to the reference depth value. The instructions, when executed by the at least one processor individually or collectively, may cause the wearable device to identify a third portion of the pixels located within the peripheral area of the image. The instructions, when executed by the at least one processor individually or collectively, may cause the wearable device to, based on setting the depth values of the first portion of the pixels to the reference depth value, setting the depth values of the second portion of the pixels to the first predetermined depth value, and setting the depth values of the third portion of the pixels to a second predetermined depth value, display a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The instructions, when executed by the at least one processor individually or collectively, may cause the wearable device to determine a foveated area of the image and a peripheral area of the image surrounding the foveated area of the image, using the eye tracking data obtained using the one or more other sensors. The instructions, when executed by the at least one processor individually or collectively, may cause the wearable device to identify the first portion of the pixels located within the foveated area of the image, the first portion of the pixels having depth values that are outside another reference range and are within the reference range with respect to the reference depth value. The instructions, when executed by the at least one processor individually or collectively, may cause the wearable device to identify the second portion of the pixels located within the foveated area of the image, the second portion of the pixels having depth values that are outside the other reference range and are outside the reference range with respect to the reference depth value. The instructions, when executed by the at least one processor individually or collectively, may cause the wearable device to identify a third portion of the pixels located within the foveated area of the image, the third portion of the pixels having depth values that are within the other reference range. The instructions, when executed by the at least one processor individually or collectively, may cause the wearable device to identify a fourth portion of the pixels located within the peripheral area of the image. The instructions, when executed by the at least one processor individually or collectively, may cause the wearable device to, based on setting the depth values of the first portion of the pixels to the reference depth value, setting the depth values of the second portion of the pixels to the first predetermined depth value, and setting the depth values of the fourth portion of the pixels to the second predetermined depth value, display a screen corresponding to the image via the display assembly, and depth values of an area within the screen corresponding to the third portion of the pixels may correspond to the depth values that are within the other reference range of the third portion of the pixels.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the predetermined depth value may be obtained using an average value of the depth values of each of the pixels in the image.

According to an embodiment, the instructions, when executed by the at least one processor individually or collectively, may cause the wearable device to identify the reference depth value, using the depth value associated with the number and a difference between a position of the one or more cameras attached to the wearable device and a position of eyes of a user wearing the wearable device.

As described above, a method performed by a wearable device comprising a display assembly comprising one or more displays, one or more cameras, and one or more sensors may comprise obtaining an image via the one or more cameras. The method may comprise identifying depth values of each of pixels in the image using depth information obtained via the one or more cameras and/or the one or more sensors. The method may comprise identifying the number of one or more pixels having each of the depth values. The method may comprise identifying a reference depth value using a depth value associated with the number corresponding to a peak value among the depth values. The method may comprise identifying a first portion of the pixels having depth values that are within a reference range with respect to the reference depth value. The method may comprise identifying a second portion of the pixels that are different from the first portion of the pixels. The method may comprise, based on setting the depth values of the first portion of the pixels to the reference depth value and setting depth values of the second portion of the pixels to a predetermined depth value, displaying a screen corresponding to the image via the display assembly.

According to an embodiment, the method may comprise identifying another reference depth value using another depth value associated to the number corresponding to another peak value among the depth values of each of pixels in the image. The method may comprise identifying a third portion of the pixels that are different from the first portion of the pixels, the third portion of the pixels having depth values that are within the reference range with respect to the other reference depth value. The method may comprise, based on setting the depth values of the first portion of the pixels to the reference depth value, setting the depth values of the second portion of the pixels to the predetermined depth value, and setting the depth values of the third portion of the pixels to the other reference depth value, displaying a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The method may comprise determining a foveated area of the image and a peripheral area of the image surrounding the foveated area of the image, using the eye tracking data obtained using the one or more other sensors. The method may comprise identifying the first portion of the pixels located within the foveated area of the image, the first portion of the pixels having depth values that are within the reference range with respect to the reference depth value. The method may comprise identifying the second portion of the pixels located within the foveated area of the image, the second portion of the pixels having depth values outside the reference range with respect to the reference depth value. The method may comprise identifying a third portion of the pixels located within the peripheral area of the image. The method may comprise, based on setting the depth values of the first portion of the pixels to the reference depth value, setting the depth values of the second portion of the pixels to the first predetermined depth value, and setting the depth values of the third portion of the pixels to a second predetermined depth value, displaying a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The method may comprise determining a foveated area of the image and a peripheral area of the image surrounding the foveated area of the image, using the eye tracking data obtained using the one or more other sensors. The method may comprise identifying the first portion of the pixels located within the foveated area of the image, the first portion of the pixels having depth values that are outside another reference range and are within the reference range with respect to the reference depth value. The method may comprise identifying the second portion of the pixels located within the foveated area of the image, the second portion of the pixels having depth values that are outside the other reference range and are outside the reference range with respect to the reference depth value. The method may comprise identifying a third portion of the pixels located within the foveated area of the image, the third portion of the pixels having depth values that are within the other reference range. The method may comprise identifying a fourth portion of the pixels located within the peripheral area of the image. The method may comprise, based on setting the depth values of the first portion of the pixels to the reference depth value, setting the depth values of the second portion of the pixels to the first predetermined depth value, and setting the depth values of the fourth portion of the pixels to the second predetermined depth value, displaying a screen corresponding to the image via the display assembly, and depth values of an area within the screen corresponding to the third portion of the pixels may correspond to the depth values that are within the other reference range of the third portion of the pixels.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the predetermined depth value may be obtained using an average value of the depth values of each of the pixels in the image.

The method may comprise identifying the reference depth value, using the depth value associated with the number and a difference between a position of the one or more cameras attached to the wearable device and a position of eyes of a user wearing the wearable device.

As described above, a non-transitory computer-readable storage medium storing one or more programs, the one or more programs may include instructions which, when executed by a wearable device comprising a display assembly comprising one or more displays, one or more cameras, and one or more sensors, cause the wearable device to obtain an image via the one or more cameras. The one or more programs may include instructions which, when executed by the wearable device, cause the wearable device to identify depth values of each of pixels in the image using depth information obtained via the one or more cameras and/or the one or more sensors. The one or more programs may include instructions which, when executed by the wearable device, cause the wearable device to identify the number of one or more pixels having each of the depth values. The one or more programs may include instructions which, when executed by the wearable device, cause the wearable device to identify a reference depth value using a depth value associated with the number corresponding to a peak value among the depth values. The one or more programs may include instructions which, when executed by the wearable device, cause the wearable device to identify a first portion of the pixels having depth values that are within a reference range with respect to the reference depth value. The one or more programs may include instructions which, when executed by the wearable device, cause the wearable device to identify a second portion of the pixels that are different from the first portion of the pixels. The one or more programs may include instructions which, when executed by the wearable device, cause the wearable device to, based on setting the depth values of the first portion of the pixels to the reference depth value and setting depth values of the second portion of the pixels to a predetermined depth value, display a screen corresponding to the image via the display assembly.

According to an embodiment, the one or more programs may include instructions which, when executed by the wearable device, cause the wearable device to identify another reference depth value using another depth value associated to the number corresponding to another peak value among the depth values of each of pixels in the image. The one or more programs may include instructions which, when executed by the wearable device, cause the wearable device to identify a third portion of the pixels that are different from the first portion of the pixels, the third portion of the pixels having depth values that are within the reference range with respect to the other reference depth value. The one or more programs may include instructions which, when executed by the wearable device, cause the wearable device to, based on setting the depth values of the first portion of the pixels to the reference depth value, setting the depth values of the second portion of the pixels to the predetermined depth value, and setting the depth values of the third portion of the pixels to the other reference depth value, display a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The one or more programs may include instructions which, when executed by the wearable device, cause the wearable device to determine a foveated area of the image and a peripheral area of the image surrounding the foveated area of the image, using the eye tracking data obtained using the one or more other sensors. The one or more programs may include instructions which, when executed by the wearable device, cause the wearable device to identify the first portion of the pixels located within the foveated area of the image, the first portion of the pixels having depth values that are within the reference range with respect to the reference depth value. The one or more programs may include instructions which, when executed by the wearable device, cause the wearable device to identify the second portion of the pixels located within the foveated area of the image, the second portion of the pixels having depth values outside the reference range with respect to the reference depth value. The one or more programs may include instructions which, when executed by the wearable device, cause the wearable device to identify a third portion of the pixels located within the peripheral area of the image. The one or more programs may include instructions which, when executed by the wearable device, cause the wearable device to, based on setting the depth values of the first portion of the pixels to the reference depth value, setting the depth values of the second portion of the pixels to the first predetermined depth value, and setting the depth values of the third portion of the pixels to a second predetermined depth value, display a screen corresponding to the image via the display assembly.

According to an embodiment, the predetermined depth value may be a first predetermined depth value. The wearable device may comprise one or more other sensors configured to obtain eye tracking data regarding a gaze of one or more eyes. The one or more programs may include instructions which, when executed by the wearable device, cause the wearable device to determine a foveated area of the image and a peripheral area of the image surrounding the foveated area of the image, using the eye tracking data obtained using the one or more other sensors. The one or more programs may include instructions which, when executed by the wearable device, cause the wearable device to identify the first portion of the pixels located within the foveated area of the image, the first portion of the pixels having depth values that are outside another reference range and are within the reference range with respect to the reference depth value. The one or more programs may include instructions which, when executed by the wearable device, cause the wearable device to identify the second portion of the pixels located within the foveated area of the image, the second portion of the pixels having depth values that are outside the other reference range and are outside the reference range with respect to the reference depth value. The one or more programs may include instructions which, when executed by the wearable device, cause the wearable device to identify a third portion of the pixels located within the foveated area of the image, the third portion of the pixels having depth values that are within the other reference range. The one or more programs may include instructions which, when executed by the wearable device, cause the wearable device to identify a fourth portion of the pixels located within the peripheral area of the image. The one or more programs may include instructions which, when executed by the wearable device, cause the wearable device to, based on setting the depth values of the first portion of the pixels to the reference depth value, setting the depth values of the second portion of the pixels to the first predetermined depth value, and setting the depth values of the fourth portion of the pixels to the second predetermined depth value, display a screen corresponding to the image via the display assembly, and depth values of an area within the screen corresponding to the third portion of the pixels may correspond to the depth values that are within the other reference range of the third portion of the pixels.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the predetermined depth value may be obtained using an average value of the depth values of each of the pixels in the image.

According to an embodiment, the one or more programs may include instructions which, when executed by the wearable device, cause the wearable device to identify the reference depth value, using the depth value associated with the number and a difference between a position of the one or more cameras attached to the wearable device and a position of eyes of a user wearing the wearable device.

As described above, a wearable device may comprise a display assembly, including one or more displays. The wearable device may comprise one or more cameras. The wearable device may comprise one or more sensors. The wearable device may comprise one or more other sensors configured to obtain eye tracking data regarding a gaze of one or more eyes. The wearable device may comprise memory, comprising one or more storage media, storing instructions. The wearable device may comprise at least one processor comprising processing circuitry. The instructions, when executed by the at least one processor individually or collectively, may cause the wearable device to obtain an image via the one or more cameras. The instructions, when executed by the at least one processor individually or collectively, may cause the wearable device to determine a foveated area of the image and a peripheral area of the image surrounding the foveated area of the image, using the eye tracking data obtained using the one or more other sensors. The instructions, when executed by the at least one processor individually or collectively, may cause the wearable device to identify depth values of each of pixels within the foveated area of the image using depth information obtained via the one or more cameras and/or the one or more sensors. The instructions, when executed by the at least one processor individually or collectively, may cause the wearable device to identify the number of one or more pixels having each of the depth values. The instructions, when executed by the at least one processor individually or collectively, may cause the wearable device to identify a reference depth value using a depth value associated with the number corresponding to a peak value among the depth values. The instructions, when executed by the at least one processor individually or collectively, may cause the wearable device to identify a first portion of the pixels within the foveated area of the image having depth values that are within a reference range with respect to the reference depth value. The instructions, when executed by the at least one processor individually or collectively, may cause the wearable device to identify a second portion of the pixels within the foveated area of the image that are different from the first portion of the pixels within the foveated area of the image. The instructions, when executed by the at least one processor individually or collectively, may cause the wearable device to, based on setting the depth values of the first portion of the pixels within the foveated area of the image to the reference depth value, setting depth values of the second portion of the pixels within the foveated area of the image to a first predetermined depth value, and setting depth values of each of pixels within the peripheral area of the image to a second predetermined depth value, display a screen corresponding to the image via the display assembly.

According to an embodiment, the instructions, when executed by the at least one processor individually or collectively, may cause the wearable device to identify another reference depth value using another depth value associated to the number corresponding to another peak value among the depth values of each of pixels within the foveated area of the image. The instructions, when executed by the at least one processor individually or collectively, may cause the wearable device to identify a third portion of the pixels within the foveated area of the image that are different from the first portion of the pixels within the foveated area of the image, the third portion of the pixels within the foveated area of the image having depth values that are within the reference range with respect to the other reference depth value. The instructions, when executed by the at least one processor individually or collectively, may cause the wearable device to, based on setting the depth values of the first portion of the pixel within the foveated area of the image to the reference depth value, setting the depth values of the second portion of the pixels within the foveated area of the image to the first predetermined depth value, setting the depth values of the third portion of the pixels within the foveated area of the image to the other reference depth value, and setting the depth values of each of the pixels within the peripheral area of the image to the second predetermined depth value, display a screen corresponding to the image via the display assembly.

According to an embodiment, the instructions, when executed by the at least one processor individually or collectively, may cause the wearable device to identify the first portion of the pixels within the foveated area of the image, the first portion of the pixels having depth values that are outside another reference range and are within the reference range with respect to the reference depth value. The instructions, when executed by the at least one processor individually or collectively, may cause the wearable device to identify the second portion of the pixels within the foveated area of the image, the second portion of the pixels having depth values that are outside the other reference range and are outside the reference range with respect to the reference depth value. The instructions, when executed by the at least one processor individually or collectively, may cause the wearable device to identify a third portion of the pixels within the foveated area of the image, the third portion of the pixels having depth values that are within the other reference range. The instructions, when executed by the at least one processor individually or collectively, may cause the wearable device to, based on setting the depth values of the first portion of the pixels within the foveated area of the image to the reference depth value, setting the depth values of the second portion of the pixels within the foveated area of the image to the predetermined depth value, and setting the depth values of each of the pixels within the peripheral area of the image to the second predetermined depth value, display a screen corresponding to the image via the display assembly, and depth values of an area within the screen corresponding to the third portion of the pixels within the foveated area of the image may correspond to the depth values that are within the other reference range of the third portion of the pixels within the foveated area of the image.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the first predetermined depth value may be obtained using an average value of the depth values of each of the pixels within the foveated area of the image.

According to an embodiment, the second predetermined depth value may be obtained using an average value of the depth values of each of the pixels within the peripheral area of the image.

According to an embodiment, the instructions, when executed by the at least one processor individually or collectively, may cause the wearable device to identify the reference depth value, using the depth value associated with the number and a difference between a position of the one or more cameras attached to the wearable device and a position of eyes of a user wearing the wearable device.

As described above, a method performed by a wearable device comprising a display assembly including one or more displays, one or more cameras, one or more sensors, and one or more other sensors configured to obtain eye tracking data regarding a gaze of one or more eyes obtaining an image via the one or more cameras. The method may comprise determining a foveated area of the image and a peripheral area of the image surrounding the foveated area of the image, using the eye tracking data obtained using the one or more other sensors. The method may comprise identifying depth values of each of pixels within the foveated area of the image using depth information obtained via the one or more cameras and/or the one or more sensors. The method may comprise identifying the number of one or more pixels having each of the depth values. The method may comprise identifying a reference depth value using a depth value associated with the number corresponding to a peak value among the depth values. The method may comprise identifying a first portion of the pixels within the foveated area of the image having depth values that are within a reference range with respect to the reference depth value. The method may comprise identifying a second portion of the pixels within the foveated area of the image that are different from the first portion of the pixels within the foveated area of the image. The method may comprise, based on setting the depth values of the first portion of the pixels within the foveated area of the image to the reference depth value, setting depth values of the second portion of the pixels within the foveated area of the image to a first predetermined depth value, and setting depth values of each of pixels within the peripheral area of the image to a second predetermined depth value, displaying a screen corresponding to the image via the display assembly.

According to an embodiment, the method may comprise identifying another reference depth value using another depth value associated to the number corresponding to another peak value among the depth values of each of pixels within the foveated area of the image. The method may comprise identifying a third portion of the pixels within the foveated area of the image that are different from the first portion of the pixels within the foveated area of the image, the third portion of the pixels within the foveated area of the image having depth values that are within the reference range with respect to the other reference depth value. The method may comprise, based on setting the depth values of the first portion of the pixel within the foveated area of the image to the reference depth value, setting the depth values of the second portion of the pixels within the foveated area of the image to the first predetermined depth value, setting the depth values of the third portion of the pixels within the foveated area of the image to the other reference depth value, and setting the depth values of each of the pixels within the peripheral area of the image to the second predetermined depth value, displaying a screen corresponding to the image via the display assembly.

According to an embodiment, the method may comprise identifying the first portion of the pixels within the foveated area of the image, the first portion of the pixels having depth values that are outside another reference range and are within the reference range with respect to the reference depth value. The method may comprise identifying the second portion of the pixels within the foveated area of the image, the second portion of the pixels having depth values that are outside the other reference range and are outside the reference range with respect to the reference depth value. The method may comprise identifying a third portion of the pixels within the foveated area of the image, the third portion of the pixels having depth values that are within the other reference range. The method may comprise, based on setting the depth values of the first portion of the pixels within the foveated area of the image to the reference depth value, setting the depth values of the second portion of the pixels within the foveated area of the image to the predetermined depth value, and setting the depth values of each of the pixels within the peripheral area of the image to the second predetermined depth value, displaying a screen corresponding to the image via the display assembly, and depth values of an area within the screen corresponding to the third portion of the pixels within the foveated area of the image may correspond to the depth values that are within the other reference range of the third portion of the pixels within the foveated area of the image.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the first predetermined depth value may be obtained using an average value of the depth values of each of the pixels within the foveated area of the image.

According to an embodiment, the second predetermined depth value may be obtained using an average value of the depth values of each of the pixels within the peripheral area of the image.

According to an embodiment, the method may comprise identifying the reference depth value, using the depth value associated with the number and a difference between a position of the one or more cameras attached to the wearable device and a position of eyes of a user wearing the wearable device.

As described above, a non-transitory computer-readable storage medium storing one or more programs, the one or more programs may include instructions which, when executed by a wearable device comprising a display assembly including one or more displays, one or more cameras, one or more sensors, and one or more other sensors configured to obtain eye tracking data regarding a gaze of one or more eyes, cause the wearable device to obtain an image via the one or more cameras. The one or more programs may include instructions which, when executed by the wearable device, cause the wearable device to determine a foveated area of the image and a peripheral area of the image surrounding the foveated area of the image, using the eye tracking data obtained using the one or more other sensors. The one or more programs may include instructions which, when executed by the wearable device, cause the wearable device to identify depth values of each of pixels within the foveated area of the image using depth information obtained via the one or more cameras and/or the one or more sensors. The one or more programs may include instructions which, when executed by the wearable device, cause the wearable device to identify the number of one or more pixels having each of the depth values. The one or more programs may include instructions which, when executed by the wearable device, cause the wearable device to identify a reference depth value using a depth value associated with the number corresponding to a peak value among the depth values. The one or more programs may include instructions which, when executed by the wearable device, cause the wearable device to identify a first portion of the pixels within the foveated area of the image having depth values that are within a reference range with respect to the reference depth value. The one or more programs may include instructions which, when executed by the wearable device, cause the wearable device to identify a second portion of the pixels within the foveated area of the image that are different from the first portion of the pixels within the foveated area of the image. The one or more programs may include instructions which, when executed by the wearable device, cause the wearable device to, based on setting the depth values of the first portion of the pixels within the foveated area of the image to the reference depth value, setting depth values of the second portion of the pixels within the foveated area of the image to a first predetermined depth value, and setting depth values of each of pixels within the peripheral area of the image to a second predetermined depth value, display a screen corresponding to the image via the display assembly.

According to an embodiment, the one or more programs may include instructions which, when executed by the wearable device, cause the wearable device to identify another reference depth value using another depth value associated to the number corresponding to another peak value among the depth values of each of pixels within the foveated area of the image. The one or more programs may include instructions which, when executed by the wearable device, cause the wearable device to identify a third portion of the pixels within the foveated area of the image that are different from the first portion of the pixels within the foveated area of the image, the third portion of the pixels within the foveated area of the image having depth values that are within the reference range with respect to the other reference depth value. The one or more programs may include instructions which, when executed by the wearable device, cause the wearable device to, based on setting the depth values of the first portion of the pixel within the foveated area of the image to the reference depth value, setting the depth values of the second portion of the pixels within the foveated area of the image to the first predetermined depth value, setting the depth values of the third portion of the pixels within the foveated area of the image to the other reference depth value, and setting the depth values of each of the pixels within the peripheral area of the image to the second predetermined depth value, display a screen corresponding to the image via the display assembly.

According to an embodiment, the one or more programs may include instructions which, when executed by the wearable device, cause the wearable device to identify the first portion of the pixels within the foveated area of the image, the first portion of the pixels having depth values that are outside another reference range and are within the reference range with respect to the reference depth value. The one or more programs may include instructions which, when executed by the wearable device, cause the wearable device to identify the second portion of the pixels within the foveated area of the image, the second portion of the pixels having depth values that are outside the other reference range and are outside the reference range with respect to the reference depth value. The one or more programs may include instructions which, when executed by the wearable device, cause the wearable device to identify a third portion of the pixels within the foveated area of the image, the third portion of the pixels having depth values that are within the other reference range. The one or more programs may include instructions which, when executed by the wearable device, cause the wearable device to, based on setting the depth values of the first portion of the pixels within the foveated area of the image to the reference depth value, setting the depth values of the second portion of the pixels within the foveated area of the image to the predetermined depth value, and setting the depth values of each of the pixels within the peripheral area of the image to the second predetermined depth value, display a screen corresponding to the image via the display assembly, and depth values of an area within the screen corresponding to the third portion of the pixels within the foveated area of the image may correspond to the depth values that are within the other reference range of the third portion of the pixels within the foveated area of the image.

According to an embodiment, the one or more sensors may include a D-TOF sensor and an I-TOF sensor. The area within the screen may include a first partial area and a second partial area. The first partial area included in the area within the screen may have depth values corresponding to depth values identified using the D-TOF sensor among the D-TOF sensor and the I-TOF sensor. The second partial area included in the area within the screen may have depth values corresponding to depth values identified using the I-TOF sensor among the D-TOF sensor and the I-TOF sensor.

According to an embodiment, the first predetermined depth value may be obtained using an average value of the depth values of each of the pixels within the foveated area of the image.

According to an embodiment, the second predetermined depth value may be obtained using an average value of the depth values of each of the pixels within the peripheral area of the image.

According to an embodiment, the one or more programs may include instructions which, when executed by the wearable device, cause the wearable device to identify the reference depth value, using the depth value associated with the number and a difference between a position of the one or more cameras attached to the wearable device and a position of eyes of a user wearing the wearable device.

As described above, a wearable device may comprise a display assembly, including one or more displays. The wearable device may comprise one or more cameras. The wearable device may comprise one or more sensors. The wearable device may comprise memory, comprising one or more storage media, storing instructions. The wearable device may comprise at least one processor comprising processing circuitry. The instructions, when executed by the at least one processor individually or collectively, may cause the wearable device to obtain an image via the one or more cameras. The instructions, when executed by the at least one processor individually or collectively, may cause the wearable device to identify an object within the image. The instructions, when executed by the at least one processor individually or collectively, may cause the wearable device to identify depth values of a first portion of pixels within an area within the image occupied by the object, using depth information obtained via the one or more cameras and/or the one or more sensors. The instructions, when executed by the at least one processor individually or collectively, may cause the wearable device to identify a reference depth value using at least portion of the depth values of the first portion of the pixels. The instructions, when executed by the at least one processor individually or collectively, may cause the wearable device to identify a second portion of the pixels that are different from the first portion of the pixels. The instructions, when executed by the at least one processor individually or collectively, may cause the wearable device to, based on setting the depth values of the first portion of the pixels to the reference depth value and setting the depth values of the second portion of the pixels to a predetermined depth value, display a screen corresponding to the image via the display assembly.

According to an embodiment, the reference depth value may be a first reference depth value. The instructions, when executed by the at least one processor individually or collectively, may cause the wearable device to identify another object within the image. The instructions, when executed by the at least one processor individually or collectively, may cause the wearable device to identify depth values of a third portion of the pixels within an area within the image occupied by the other object, using depth information. The instructions, when executed by the at least one processor individually or collectively, may cause the wearable device to identify a second reference depth value using the depth values of the third portion of the pixels. The instructions, when executed by the at least one processor individually or collectively, may cause the wearable device to, based on setting the depth values of the first portion of the pixels to the first reference depth value, setting the depth values of the second portion of the pixels to the predetermined depth value, and setting the depth values of the third portion of the pixels to the second reference depth value, display a screen corresponding to the image via the display assembly.

According to an embodiment, the instructions, when executed by the at least one processor individually or collectively, may cause the wearable device to identify the number of one or more pixels within the area of the image, the one or more pixels having each of the depth values of the first portion of the pixels. The instructions, when executed by the at least one processor individually or collectively, may cause the wearable device to identify the reference depth value using a depth value associated with the number corresponding to a peak value among the depth values of the first portion of the pixels. The instructions, when executed by the at least one processor individually or collectively, may cause the wearable device to, based on setting the depth values of the first portion of the pixels to the reference depth value and setting the depth values of the second portion of the pixels to the predetermined depth value, display a screen corresponding to the image via the display assembly.

According to an embodiment, the wearable device may comprise one or more other sensors configured to obtain eye tracking data regarding a gaze of one or more eyes. The reference depth value may be a first reference depth value. The instructions, when executed by the at least one processor individually or collectively, may cause the wearable device to determine a foveated area of the image and a peripheral area of the image surrounding the foveated area of the image, using the eye tracking data obtained using the one or more other sensors. The instructions, when executed by the at least one processor individually or collectively, may cause the wearable device to, based on identifying that the object within the image is located within the foveated area within the image, identify depth values of the foveated area of the image, identify the number of one or more pixels within the foveated area of the image, the one or more pixels having each of the depth values of the foveated area of the image, identify a second reference depth value using a depth value associated with the number corresponding to a peak value among the depth values of the foveated area of the image, and based on setting the depth values of the foveated area of the image to the second reference depth value and setting depth values of the peripheral area of the image to the predetermined depth value, display a screen corresponding to the image via the display assembly. The instructions, when executed by the at least one processor individually or collectively, may cause the wearable device to, based on identifying that at least a portion of the object within the image is located within the peripheral area within the image, based on setting the depth values of the first portion of the pixels to the first reference depth value and setting the depth values of the second portion of the pixels to the predetermined depth value, display a screen corresponding to the image via the display assembly.

According to an embodiment, the reference depth value may correspond to an average value of the depth values of the first portion of the pixels.

According to an embodiment, the instructions, when executed by the at least one processor individually or collectively, may cause the wearable device to identify the reference depth value, using at least portion of the depth values of the first portion of the pixels and a difference between a position of the one or more cameras attached to the wearable device and a position of eyes of a user wearing the wearable device.

As described above, a method performed by a wearable device comprising a display assembly including one or more displays, one or more cameras, and one or more sensors may comprise obtaining an image via the one or more cameras. The method may comprise identifying an object within the image. The method may comprise identifying depth values of a first portion of pixels within an area within the image occupied by the object, using depth information obtained via the one or more cameras and/or the one or more sensors. The method may comprise identifying a reference depth value using at least portion of the depth values of the first portion of the pixels. The method may comprise identifying a second portion of the pixels that are different from the first portion of the pixels. The method may comprise, based on setting the depth values of the first portion of the pixels to the reference depth value and setting the depth values of the second portion of the pixels to a predetermined depth value, displaying a screen corresponding to the image via the display assembly.

According to an embodiment, the reference depth value may be a first reference depth value. The method may comprise identifying another object within the image. The method may comprise identifying depth values of a third portion of the pixels within an area within the image occupied by the other object, using depth information. The method may comprise identifying a second reference depth value using the depth values of the third portion of the pixels. The method may comprise, based on setting the depth values of the first portion of the pixels to the first reference depth value, setting the depth values of the second portion of the pixels to the predetermined depth value, and setting the depth values of the third portion of the pixels to the second reference depth value, displaying a screen corresponding to the image via the display assembly.

According to an embodiment, the method may comprise identifying the number of one or more pixels within the area of the image, the one or more pixels having each of the depth values of the first portion of the pixels. The method may comprise identifying the reference depth value using a depth value associated with the number corresponding to a peak value among the depth values of the first portion of the pixels. The method may comprise, based on setting the depth values of the first portion of the pixels to the reference depth value and setting the depth values of the second portion of the pixels to the predetermined depth value, displaying a screen corresponding to the image via the display assembly.

According to an embodiment, the wearable device may comprise one or more other sensors configured to obtain eye tracking data regarding a gaze of one or more eyes. The reference depth value may be a first reference depth value. The method may comprise determining a foveated area of the image and a peripheral area of the image surrounding the foveated area of the image, using the eye tracking data obtained using the one or more other sensors. The method may comprise, based on identifying that the object within the image is located within the foveated area within the image, identifying depth values of the foveated area of the image, identifying the number of one or more pixels within the foveated area of the image, the one or more pixels having each of the depth values of the foveated area of the image, identifying a second reference depth value using a depth value associated with the number corresponding to a peak value among the depth values of the foveated area of the image, and based on setting the depth values of the foveated area of the image to the second reference depth value and setting depth values of the peripheral area of the image to the predetermined depth value, displaying a screen corresponding to the image via the display assembly. The method may comprise, based on identifying that at least a portion of the object within the image is located within the peripheral area within the image, based on setting the depth values of the first portion of the pixels to the first reference depth value and setting the depth values of the second portion of the pixels to the predetermined depth value, displaying a screen corresponding to the image via the display assembly.

According to an embodiment, the reference depth value may correspond to an average value of the depth values of the first portion of the pixels.

According to an embodiment, the method may comprise identifying the reference depth value, using at least portion of the depth values of the first portion of the pixels and a difference between a position of the one or more cameras attached to the wearable device and a position of eyes of a user wearing the wearable device.

As described above, a non-transitory computer-readable storage medium storing one or more programs, the one or more programs may include instructions which, when executed by a wearable device comprising a display assembly including one or more displays, one or more cameras, and one or more sensors, cause the wearable device to obtain an image via the one or more cameras. The one or more programs may include instructions which, when executed by the wearable device, cause the wearable device to identify an object within the image. The one or more programs may include instructions which, when executed by the wearable device, cause the wearable device to identify depth values of a first portion of pixels within an area within the image occupied by the object, using depth information obtained via the one or more cameras and/or the one or more sensors. The one or more programs may include instructions which, when executed by the wearable device, cause the wearable device to identify a reference depth value using at least portion of the depth values of the first portion of the pixels. The one or more programs may include instructions which, when executed by the wearable device, cause the wearable device to identify a second portion of the pixels that are different from the first portion of the pixels. The one or more programs may include instructions which, when executed by the wearable device, cause the wearable device to, based on setting the depth values of the first portion of the pixels to the reference depth value and setting the depth values of the second portion of the pixels to a predetermined depth value, display a screen corresponding to the image via the display assembly.

According to an embodiment, the reference depth value may be a first reference depth value. The one or more programs may include instructions which, when executed by the wearable device, cause the wearable device to identify another object within the image. The one or more programs may include instructions which, when executed by the wearable device, cause the wearable device to identify depth values of a third portion of the pixels within an area within the image occupied by the other object, using depth information. The one or more programs may include instructions which, when executed by the wearable device, cause the wearable device to identify a second reference depth value using the depth values of the third portion of the pixels. The one or more programs may include instructions which, when executed by the wearable device, cause the wearable device to, based on setting the depth values of the first portion of the pixels to the first reference depth value, setting the depth values of the second portion of the pixels to the predetermined depth value, and setting the depth values of the third portion of the pixels to the second reference depth value, display a screen corresponding to the image via the display assembly.

According to an embodiment, the one or more programs may include instructions which, when executed by the wearable device, cause the wearable device to identify the number of one or more pixels within the area of the image, the one or more pixels having each of the depth values of the first portion of the pixels. The one or more programs may include instructions which, when executed by the wearable device, cause the wearable device to identify the reference depth value using a depth value associated with the number corresponding to a peak value among the depth values of the first portion of the pixels. The one or more programs may include instructions which, when executed by the wearable device, cause the wearable device to, based on setting the depth values of the first portion of the pixels to the reference depth value and setting the depth values of the second portion of the pixels to the predetermined depth value, display a screen corresponding to the image via the display assembly.

According to an embodiment, the wearable device may comprise one or more other sensors configured to obtain eye tracking data regarding a gaze of one or more eyes. The reference depth value may be a first reference depth value. The one or more programs may include instructions which, when executed by the wearable device, cause the wearable device to determine a foveated area of the image and a peripheral area of the image surrounding the foveated area of the image, using the eye tracking data obtained using the one or more other sensors. The one or more programs may include instructions which, when executed by the wearable device, cause the wearable device to, based on identifying that the object within the image is located within the foveated area within the image, identify depth values of the foveated area of the image, identify the number of one or more pixels within the foveated area of the image, the one or more pixels having each of the depth values of the foveated area of the image, identify a second reference depth value using a depth value associated with the number corresponding to a peak value among the depth values of the foveated area of the image, and based on setting the depth values of the foveated area of the image to the second reference depth value and setting depth values of the peripheral area of the image to the predetermined depth value, display a screen corresponding to the image via the display assembly. The one or more programs may include instructions which, when executed by the wearable device, cause the wearable device to, based on identifying that at least a portion of the object within the image is located within the peripheral area within the image, based on setting the depth values of the first portion of the pixels to the first reference depth value and setting the depth values of the second portion of the pixels to the predetermined depth value, display a screen corresponding to the image via the display assembly.

According to an embodiment, the reference depth value may correspond to an average value of the depth values of the first portion of the pixels.

According to an embodiment, the one or more programs may include instructions which, when executed by the wearable device, cause the wearable device to identify the reference depth value, using at least portion of the depth values of the first portion of the pixels and a difference between a position of the one or more cameras attached to the wearable device and a position of eyes of a user wearing the wearable device.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and DVD, magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved. Therefore, other implementations, other embodiments, and those equivalent to the scope of the claims are in the scope of the claims described later.

No claim element is to be construed under the provisions of 35 U.S.C. § 112, sixth paragraph, unless the element is expressly recited using the phrase "means for" or "means".

What is claimed is:

1. A wearable device comprising:

a display assembly comprising one or more displays;

one or more cameras;

one or more sensors;

memory, comprising one or more storage media, configured to store instructions; and at least one processor comprising processing circuitry, wherein the instructions, when executed by the at least one processor individually or collectively, cause the wearable device to:

obtain an image via the one or more cameras, identify depth values of pixels in the image using depth information obtained via at least one of the one or more cameras or the one or more sensors, identify the number of one or more pixels having each of the depth values of the pixels, identify a reference depth value using a depth value associated with the number corresponding to a peak value among the depth values, identify a first portion of the pixels having first depth values that are within a reference range with respect to the reference depth value, identify a second portion of the pixels that are different from the first portion of the pixels, and based on setting the first depth values of the first portion of the pixels to the reference depth value and setting second depth values of the second portion of the pixels to a predetermined depth value, display, via the display assembly, a screen corresponding to the image having the first portion of the pixels and the second portion of the pixels.

2. The wearable device of claim 1, wherein the instructions, when executed by the at least one processor individually or collectively, further cause the wearable device to:

identify another reference depth value using another depth value associated to the number corresponding to another peak value among the depth values of the pixels in the image, identify a third portion of the pixels that are different from the first portion of the pixels, wherein the third portion of the pixels has third depth values that are within the reference range with respect to the other reference depth value, and based on setting the first depth values of the first portion of the pixels to the reference depth value, setting second depth values of the second portion of the pixels to the predetermined depth value, and setting the third depth values of the third portion of the pixels to the other reference depth value, display, via the display assembly, a screen corresponding to the image having the first portion of the pixels, the second portion of the pixels, and the third portion of the pixels.

3. The wearable device of claim 1, further comprising one or more other sensors configured to obtain eye tracking data regarding a gaze of one or more eyes, wherein the predetermined depth value is a first predetermined depth value, and wherein the instructions, when executed by the at least one processor individually or collectively, further cause the wearable device to:

determine a foveated area of the image and a peripheral area of the image surrounding the foveated area of the image, using the eye tracking data obtained using the one or more other sensors, identify the first portion of the pixels located within the foveated area of the image, wherein the first portion of the pixels has the first depth values that are within the reference range with respect to the reference depth value, identify the second portion of the pixels located within the foveated area of the image, wherein the second portion of the pixels has the second depth values outside the reference range with respect to the reference depth value, identify a third portion of the pixels located within the peripheral area of the image, and based on setting the first depth values of the first portion of the pixels to the reference depth value, setting the second depth values of the second portion of the pixels to the first predetermined depth value, and setting third depth values of the third portion of the pixels to a second predetermined depth value, display, via the display assembly, a screen corresponding to the image having the first portion of the pixels, the second portion of the pixels, and the third portion of the pixels.

4. The wearable device of claim 1, further comprising:

one or more other sensors configured to obtain eye tracking data regarding a gaze of one or more eyes, wherein the predetermined depth value is a first predetermined depth value, and wherein the instructions, when executed by the at least one processor individually or collectively, further cause the wearable device to:

determine a foveated area of the image and a peripheral area of the image surrounding the foveated area of the image, using the eye tracking data obtained using the one or more other sensors, identify the first portion of the pixels located within the foveated area of the image, wherein the first portion of the pixels has the first depth values that are outside another reference range and are within the reference range with respect to the reference depth value, identify the second portion of the pixels located within the foveated area of the image, wherein the second portion of the pixels has the second depth values that are outside the other reference range and are outside the reference range with respect to the reference depth value, identify a third portion of the pixels located within the foveated area of the image, wherein the third portion of the pixels has third depth values that are within the other reference range, identify a fourth portion of the pixels located within the peripheral area of the image, and based on setting the first depth values of the first portion of the pixels to the reference depth value, setting the second depth values of the second portion of the pixels to the first predetermined depth value, and setting fourth depth values of the fourth portion of the pixels to the second predetermined depth value, display, via the display assembly, a screen corresponding to the image having the first portion of the pixels, the second portion of the pixels and the fourth portion of the pixels, and wherein depth values of an area within the screen corresponding to the third portion of the pixels correspond to the third depth values that are within the other reference range of the third portion of the pixels.

5. The wearable device of claim 4, wherein the one or more sensors comprise a direct time of flight (D-TOF) sensor and an indirect time of flight (I-TOF) sensor, wherein the area within the screen comprises a first partial area and a second partial area, wherein the first partial area in the area within the screen have depth values corresponding to depth values identified using the D-TOF sensor among the D-TOF sensor and the I-TOF sensor, and wherein the second partial area in the area within the screen have depth values corresponding to depth values identified using the I-TOF sensor among the D-TOF sensor and the I-TOF sensor.

6. The wearable device of claim 1, wherein the predetermined depth value is obtained using an average value of the depth values of the pixels in the image.

7. The wearable device of claim 1, wherein the instructions, when executed by the at least one processor individually or collectively, further cause the wearable device to identify the reference depth value, using the depth value associated with the number and a difference between a position of the one or more cameras attached to the wearable device and a position of eyes of a user wearing the wearable device.

8. A wearable device comprising:
a display assembly, including one or more displays;
one or more cameras;
one or more sensors;
one or more other sensors configured to obtain eye tracking data regarding a gaze of one or more eyes;
memory, comprising one or more storage media, configured to store instructions; and
at least one processor comprising processing circuitry,
wherein the instructions, when executed by the at least one processor individually or collectively, cause the wearable device to:
obtain an image via the one or more cameras,
determine a foveated area of the image and a peripheral area of the image surrounding the foveated area of the image, using the eye tracking data obtained using the one or more other sensors,
identify depth values of pixels within the foveated area of the image using depth information obtained via at least one of the one or more cameras or the one or more sensors,
identify the number of one or more pixels having each of the depth values of the pixels within the foveated area of the image,
identify a reference depth value using a depth value associated with the number corresponding to a peak value among the depth values, identify a first portion of the pixels within the foveated area of the image having first depth values that are within a reference range with respect to the reference depth value, identify a second portion of the pixels within the foveated area of the image that are different from the first portion of the pixels within the foveated area of the image, and based on setting the first depth values of the first portion of the pixels within the foveated area of the image to the reference depth value, setting second depth values of the second portion of the pixels within the foveated area of the image to a first predetermined depth value, and setting depth values of pixels within the peripheral area of the image to a second predetermined depth value, display, via the display assembly, a screen corresponding to the image having the first portion of the pixels, the second portion of the pixels, and the pixels within the peripheral area.

9. The wearable device of claim 8, wherein the instructions, when executed by the at least one processor individually or collectively, further cause the wearable device to:

identify another reference depth value using another depth value associated to the number corresponding to another peak value among the depth values of the pixels within the foveated area of the image, identify a third portion of the pixels within the foveated area of the image that are different from the first portion of the pixels within the foveated area of the image, wherein the third portion of the pixels within the foveated area of the image has third depth values that are within the reference range with respect to the other reference depth value, and based on setting the first depth values of the first portion of the pixel within the foveated area of the image to the reference depth value, setting the second depth values of the second portion of the pixels within the foveated area of the image to the first predetermined depth value, setting the third depth values of the third portion of the pixels within the foveated area of the image to the other reference depth value, and setting the depth values of the pixels within the peripheral area of the image to the second predetermined depth value, display, via the display assembly, a screen corresponding to the image having the first portion of the pixels, the second portion of the pixels, the third portion of the pixels, and the pixels within the peripheral area.

10. The wearable device of claim 8, wherein the instructions, when executed by the at least one processor individually or collectively, further cause the wearable device to:

identify the first portion of the pixels within the foveated area of the image, wherein the first portion of the pixels has the first depth values that are outside another reference range and are within the reference range with respect to the reference depth value, identify the second portion of the pixels within the foveated area of the image, wherein the second portion of the pixels has the second depth values that are outside the other reference range and are outside the reference range with respect to the reference depth value, identify a third portion of the pixels within the foveated area of the image, wherein the third portion of the pixels has third depth values that are within the other reference range, and based on setting the first depth values of the first portion of the pixels within the foveated area of the image to the reference depth value, setting the second depth values of the second portion of the pixels within the foveated area of the image to the predetermined depth value, and setting the depth values of the pixels within the peripheral area of the image to the second predetermined depth value, display, via the display assembly, a screen corresponding to the image having the first portion of the pixels, the second portion of the pixels, and the pixels within the peripheral area, and wherein depth values of an area within the screen corresponding to the third portion of the pixels within the foveated area of the image correspond to the third depth values that are within the other reference range of the third portion of the pixels within the foveated area of the image.

11. The wearable device of claim 10, wherein the one or more sensors comprise a direct time of flight (D-TOF) sensor and an indirect time of flight (I-TOF) sensor, wherein the area within the screen comprises a first partial area and a second partial area, wherein the first partial area in the area within the screen have depth values corresponding to depth values identified using the D-TOF sensor among the D-TOF sensor and the I-TOF sensor, and wherein the second partial area in the area within the screen have depth values corresponding to depth values identified using the I-TOF sensor among the D-TOF sensor and the I-TOF sensor.

12. The wearable device of claim 8, wherein the first predetermined depth value is obtained using an average value of the depth values of the pixels within the foveated area of the image.

13. The wearable device of claim 8, wherein the second predetermined depth value is obtained using an average value of the depth values of the pixels within the peripheral area of the image.

14. The wearable device of claim 8, wherein the instructions, when executed by the at least one processor individually or collectively, further cause the wearable device to:

identify the reference depth value, using the depth value associated with the number and a difference between a position of the one or more cameras attached to the wearable device and a position of eyes of a user wearing the wearable device.

15. A wearable device comprising:

a display assembly including one or more displays;

one or more cameras;

one or more sensors;

memory, comprising one or more storage media, configured to store instructions; and at least one processor comprising processing circuitry, wherein the instructions, when executed by the at least one processor individually or collectively, cause the wearable device to:

obtain an image via the one or more cameras, identify an object within the image, identify first depth values of a first portion of pixels within an area within the image occupied by the object, using depth information obtained via at least one of the one or more cameras or the one or more sensors, identify a reference depth value using at least portion of the first depth values of the first portion of the pixels, identify a second portion of the pixels that are different from the first portion of the pixels, and based on setting the first depth values of the first portion of the pixels to the reference depth value and setting second depth values of the second portion of the pixels to a predetermined depth value, display, via the display assembly, a screen corresponding to the image having the first portion of the pixels and the second portion of the pixels.

16. The wearable device of claim 15, wherein the reference depth value is a first reference depth value, wherein the instructions, when executed by the at least one processor individually or collectively, further cause the wearable device to:

identify another object within the image, identify third depth values of a third portion of the pixels within an area within the image occupied by the other object, using depth information, identify a second reference depth value using the third depth values of the third portion of the pixels, based on setting the first depth values of the first portion of the pixels to the first reference depth value, setting the second depth values of the second portion of the pixels to the predetermined depth value, and setting the third depth values of the third portion of the pixels to the second reference depth value, display, via the display assembly, a screen corresponding to the image having the first portion of the pixels, the second portion of the pixels, and the third portion of the pixels.

17. The wearable device of claim 15, wherein the instructions, when executed by the at least one processor individually or collectively, further cause the wearable device to:

identify the number of one or more pixels within the area of the image, wherein the one or more pixels have each of the depth values of the first portion of the pixels, identify the reference depth value using a depth value associated with the number corresponding to a peak value among the depth values of the first portion of the pixels, and based on setting the first depth values of the first portion of the pixels to the reference depth value and setting the second depth values of the second portion of the pixels to the predetermined depth value, display, via the display assembly, a screen corresponding to the image having the first portion of the pixels and the second portion of the pixels.

18. The wearable device of claim 15, further comprising:

one or more other sensors configured to obtain eye tracking data regarding a gaze of one or more eyes, wherein the reference depth value is a first reference depth value, and wherein the instructions, when executed by the at least one processor individually or collectively, further cause the wearable device to:

determine a foveated area of the image and a peripheral area of the image surrounding the foveated area of the image, using the eye tracking data obtained using the one or more other sensors, based on identifying that the object within the image is located within the foveated area within the image:

identify depth values of the foveated area of the image, identify the number of one or more pixels within the foveated area of the image, wherein the one or more pixels have each of the depth values of the foveated area of the image, identify a second reference depth value using a depth value associated with the number corresponding to a peak value among the depth values of the foveated area of the image, and based on setting the depth values of the foveated area of the image to the second reference depth value and setting depth values of the peripheral area of the image to the predetermined depth value, display, via the display assembly, a screen corresponding to the image, and based on identifying that at least a portion of the object within the image is located within the peripheral area within the image, based on setting the depth values of the first portion of the pixels to the first reference depth value and setting the depth values of the second portion of the pixels to the predetermined depth value, display, via the display assembly, a screen corresponding to the image.

19. The wearable device of claim 15, wherein the reference depth value corresponds to an average value of the depth values of the first portion of the pixels.

20. The wearable device of claim 15, wherein the instructions, when executed by the at least one processor individually or collectively, further cause the wearable device to:

identify the reference depth value, using at least portion of the depth values of the first portion of the pixels and a difference between a position of the one or more cameras attached to the wearable device and a position of eyes of a user wearing the wearable device.

\* \* \* \* \*